(12) United States Patent
Tinkler

(10) Patent No.: US 6,801,229 B1
(45) Date of Patent: Oct. 5, 2004

(54) SYSTEM FOR CREATION OF VISUAL REPRESENTATION OF DATA

(75) Inventor: Marc Tinkler, New York, NY (US)

(73) Assignee: Plumbdesign, New York, NY (US)

( * ) Notice: Subject to any disclaimer, the term of this patent is extended or adjusted under 35 U.S.C. 154(b) by 712 days.

(21) Appl. No.: 09/828,391

(22) Filed: Apr. 6, 2001

(51) Int. Cl.[7] .............................................. G06F 15/00
(52) U.S. Cl. ........................................... 345/853; 345/440
(58) Field of Search ................................. 345/853, 854, 345/855, 440, 419, 441, 420

(56) References Cited

U.S. PATENT DOCUMENTS 6,031,537 A * 2/2000 Hugh .......................... 345/854
6,259,458 B1 * 7/2001 Theisen et al. ............. 345/440

* cited by examiner

Primary Examiner—Cao (Kevin) Nguyen
(74) Attorney, Agent, or Firm—Mayer, Brown, Rowe & Maw LLP

(57) ABSTRACT

A system for displaying related data in a graphical representation is disclosed. The system allows display of data visually to demonstrate requested data and data which is related to the requested data. The requested data is sent from a data source to a client computer via a programming object which has a display manager which creates display entities for the formatting of graphics on a display screen. The display entities have properties which define the appearance of the entity on the display screen. The programming object also has a position manager routine which creates position entities for the placement of the entities in a global space. The position entities have properties which define the location of the entities in the global space. The programming object also has a graph manager routine which creates graph entities for selection of data records from the data source. The graph entities have properties which determine the selection of data records. The programming object also has a source manager routine which creates source entities which have properties to represent the data records. The system includes an authoring program which allows a user to create the programming object via various editors which allow creation of the four managers to obtain different representations from the data source.

57 Claims, 39 Drawing Sheets

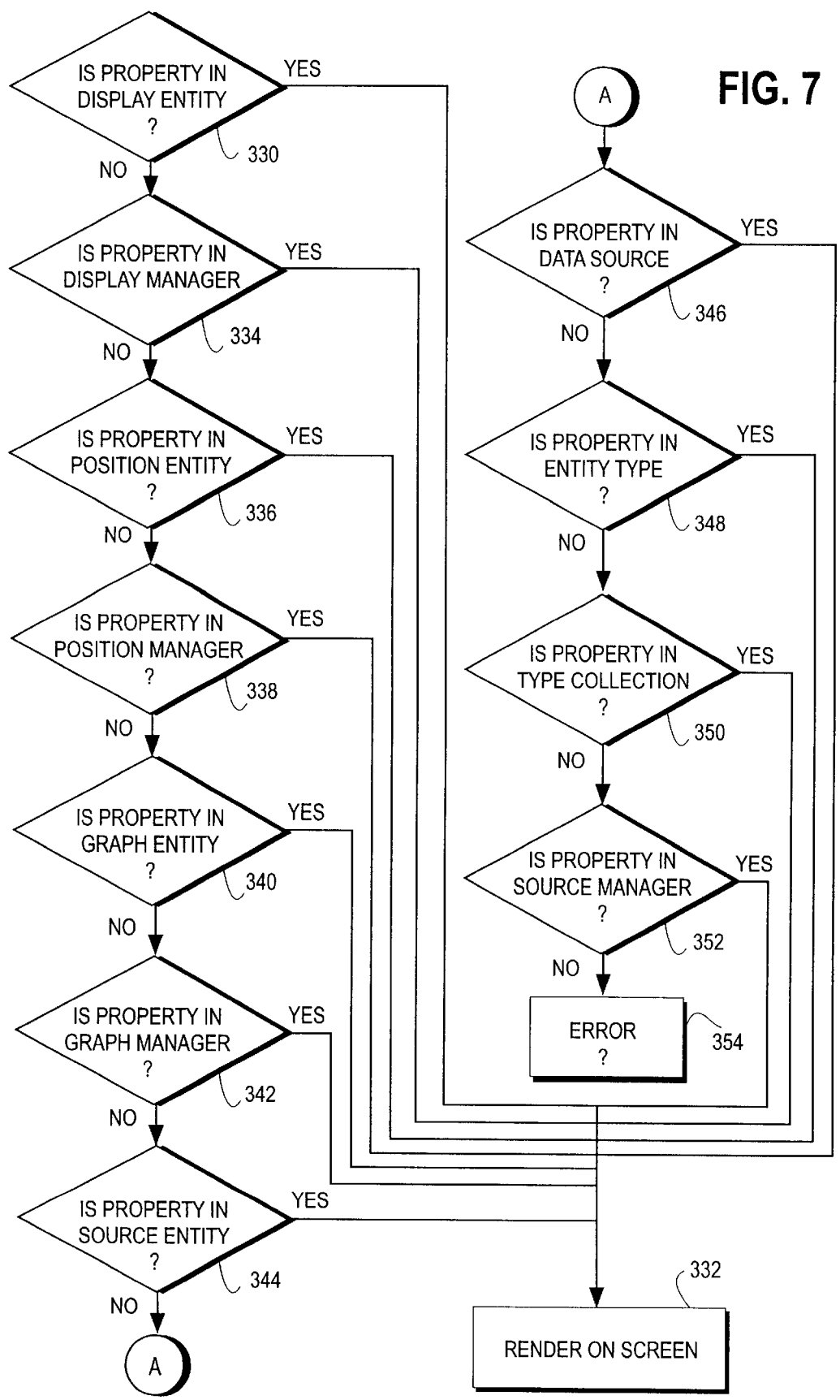

SYSTEM FOR CREATION OF VISUAL REPRESENTATION OF DATA

FIELD OF INVENTION

This invention relates to an authoring tool for graphical presentation of stored information. More specifically, this invention relates to a software authoring tool for creating a programming object representing related data and the graphical representation of that information.

BACKGROUND OF INVENTION

The advent of computers has allowed storage and recall of massive amounts of data. The volume of the data capable of being stored has necessitated the development of more efficient methods of organizing and presenting the data. Past methods of data storage on computer systems were in a flat record form. Flat records have a list of data records in a row with a number of different pieces of data associated with the record in a column. The flat records were organized but searches were difficult since a new table would have to be created to display the results of unrelated data contained in existing tables. Thus, database computer software was developed to relate data and provide efficient search capabilities. With the advent of databases, large amounts of data could be related to each other by common characteristics and specialized computer languages were developed to search the data in databases.

Database software typically involves a data schema which is a layout of fields to describe the data for each record in the database. A relational database is a collection of data items organized as a set of formally described tables. The data in the tables can be accessed or reassembled in many different ways without having to reorganize the database tables through the use of a query. A query is a request for information that a user sends to a database. Every database table is made up of columns and rows. Each row in the table represents an individual record. Each row has a number of columns with cells belonging to the record. A data field may be the data in a cell in the database table. In database parlance, a table's column headings are called metadata. Relational databases have entity tables that store primary information and relation tables which link entity tables. Queries to a database may be made in well known languages such as Structured Query Language (SQL) which allows a user to recall responsive records from the database.

Up until the advent of graphically powerful computers the presentation of data output in response to a query remained in a textual form. While effective in searching, such recalled information was difficult to comprehend by the user due to the graphic simplicity and uniformity of the presentation. With the advent of graphical user interface (GUI) operating systems, information could be presented in a more visually attractive and dynamic fashion.

Recently, with the advent of the world wide web, information and data records from numerous, remote computers have begun to move to a presentation format which is accessible to many people. However, current presentation of data in a graphical format is suffering from information overload due to the large amounts of data available.

Thus, there exists a need for a system which allows the creation of a visual representation of linked information. There is also a further need for a program which visually represents different data and their relations. There is a further need for a program which allows representation of data from any type of data storage such as a database or other application data file.

SUMMARY OF THE INVENTION

The present invention is embodied in an authoring system for producing a computer programming object for the graphical representation of data items from a data source. The programming object has a collection of entities representing at least one data item. The authoring system includes a display manager editor routine that creates a display manager, which manages display entities for the formatting of graphics on a display screen representing the data items. These entities include a display entity having properties that define the appearance of a graphic representing the data item on the display screen. A position manager editor routine creates a position manager that manages position entities for location of the data items in a global space. These entities include a position entity having properties that define a location of the data item in the global space. A graph manager editor routine creates a graph manager that manages graph entities for selection of data items from the data source. These entities include a graph entity having properties that determine the selection of the data item. A source manager editor routine creates a source manager that manages source entities which have properties to represent the data items.

The invention is also embodied in a computer programming object for rendering a graphical representation of a data item from a data source on the screen of a client computer. The computer programming object has a display manager routine that creates a display entity for the display of graphics on the display screen that represent the data item. The display entity has at least one property that defines the appearance of the graphics on the display screen. A position manager routine creates a position entity for placement of the data item in a global space. The position entity has at least one property that defines the location of the data item in the global space. A graph manager routine creates a graph entity for selection of the data item from the data source. The graph entity has at least one property that determines the selection of data item. A source manager routine creates a source entity that has at least one property to determine the interface with the data item from the data source.

The present invention is also embodied in a system for the retrieval and graphical presentation of data items from a data source. The system includes a client computer having a display screen and an input device capable of requesting a data item from the data source. A data source is coupled to the application server. The application server produces a client computer readable object for producing a graphical representation of the data item from the data source on the screen of the client computer. The object has a display manager routine that creates display entities for the formatting of graphics on the display screen that represent the data items including a display entity having properties that define the appearance of a graphic representing the data item. The object also has a position manager routine that creates position entities for placement of the data items in a global space including a position entity having properties that define the location of the data item in the global space. The object also has a graph manager routine that creates graph entities for selection of data items from the data source including a graph entity having properties that determine the selection of the data item. The object also has a source manager routine that creates a source entity that has properties to represent the data item.

The present invention may also be embodied in a method for authoring a computer programming object for the graphical representation of data items from a data source on a client computer having a display screen. A display manager is created to manage display entities for the formatting of graphics on a display screen representing the data items. A display entity is created having properties that define the appearance of a graphic representing the data item on the display screen. A position manager is created to manage position entities for location of the data items in a global space. A position entity is created having properties that define a location of the data item in the global space. A graph manager is created to manage graph entities for selection of data items from the data source. A graph entity is created having properties that determine the selection of the data item. A source manager is created to manage source entities that have properties to represent the data items.

It is to be understood that both the foregoing general description and the following detailed description are not limiting but are intended to provide further explanation of the invention claimed. The accompanying drawings, which are incorporated in and constitute part of this specification, are included to illustrate and provide a further understanding of the method and system of the invention. Together with the description, the drawings serve to explain the principles of the invention.

BRIEF DESCRIPTION OF DRAWINGS

FIG. 7 is a flow diagram of the property chain of queries to determine a property value for the,visual presentation.

FIGS. 9A–9C are screen shots of the project wizard of the authoring software in

DESCRIPTION OF THE PREFERRED EMBODIMENT

Figure 1:
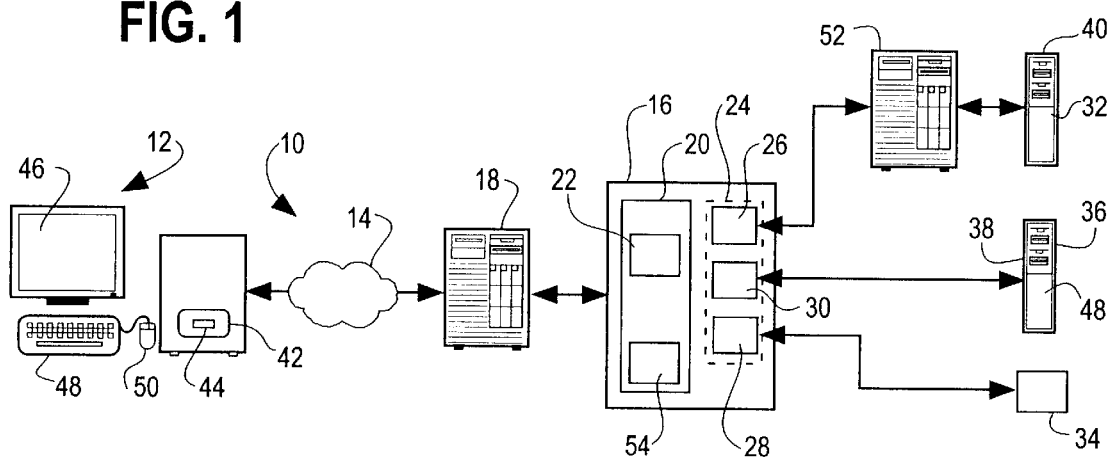
FIG. 1 is a block diagram of a computer network system for visual presentation of data according to one embodiment of the present invention.

While the present invention is capable of embodiment in various forms, there is shown in the drawings and will hereinafter be described a presently preferred embodiment with the understanding that the present disclosure is to be considered as an exemplification of the invention, and is not intended to limit the invention to the specific embodiment illustrated.

I. Hardware Environment

Referring now to the drawings and mote particularly to FIG. 1, a block diagram of a network system 10 is shown for the graphical display of data requested from a data source. A client computer 12 is coupled to a network of computers 14 which is the Internet in this example but may be an intranet such as a local area network or a wide area network or the equivalent. The network 14 sends data and messages from the client computer 12 via the TCP/IP protocol using a format such as hyper-text transfer protocol to an application server 16. The application server 16 in this example resides at a remote location from the client computer 12. The interface with the network 14 is conducted by a web server 18. In FIG. 1, the application server 16 and the web server 18 may reside on the same computer or different computers. The servers 16 and 18 may be based on any appropriate server operating system such as Windows NT, Solaris, Linux, HP Unix, SGI or other types of common server operating systems.

The application server 16 has access to a large memory device 20. The application server 16 holds a server program 22 which provides a presentation of the requested data in the form of a programming object which is sent to the client computer 12. In the preferred embodiment, the programming object is a Java Applet which is transmitted over the Internet. The memory 20 holds a number of data source interfaces 24 which are used to collect requested data from various data sources. In this example, the data source interfaces 24 include two relational database source interfaces 26 and 28 and a flat file data source interface 30. The data source interfaces 26, 28 and 30 may be coupled to a variety of data sources such as relational databases 32 and 34 and a flat file data source 36. The flat file data source 36 may be a delimited text file which is produced by an application program such as a spread sheet program. The relational databases 32 and 34 are any ODBC or JDBC compliant databases such as ORACLE, SQL Server, etc. The data sources such as the relational database 32 and the flat file data source 36 are stored on computers 38 and 40. The computers 38 and 40 have appropriate memory and processing capabilities to run application programs to access the data in the relational database 32 and the flat file 36. The computers 38 and 40 are linked via network or other connections to the application server 16. Data sources such as the relational database 34 may also be stored on the memory device 20.

The client computer 12 is any Internet enabled or network connected device such as an IBM type personal computer, Macintosh type personal computer, PDA, Internet enabled cell phone, web enabled cell phone or web television. In this example, the client computer 12 has a storage device 42 which is a hard drive and stores various computer software programs to operate the client computer 12 such as operating system software. Of course other types of storage including solid state storage such as a FLASH card may be used. The hard drive 42 also has a web browser software program 44 which creates a display of data from the network 14 on a display 46. The display 46 may be a CRT, LCD or other type of video display. The web browser program 44 is capable of running Java Applets such as Microsoft Internet Explorer or Netscape Navigator. However, any software may be used in conjunction with an internet connectable device as long as it is capable of receiving and running the programming object which is sent by the server program 22 on the application server 16. The user may manipulate data or request data based on the received data from the programming object on the display 46 via input devices including a keyboard 48 and a mouse 50.

The client computer 12 sends a request over the network 14 to the application server 16 for specific sets of data from one of the data sources 32, 34 or 36. The request is received by the server program 22 in the application server 16 which finds the appropriate data source containing the requested sets of data. The server program 22 interprets the request from the client computer 12 by using an appropriate data source interface to translate the request which is compatible with the data sources. For example, the data interface 26 formulates a request to the database 32 in a database query language such as SQL. The data interface 30 loads the requested data from the flat file data source 36. It is to be understood that an appropriate data source interface may be developed to translate the data from any variety of data sources. The application server 16 can provide data to multiple client computers such as the client computer 12 and is capable of being linked to multiple data sources of different types.

Via different data source interfaces, the application server 16 allows the query for data to be made to a variety of database programs and data formats. Additionally, since the queries for data to the application server 16 are in a standard Internet protocol language such as http, the programming object is suitable for world wide web deployment as in this example. Additionally, only a subset of the data accessible by the application server 16 may be made available to the client computer 12. Access to different data from different data sources may be granted for different users. The actual data sources such as the relational database 32 may be located behind a firewall 52 which protects the relational database 32. Queries executed by multiple client computers are cached in a memory cache 54 which is accessible by the application server 16 thus increasing the responsiveness and decreasing the load on the data sources.

Figure 2A:
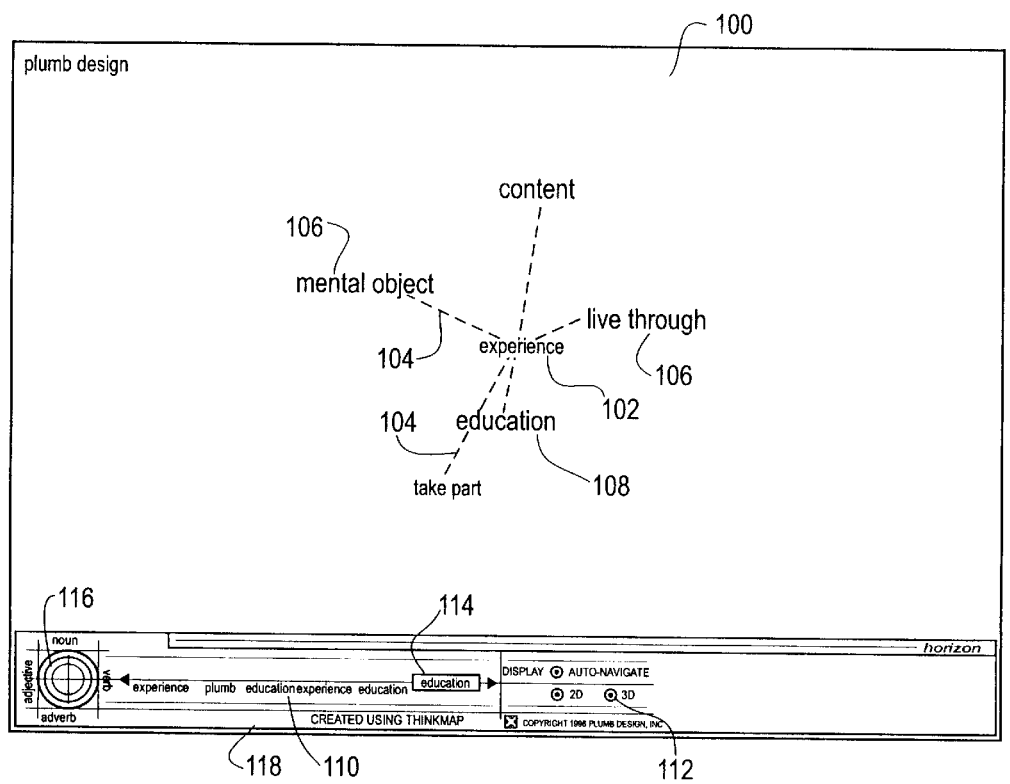
FIGS. 2A and 2B are screen prints a web type visual presentation of data from a data source using the visual presentation system.

FIG. 2A shows an example of a screen display 100 showing a graphical representation of sets of data requested from a data source managed by the application server 16. The requested data is assembled and transmitted by the application server 16 and the presentation program 22 to the client computer 12.

Figure 2B:
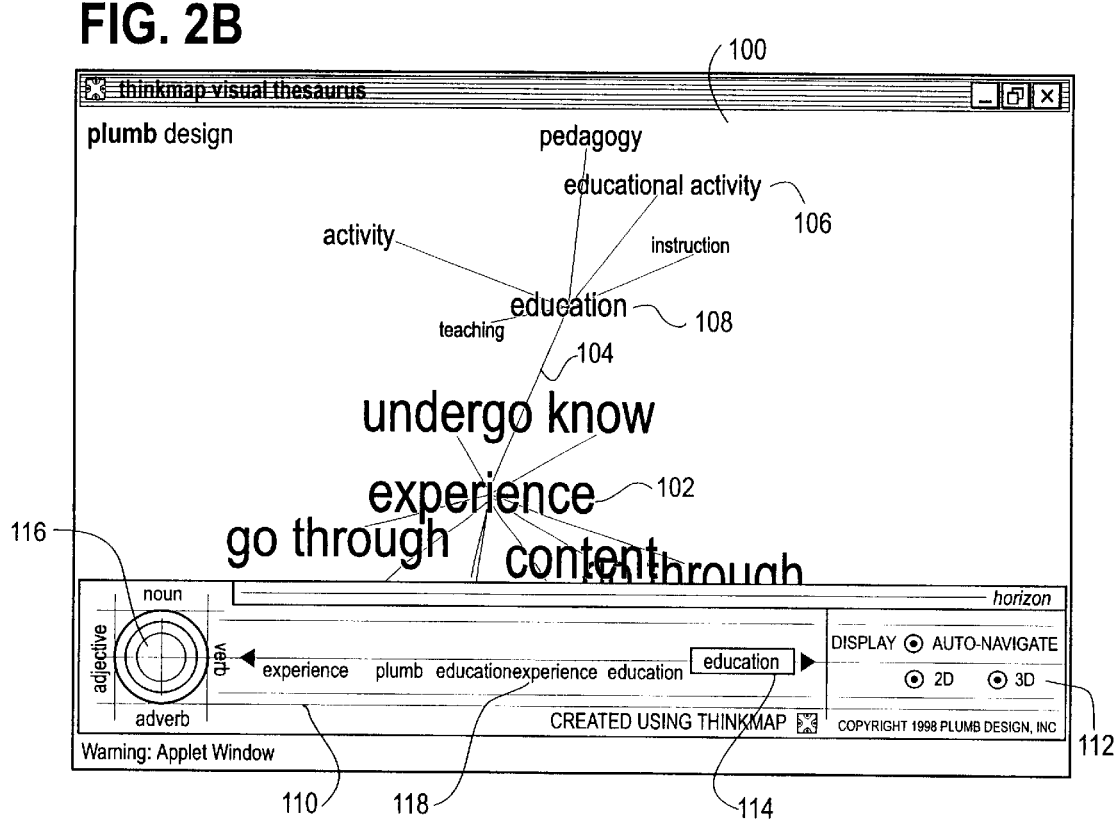

In this case the data is a visual thesaurus which relates selected words to their synonyms. Different data records may be displayed according to the user input devices such as the mouse 50 or the keyboard 48. A data record 102 is highlighted and rendered in the center of the display 100. The data record 102 in this example is the word, "experience." A variety of lines 104 represent the relationship or links between the center data record 102 and other data records 106, which are words related to the selected word "experience." Additional information may be displayed by choosing another data record 108 representing the word "education." The selection of the data record 108 results in the display shown in FIG. 2B. In FIG. 2B, the data record 108 is now rendered in the center of the display 100. The other data records 106 including the data record 102 are shifted to be displayed around the data record 108.

The display 100 also includes additional display controls in a bottom menu bar 110. A 2D-3D toggle switch 112 allows a user to change the display 100 between a two-dimensional perspective to a three-dimensional perspective. A horizon slider control 114 allows a user to determine how closely the related data records 106 are displayed around the centered data record 102. A joystick icon 116 allows a user to display the relationships between the data records 106. In this case, the joystick icon 116 allows a user to preference the word by a particular part of speech i.e. verb, noun or adjective. A display bar 118 lists the data records 106, in this case words, which have been centered.

Figure 3:
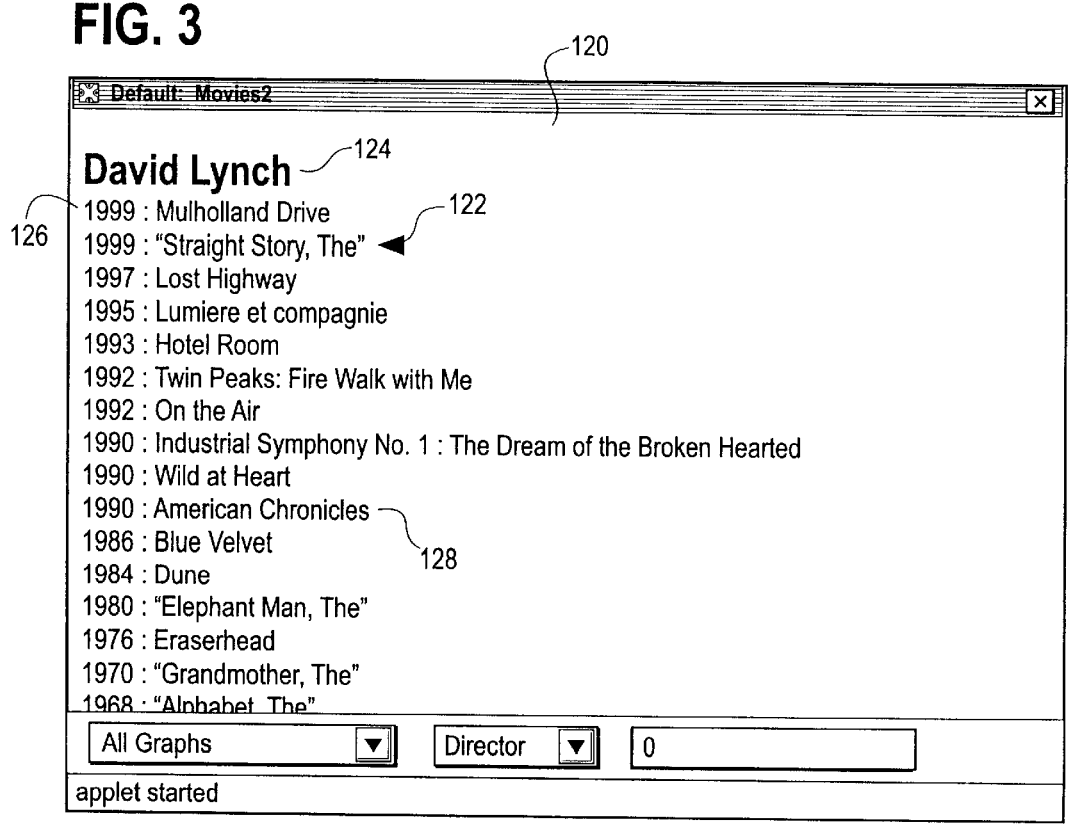
FIG. 3 is a screen prints of a bubble type visual presentation of data from a data source using the visual presentation system.

A second type of display 120 which could be rendered using the presentation program 22 is shown in FIG. 3. The display 120 is a bubble type display which shows a list of items 122 related to a main item 124. In this example, the items 122 are movies and the main item 124 is a director. The items 122 each have a date listing 126. The items 122 are sorted by the date listing 126. A list item 128 is highlighted when the mouse cursor is passed over it and may cause a window with further information about the list item to be displayed when a user selects it.

As will be explained below, multiple displays and graphics which represent data may be authored which differ from those shown in FIGS. 2A, 2B and 3. It is to be understood that other forms of remote data transmission protocols other than TCP/IP and http may be used. Additionally, the data source and presentation program may all reside on the client computer to provide presentation of the data in the data source to the client computer user thus eliminating the need for a network system.

II. The Programming Object

Figure 4:
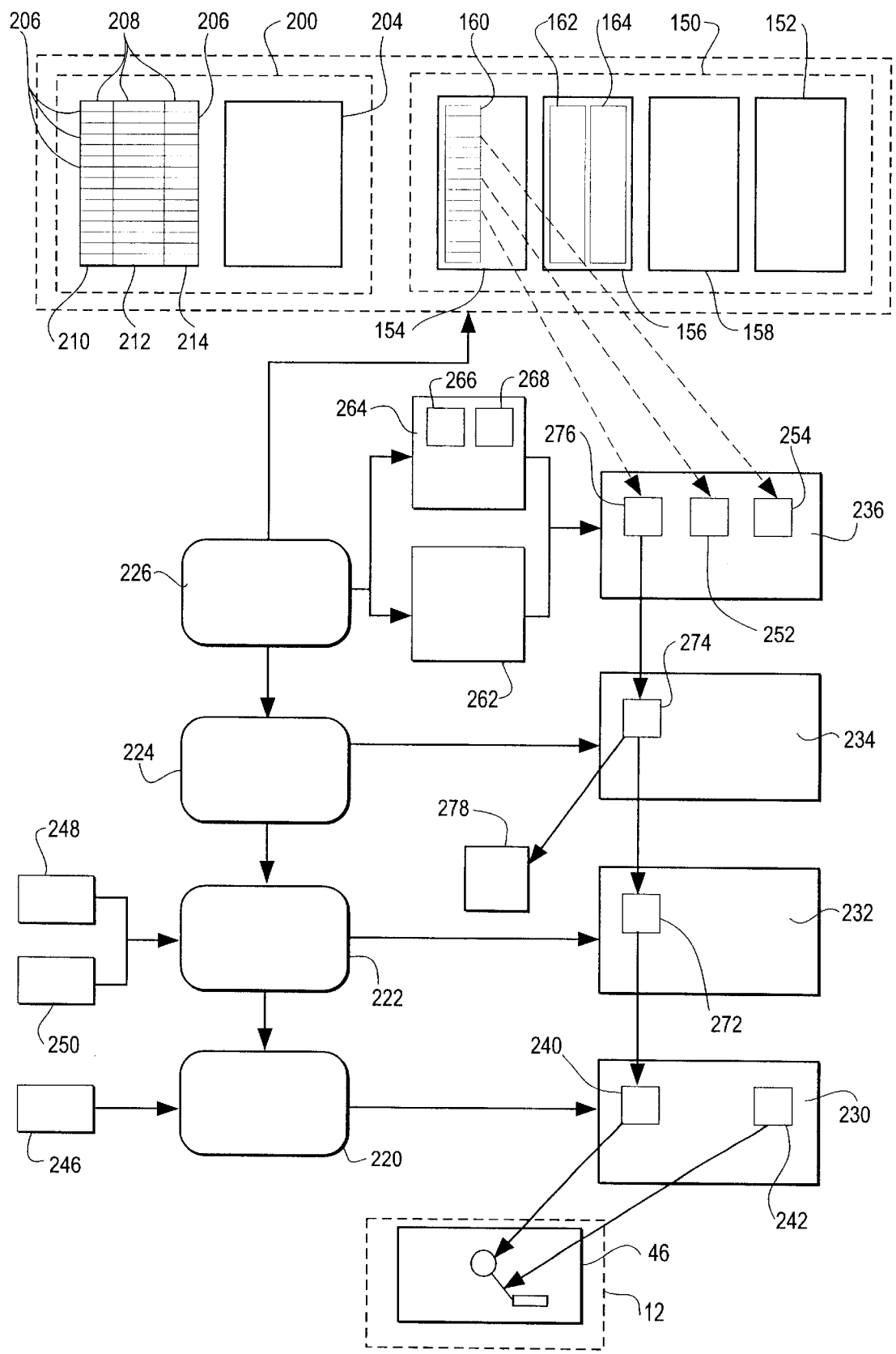
FIG. 4 is a diagram of the components of a programming object which produces the visual presentation.

FIG. 4 shows the organization of a Java applet sent by the server program 22 in FIG. 1 which is sent to the client computer 12 for purposes of displaying the graphical representation of the requested data from the data sources 32, 34 and 36 for display on the display 46. One embodiment of the Java Applet is a Thinkmap and one embodiment of the server program 22 is the Thinkmap Server program both sold by Plumb Design. The server program 22 on the application server 16 loads the Java Applet which is the programming object representing the requested data. The programming object is written by an authoring program. An example of the authoring program is the Thinkmap Studio developed by Plumb Design.

The programming object sent to a client computer has three main building components, entities, managers, and properties. As will be detailed below, managers are programming objects which create, destroy and manage entities. Entities are a generic term for objects which contain a set of different properties and are used to represent data from the data source for display. Properties are characteristics of entities which must be requested and provided from entities, managers or data sources.

A. Data Sources

As an example the Thinkmap program allows retrieval and presentation of data from a data source such as a relational database 150 or a flat file table 200. In this example, the relational database 150 has a collection of data tables 152 which contain information about movies. The relational database 150 has two node tables 154 and 156 and an edge table 158. The node table 154 contains a list of directors 160 while the node table 156 has a list of movies 162 and a list of years 164 when the corresponding movies were made. Each node table 154 and 156 may contain related data such as a first and last name of the directors and lead actors relating to the listed movies. The edge table 156 defines the relationship between directors and movies.

The same data may be stored in the flat file database 200 which has two data tables 202 and 204. The flat file table 202 has a set of rows 206 which are different data records and columns 208 which contain categories of data associated with each data record. Thus the flat file data table 204 has a number of data records in rows which contain a director's first and last name which are separated by a text delimiter symbol. The table file 204 has a movies column 210, a director column 212 and a year column 214. As should be understood, the data source may be any type of organized computer data such as a relational database file, spreadsheet file, word processing file, etc., assuming the proper interface is provided.

B. Managers and Entities

A manager is a programming object that creates, destroys and manages sets of entities. There are four kinds of managers: a display manager 220, a position manager 222, a graph manager 224 and a source manager 226, in the applet created by the authoring program as shown in FIG. 4. Each manager 220–226 handles a different kind of entity, the display manager 220 handles display entities 230, the position manager 222 handles position entities 232, the graph manager 224 handles graph entities 234 and the source manager 226 handles source entities 236.

The four types of entities, display entities 230, position entities 232, graph entities 234 and source entities 236, have different functions in the representation of data from the data source 200. The display entities 230 determine the presentation and position of the data which is displayed on the screen of a display such as display 46 in FIG. 1 or the screens shown in FIGS. 2 and 3. The position entities 232 determine the position of the data in global space relative to each other. The graph entities 234 determine potential data which may be displayed to a user. The source entities 236 determine the data which may be derived from a data source such as relational database 150.

The managers 220–226 are arranged in parent/child relationships as shown in FIG. 4. The position manager 222 is the parent of the display manager 220. The graph manager 224, is the parent of the position manager 222. The source manager 226 is the parent of the graph manager 224. Similarly, an entity handled by the position manager 222 is the parent of an entity handled by the display manager 220, an entity handled by the graph manager 224 is the parent of an entity in the position manager 222, an entity in the source manager 226 is the parent of an entity in the graph manager 224, and the data source is the parent of its corresponding entity in the source manager 226.

Both the managers and entities have properties which are specific characteristics of the entities or the entities managed by the managers. The properties may be derived from the relational database 150 such as the name of a movie, the year of the movie from the node table 156 or the name of the director from the node table 154. However, not all of an entity's properties are received from the data source. The authoring program also allows a user to define properties for the managers and entities. As will be explained below, the author of the data representation may also set up inherent properties.

1. Display Manager and Entity Functions

In an applet created by the authoring program for display of data from the data source, the display manager 220 creates and manages display entities 230 such as entities 240 and 242 shown in FIG. 4. The display manager 220, together with the display entities 230 such as display entities 240 and 242, represent data from the relational database 150 in graphical format in the space of the onscreen display such as the display 100 in FIG. 2A. The display manager 220 also is linked to the position manager 222 for purposes of managing related entities. The display manager 220 provides interactivity with the user of the client computer 12 by detecting user actions through input devices such as the mouse and keyboard. The display manager 220 also monitors the display entities which control objects which are rendered on the display.

The display manager 220 uses different display entities which draw screen objects in different ways to complete the screen display 46 in FIG. 4. For example, a display entity such as the display entity 240 may cause a circle or another geometric shape to be rendered and a separate display entity such as display entity 242 may cause a line to be rendered. In a representation displaying relationships between data items, the display entities define the graphic representation of the data items and the relationships between the items on the display. A data record may have numerous different display entities to represent itself on the screen. For example, one display entity showing a relationship may be a line entity which draws itself as a line such as the lines 104 between data 106 as shown in FIG. 2A.

The display entities can include a Generic Display entity, Label entity, Circle entity. Rectangle entity, Image entity, Icon Label entity, Line entity and other entities. The Generic Display entity handles those properties which are common to all display entities 230. The Generic display entity has a Background Color property which determines the background color of the screen. The Generic Display entity also has a Color property which determines the color of the graphic of the entity and an IsInteractive property which determines whether the graphic entity will respond to mouse actions. The Generic Display entity also includes IsMouseOver, IsMouse Down and IsMouse Drag properties which determine the actions of the mouse in relation to the entity. Finally, the Generic Display entity contains a ScreenPosition property which represents the entity's position in the screen space.

The Label entity draws itself on the screen as a text label. The Label entity requires a Label property which controls the text string displayed and a Font property which controls the font in which the text label will be drawn. The Label entity also requires HorizontalAlign, VerticalAlign and Baseline properties which control the horizontal, vertical and relative alignment of the text in the box.

The Circle entity draws itself on the screen as a circle. It requires a Radius property which controls the radius in number of pixels and an IsFilled property which is a boolean value controlling whether the circle is filled. It also requires Minimum3DRadius and Maximum3DRadius properties which determine the minimum and maximum radius in pixels of the circle when presented in 3D mode.

The Rectangle entity draws itself on screen as a rectangle and requires a RectangleWidth property which determines the width in pixels, a RectangleHeight property which determines the height in pixels and an IsFilled property which determines if the rectangle is filled.

The Image entity draws itself on the screen as an image. The Image entity requires an Image property which controls which image is drawn and is the URL of the image being used. The Image entity also requires an ImageBorder entity which controls the thickness of the border around the image in pixels.

The Line entity draws itself on the screen as a line between a source and a sink object which can be other entities such as Image entities, Circle entities etc. The Line entity requires a Source property which controls the value of a source object and a Sink property which controls the value of the entity's Sink object. The values of the Source and Sink properties are the entities which are the source and sink objects. An IsArrow property is a boolean value which controls whether an arrow will be rendered on the sink end of the line.

The display manager 220 functions with the assistance of display manager plug-ins 246. The display manager plug-ins 246 govern the ways the display entities 230 react to user manipulation of screen objects through the user inputs such as the mouse 50 or the keyboard 48 shown in FIG. 1. Examples of display manager plug-ins include the following.

An Auto Scale plug-in adjusts the way a position entity s location in global space is translated into screen space by sizing the representation to the screen size. An Auto Origin plug-in allows a user a range of options to control the way the position manager's center is translated into screen space.

A Center Entity Behavior plug-in allows a user to recenter the representation by clicking on a displayed entity or a node such as data records 106 in FIG. 2A. The Center Entity Behavior plug-in has two required properties. The first is an IsCenterable property which determines whether a selected entity may be centered. The second is a Drag Distance property which controls the threshold distance beyond which an entity may be considered selected within the screen.

A Drag Entity plug-in, when applied to the display entities, permits the entity to be draggable on the screen. The Drag Entity plug-in requires an IsDraggable property which is a boolean value determining whether the entity may be dragged and a DragDistance property whose value is the distance in pixels that the entity has been dragged. The DragDistance property is reset when the entity is dragged and released.

A JavaScript Behavior plug-in allows a user to translate mouse events into script events in a Java enabled browser program. The JavaScript Behavior manager plug-in requires seven properties in a selected entity. The MouseOverJavaScript and Mouse OutJavaScript properties control the JavaScript code executed when the mouse cursor is either over or not over an entity. The MouseDownJavaScript and MouseUpJavaScript properties control the Java Script code executed when the mouse cursor is either clicked on or off. The SetCenter JavaScript and UnSet Center JavaScript properties control the code that is executed when a new center is set or unset. The MouseDragJava Script property controls the JavaScript executed when the mouse cursor is being used to drag an entity.

A Rotate Behavior plug-in allows a user to rotate the representation of the entity in three dimensions by dragging the on screen representation. The Rotate Behavior plug-in requires an IsRotatable property which is a boolean value determining whether the representation may be rotated. Different options may be customized by setting maximum speed properties, mouse button properties or modifier properties to enable speeds and user devices to control the rotation.

A Scroll Behavior plug-in allows a user to reposition the representation within the screen by dragging. The Scroll Behavior plug-in has one required property, IsScrollable, which is a boolean value determining whether the representation may be moved on the screen. Different options may be customized by setting maximum speed properties, mouse button properties or modifier properties to enable speeds and user devices to control the motion.

A Show Document Behavior plug-in allows a user to create URL links to different web sites and to display a frame for the returned content. The returned content may be a web site which may encompass all or part of the screen for the graphical display. This plug-in requires a DocumentURL property of the website displayed in the frame. The plug-in also requires a FrameName property which controls the name of the frame where the content will be displayed on the screen.

A ThinkmapChronology plug-in allows a user to format the representation as a timeline as shown in the bubble map in FIG. 3. A Track Center plug-in causes the center of the representation to be located in the center of the display area. The Track Center plug-in has a Smooth option which when selected allows either the transition from one center to another to be smooth or abrupt.

The display manager 220 also manages a number of options for each of the display entities 230. These options include Three-Dimension, Background, Paint Order and Scale Setting. The Three-Dimension option allows a user to toggle display of entities in either three dimensional space on the screen as shown in FIGS. 2A & 2B or two-dimensional space as shown in FIG. 3. The Background options allows a user to control the background image which may include a URL, a vertical alignment of the background, a horizontal alignment, tiling horizontally of the background and tiling vertically of the background. Additional properties and options determine the colors of the foreground, the background and the formatting of the text font for the nodes of data on the screen. The Paint Order options determines the order that items such as nodes 102 or lines 106 in FIG. 2A are rendered on the screen. The Scale Setting property adjusts the way a position entity's location is translated into screen space. The scale of 1 unit of global space translates into 1 pixel of screen space on the X, Y and Z coordinate access. When the representation is displayed in two dimensions, the Z coordinate property value from the position entity is ignored.

An Origin setting describes the transformation that is applied when translating the position space of a position entity to the display space on the screen. A Global Offset setting describes the transformation that will be applied to every entity's position before it is rendered on the display. The Center of Rotation setting sets the point in global space around which the overall display of the requested data will rotate.

2. Position Manager and Entity Functions

The position manager 222 creates and manages position entities 232 which map entities in global space as opposed to the screen space shown on a screen. A position entity has properties that allow the programming object to position and move it in three-dimensional global space. Although position entities do have X, Y and Z coordinates, the three-dimensional space containing the coordinates is not bounded and has no real dimension or scale. The position manager 222 is also linked to the graph manager 224 to manage common entities.

The position entities 232 include Generic Position entities, Generic Position Node entities and Generic Position Edge Entities. The Generic Position entities handle properties which are common to all position entities 232. The properties include an IsFixed property which controls whether an entity's position is fixed, a Lifespan property which provides the amount of time an entity remains once it is deleted, a GlobalPosition property which provides the location in global space, a Size property which provides the size of the entity and a Delta property which provides the distance the entity moved in the previous frame.

The Generic Position Node entities have the same required properties as the Generic Position entities. The Generic Position Edge entities represent an Edge which is a relationship between two position nodes termed a source node and a sink node. The Generic Position Edge entity has two required properties, the source property which specifies the source end entity and the sink property which specifies the sink end entity connected by the Edge.

a. Layout Plug-Ins

To set the positions of entities, the position manager 222 uses a group of layout plug-ins 248. The layout plug-ins 248 are routines which dictate the position of a position entity in global space. The layout plug-ins 248 are activated at the moment a position entity is created and assign the entity's initial coordinates. The layout plug-ins require a condition property which allows a user to set a condition under which the layout will be applied. The layout is then applied to all entities where properties satisfy the condition.

The programming object contains a number of layout plug-ins, the most simple of which is termed a Random layout plug-in which picks a set of coordinates at random and assigns them to a position entity. The Random layout also requires a Scale property which defines the dimension of the bounding box in global position units.

Another layout plug-in is the Date Layout plug-in which allows display of entities by date order. The Date Layout plug-in requires Date, DateOrientation and Date Intercept properties. The Date property is a value which controls the location of the entity on a time line. On a horizontal layout, the Date property will provide the X coordinate, while on a vertical layout the Date property will provide the Y coordinate. The DateOrientation Property determines whether the entities will be laid out in horizontal or vertical form. The DateIntercept property controls the X or Y coordinate at which the entity will intersect the timeline.

Another layout plug-in is termed an Absolute layout which assigns an absolute location for each entity. Layout plug-ins may be combined for an entity and may be applied to only selected entities which are rendered in global space. A final layout is the RightAdd Layout which positions each new position entity which is created by the position manager 222 to the right of the entity that was created before it.

b. Informotion Plug-Ins

If a presentation of data requires motion of entities, the Position Manager 222 uses a group of informotions 250. An information is a plug-in routine which describes any of a number of settings that give motion to the position entity being displayed. Unlike the layouts 948 which determine a position entity's location in global space only at the moment of creation, an information is updated many times per second and affects the position entity for as long as it resides in the position manager 222. The programming object allows a user to apply as many informotions as needed. When more than one information is applied, the entity's motion onscreen will be the sum of the informotions applied to it. The position manager 222 has a frames-per-second property for each position entity which determines the number of times per second that the position manager 222 will update the positions of entities to which informotions are applied. Informotions may also have a condition property which determines the set of position entities to which it applies.

One information is the Bubble Motion information which lines entities up in a row in an order defined by a sorting criteria. This information uses smooth movement motion for each entity which makes it appear that the entities are bubbling up to their respective positions. The axis along which the entities will be aligned, the buffer distance between the entities and the distance between the first entity and the origin are user selected. Additionally, the user can set a Sort property which defines the property by which the entities are sorted.

Another information is Collision which determines if entities have collided by occupying the same set of coordinates. This information provides a Collision property which is set to a boolean TRUE when a collision occurs. Another information is the Elastic Motion informotion which prevents edges from exceeding a defined length. Applying this informotion to entities requires a EdgeLength property and an Elasticity property. The Edge Length property controls the length of the edges while the Elasticity property controls the amount of force that is applied to keep Edges at a defined length. The lower the value, the faster the return of an Edge to the proper length.

A Limit Motion informotion allows restriction of the movements of entities. The user can clamp the position entities to points in the X, Y or Z planes. The user may also limit the speed that the entity is moving in any of the three planes. Another information is the Magnet Motion informotion which causes entities to move as if they are being repelled by each other. The user may set a magnetism factor which determines the degree of repulsion between entities. A Perturb Motion information produces the visual effect of small and constant agitation. The Short Range Motion information introduces magnetic repulsion between entities within a definable range. A Text Protect informotion insures that text entities do not overlap. A Viscous Motion information adds resistance to the movement of entities and requires a Weight property to control the weight and thus the rate of decay of an entity. Other informotions may be written to give entities motions which are governed by the position manager 222.

Both layouts and informotions can be applied conditionally through their respective condition properties, such as running the layout or information only if an entity meets a certain user-specified condition. The capacity to apply multiple layouts and informotions, and to apply them conditionally, allows the user to exercise a high degree of control over the creation of complex screen displays.

3. Graph Manager and Entity Functions

The graph manager 224 creates and manages graph entities by defining the conceptual relationship between entities and decides which entities are relevant to the requested data from the user. The graph manager 224 manages Generic Graph entities which are used to compute simple traversals from a center entity and Threshold Node entities and Threshold Edge entities which are used for more complex traversals. The operation of these entities requires them to have the Center property which is used to determine which entity is at the center of the graph. The graph manager 224 also provides an IsVisiting property which is sets to a boolean value of TRUE when the graph manager 224 is in the process of examining entities. The Generic Graph entities also require an IsTerminal property which controls whether the traversal of the graph continues or terminates at the entity. An IsPostTerminal property determines whether the entity remains in the graph and is evaluated after the IsTerminal property is evaluated. The Depth property indicates the number of times the traversal moves away from the center entity. The Prev property is the entity which was previously visited in the traversal.

Figure 5:
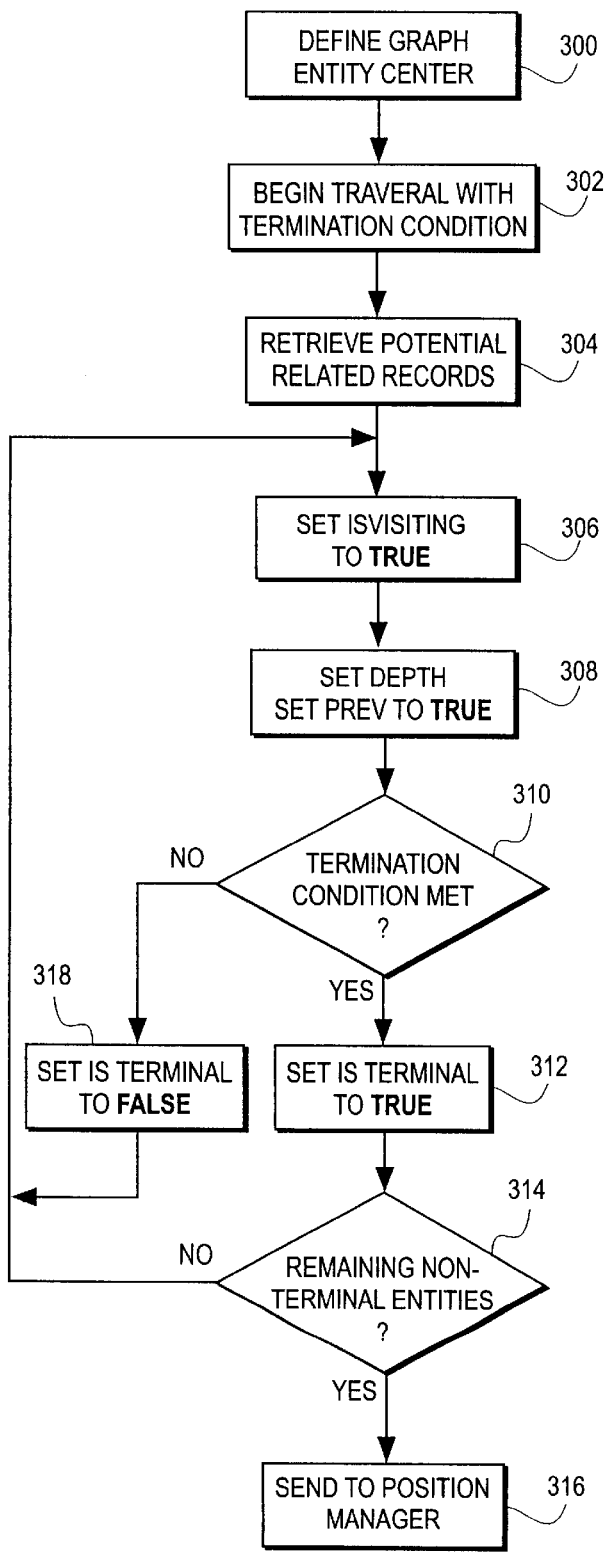
FIG. 5 is a flow diagram of the process by which the graph manager of the programming object selects entities.

The graph manager 224 determines the location and relationship of possible entities for the representation on the display 100 by traversing potentially related entities. This set of determined entities is a graph. The steps of the traversal process are shown in FIG. 5. The graph manager 224 first defines a graph entity as a center entity in step 300 by setting the Center property to TRUE. The user instructs the graph manager 224 to begin a traversal using a termination condition to determine the entities which are related to the selected center entity in step 302 for the purposes of the graph. The graph manager 224 then requests that the source manager 226 retrieve all entities that could potentially be related to the center entity in step 304 according to the termination condition. The source manager 226 returns the potentially related entities and the graph manager 224 examines the collected entities. The graph manager 224 does this by using the center entity as the starting point and visiting all the graph entities which may be related to the center entity.

The graph manager 224 first sets the IsVisiting property to true in the related entity in step 306. The graph manager 224 then assigns a value to the Depth property reflecting the relation to the center entity and assigns a value of true to the Prev property in step 308. The graph manager 224 then determines whether the entity meets the termination condition in step 310. If a termination condition is met in step 310, the program adds the entity to the collected entities meeting the termination conditions by setting the IsTerminal property to true in step 312. The graph manager 224 then determines whether there are any entities which do not have the IsTerminal property set to false in step 314. If there are still entities which are not terminal, the graph manager 224 will go back to step 306 to examine the next entity. If all the entities are terminal, then the graph manager 224 will end the traversal and send the collected entities to the position manager in step 316. If the termination condition is not met in step 310, the graph manager 224 sets the IsTerminal property to false in step 318 and goes back to step 306 to examine the next entity.

In such a manner, the graph manager 224 continues through all the related entities and considers all the entities that are potentially related to them, and again determines which entities are in fact related in steps 306–310 until all termination conditions are met. The selected entities are then sent to the position manager 222 in step 316 to be positioned in the global space and the display manager 220 to be displayed in graphic format on the display 46.

In a simple traversal, the user controls the "depth" of the traversal which is the number of times the traversal moves outward from the center entity. The termination condition thus will include all the entities which are either directly related to the center entity or indirectly through another entity to the depth level. A deeper traversal means more entities will be selected and consequently more data entities will be handed to the position manager 222 to be potentially positioned in global space. Accordingly, more entities will be handed to the display manager 220 for display onscreen.

Figure 6A:
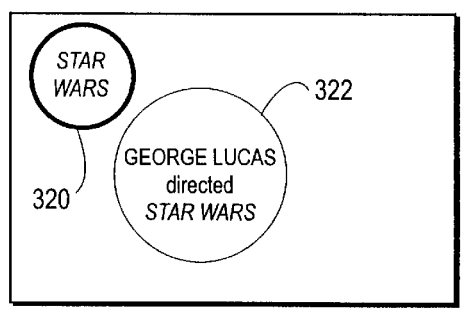
FIG. 6A–6D are diagrams of entities obtained by the process in FIG. 5.
Figure 6B:
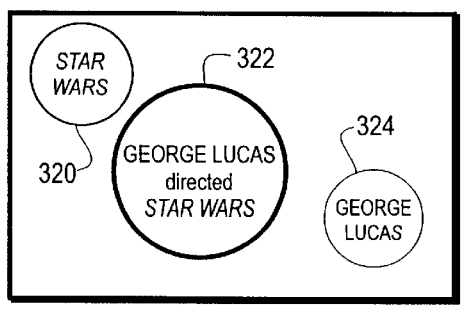

As an example of a simple traversal, the graph manager 224 may set the graph entity representing the movie Star Wars as a center and set the traversal depth to 4. This results in the graph manager 222 moving away from the center entity four times, selecting entities related to StarWars, then selecting entities related to those entities, and finally entities related to those entities. FIGS. 6A–6D are diagrams showing this process for the relational database 150. FIG. 6A shows the first level of traversal which selects only entities that show a relationship between a center entity 320 named Star Wars and another related entity 322. In FIG. 6B, the single related entity 322 is returned representing the fact that George Lucas directed Star Wars.

Figure 6C:
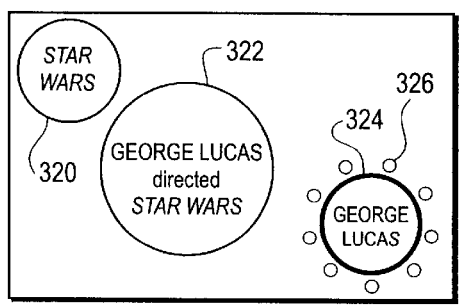

FIG. 6B shows the result of a second level of traversal which starts at the entity 322 that was returned in FIG. 6A. The graph manager 224 considers all entities that might be related to the entity 322 and returns a single entity 324, representing a director, George Lucas. FIG. 6C shows, the third level of traversal which starts at the George Lucas entity 324 and returns a group of nine entities 326. Each of the entities 326 represents the fact that George Lucas directed a movie (other than Star Wars). This information may be drawn from another data record in the data source 150.

Figure 6D:
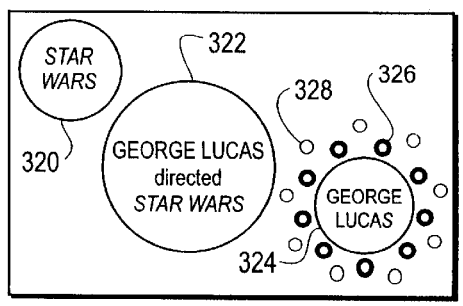

FIG. 6D shows the fourth level of traversal which returns a group of nine entities 328 representing nine other movies directed by George Lucas (Phantom Menace, THX 1138, American Graffiti, etc.). If the traversal depth was greater, a subsequent level of traversal would have returned related data to the nine entities 328.

More complex traversals may be performed by the graph manager 224 using ThresholdNode and ThresholdEdge entities. The ThresholdNode entity represents nodes in a graph based on a network flow. This entity provides a FlowFactor property which signifies the volume of information flowing through the node. The Theshold Edge Entity represents edge entities related to each other in the graph based on network flow. This entity requires a Source property and a Sink property which specify the Source and Sink ends of the Edge. These entities also require a ForwardCapacity and BackwardCapacity properties which control the capacity of the edges to transfer information flow in either a forward or backward direction based on the current configuration of the network. The entity is also provided with a ForwardFlow- Factor and a BackwardFlow Factor which signifies the volume of flow through the edge in a backward and forward direction. In the case of a network traversal, the relations between nodes is not defined simply by the levels of related nodes but by the volume of data flow between the nodes.

4. The Source Manager and Entity Functions

The source manager 226 interfaces with the data source such as the relational database 150 or the flat data file 200 usually located on a remote site from the client computer 12 in FIG. 1. The source manager 226 provides the programming object with a virtual view of the data source by only creating source entities for data necessary for the graphical representation. Because the programming object may not be able to load the entire contents of a data source 200 to the client computer 12, the source manager 226 is used to dynamically load the data on demand from the client computer 12.

When the programming object needs an item from the data source, it instructs the source manager 226 to obtain it from the data source. The source manager 226 constructs a source entity such as source entities 252 and 254 to represent the data item. In FIG. 4, the source entities 252 and 254 represent items in the data table 154. The source entities 252 and 254 inherit the properties of the data items.

The source manager 226 allows the other managers 220–224 to operate independently from the type of database or data being brought into the programming object from the data source 200. In keeping with its function of streamlining the amount of information that the programming object has to handle at any given time, the source manager 226 is also responsible for periodically purging unneeded source entities.

Returning to FIG. 4, the architecture of the source manager 226 includes source entities 236 and two sublevels, a entity type sublevel 262 and a type collections sublevel 264. Each entity type in the entity type sublevel 262 contains entities which have common properties such as movie entities from the table 154 or director entities from the table 156. In turn, each entity type belongs to a type collections 264 which includes entity types having common properties. For example the type collections 264 include a nodes entity type collection 266 containing the entities types which are nodes and an edges type 268 containing the entity types which are edges defining relationships between items in the relational database 150.

The data records in the relational database 150 in this example are the basis of all entities such as Graph Entities. Position Entities or Display Entities. These entities represent either a movie from the table 154, a director from the table 156 or a relationship between a movie and a director from the table 158. Thus, MOVIE, DIRECTOR and MOVIE_ DIRECTOR are the three Entity Types in this example. These Entity Types are themselves subject to a further level of classification into node and edge entities such as edge entity type 266 and node entity type 268. Two of the Entity Types, MOVIE and DIRECTOR, are nodes which represent pieces of data that are not explicitly related in the relational database 150. The third Entity Type, MOVIE_DIRECTOR, is an edge which represents a data item that makes an explicit relation between other items in the database. Thus MOVIE and DIRECTOR are Entity Types belonging to the Nodes Type Collection 268, and MOVIE_DIRECTOR is an Entity Type belonging to the Edges Type Collection 266.

The user sets property values for nodes and edges by using the entity type and type collection sublevels 262 and 264 in the source manager 226. A property value set on the entity type sublevel 262 will be passed to all the entities belonging to that entity type. For example if the user were to set the value of the color property to Blue on the MOVIE Entity Type, each movie entity in the property chain would be displayed in blue because the chain of property requests defining it, as will be explained below, would always intersect the property value Blue in the Entity Type. Similarly, if the color property value were set to Red on the nodes type collection 266 (containing movies and directors), all movies and directors would be displayed in red. If a color property value of Blue was set on the Entity Type and a color property value of Red was set on the Nodes Type Collection, entities representing movies would be displayed in blue and entities representing directors would be displayed in red.

The source manager 226 manages Generic Source entities which are used to construct source entities 236. The Generic Source entities provide an EntityID property, an Entity-TypeID property and a TypeCollectionID property. The EntityID property is the entity's ISourceEntity ID which is a unique identification which may be used to locate the entity in the data source. The EntityTypeID property is the entity type while the TypeCollectionID property is the name of the type collection of the entity.

A property chain is a sequence where requests for values of properties are made and the values are provided by the managers 220–226, the entities 230–236 or the data source. The property chain sequence allows a user to define properties of entities for the ultimate purpose of displaying requested data on the screen 46. The requests for properties are made along the chain of managers from the display manager 220 to the position manager 222 to the graph manager 224 to the source manager 226 and finally to the data source 200.

C. The Property Chain Process

FIG. 7 is a flow diagram showing the property chain process conducted by the data presentation program 22 to obtain a requested property value for an existing entity. The property chain process also uses mapping of attributes to a given property. The property chain process in FIG. 7 will be explained with reference to the example of the display entity 240 which represents the display of a circle on the screen 46 in FIG. 4. The display entity 240 resides in the display manager 220 and requires a value for a radius property to render the circle on the display 46.

In this example, the display manager 220 handles the display entity 240. Because the display entity 240 is a circle entity, the display manager 220 handles the entity by rendering a circle on the screen 46. The software proceeds to request needed property values for the entity via the property chain process shown in FIG. 7. In the case of a circle entity such as the entity 240, a radius property value is required to render the circle on the display 46. In step 330, the program inquires whether the display entity 240 has a value for the radius property. If the display entity 240 has a radius property value, the properties of the circle entity is used by the display manager 220 and rendered on the screen display 100 in step 332. If the display entity 240 does not contain a radius property value, the request moves to the next level in the chain in step 334.

The request for the required property value is next made to the display manager 220 in step 334. If the display manager 220, like the display entity 240, does not contain the required property value, in this case the radius property value, the request moves to the next level in the chain in step 336. The request for the needed property value is then made to the display entity s parent entity, in this case a position entity 272 in step 336. If there is no response from the position entity 272, the query is made to the position manager 224 in step 338. If either the display manager 220 in step 334, the position entity 272 in step 336 or the position manager 222 in step 338 has the needed property value, the program proceeds to step 332 to use the property value with the display entity 240.

If the property value is still not found, a request is then made to determine if a graph entity 274 which is the parent of the position entity 272 has the requested property value in step 340. The request for the needed property value is next made to the graph manager 224 in step 342. If the graph manager 224 or the graph entity 274 does not contain the required property value, the request moves to the next level in the chain in step 344. The request for the needed property value is then made to the parent entity of the graph entity 274, in this case a source entity 276 in step 344. If there is a value for the property in the source entity 276 in the step 344, or the graph entity 274 in step 340, or the graph manager 224 in step 342 has the needed property value, the program proceeds to step 332 to render a circle using the found property value.

If the property value is not located in step 340, the program then searches the data source 200 in step 346. If the property value is not located in step 346, the program searches the entity types 262 and type collections 264 which have an active role in the property chain. As explained above, a property request is made first of an entity, and if the entity does not have the property value, it is made of the manager. In the source manager 226 if the data source does not have the property value, the request next goes to the entity's entity type 262 in step 348. If the property value is not found, the request is passed to the entity's type collection 264 in step 350. If the type collection 264 doesn't return the property value, the source manager 226 itself is asked to respond in step 352.

The query is made to the source manager 226 in step 352. If the property is found in either the entity types 262, type collections 264 or source manager 226, the program proceeds to step 332. If the property value is not found then a null value is returned preventing the rendering of the entity in step 354. Alternatively, the appropriate manager or entity requesting the property value may provide a default value.

For example, a property request seeking a movie's display color would be satisfied when it reached the entity type 262 and would travel no further if the entities of that entity type contained the common property of blue in step 346. A request for a display color for an entity representing a director, however, would not be satisfied until it reached the red property on the nodes type collection 264 in step 348.

D. Mapping Properties

The program provides a mapping function which changes the flow of a property request down the property chain. The use of maps provides flexibility of the program to interpret new property requests to find known properties. In this example, the map function translates a request for a property value such as the radius property which does not exist in the data source such as relational database 150 to a property which exists in one of the managers, entities or data source. The program allows the naming convention for the data source to differ from the naming convention of the properties required by the entity.

Simple maps may change the format of data presentation such as changing a color, text font, or text type. A map may also be a function which allows properties to be combined or selectively applied. For example, a map may allow the addition of certain text or provide a mathematical condition or formula for the application of a property value such as addition, subtraction, multiplication, division, logarithms, and logical operations.

Other maps may be more complex. For example, a map may apply the above mentioned changes upon a condition. The maps may return different characteristics such as a URL map which returns a URL object and is written as URL (baseString+locatorString). The baseString variable evaluates the URL base while the locatorString is a file name of the resource being located.

Maps are contained in any of the four managers 220, 222, 224 or 226. For example, in FIG. 4 a map 278 exists in the graph manager 224. The map 278 changes a request for a radius property to a request for another defined property, such as salary data of a director in the relational database 150. The request for a radius property would be offered before the inquiry to the graph manager in step 342. Thus, after the request for the radius property has been made to the position manager 222 in step 340, and before it is made to the graph manager in step 342, the map intercepts the property request and rephrases the question, "Do you have a Radius property?" as "Do you have a defined property?" The rephrased request continues down the property chain in steps 342, 344, and 346 to the graph entity 264, the graph manager 224, and, finally to the source entity 276. In this example, the source entity 276 has the defined property from the relational database 150. In the representation only the source manager 226 and source entities 236 inherit properties from the data source. In the example, the circle entity 240 takes this value of the director's salary, which has an integer value of 10, from the relational database 150 as its radius property and draws itself as a circle with a radius of 10 pixels.

The programming object and server program 22 represent databases using specialized terminology. The tables 154 and 156 in the relational database 150 are described in the programming object as entities of different entity types. The table 154 in this example is a Director database table and is represented in the presentation program 22 as the DIRECTOR Entity Type. Every Entity Type belongs to a type collection such as the type collection 284. Every Entity Type that describes an entity table in the database belongs to the Nodes Type Collection. Every Entity Type that describes a relation table in the database belongs to the Edges type collection. Nodes generally represent discrete pieces of information, such as directors or movies stored in tables 154 and 156 respectively. Edges generally represent relationships between discrete pieces of information, for instance, that a particular director directed a particular movie. Rows in database tables are potential entities (they are potential entities because although they exist in the database, the program may never need to visit that area of the database). Any record in a database in either entity or relation tables is represented as an entity by the program. Records in entity tables 154 and 156 become Node entities and records in relation to edge table 158 become edge entities. When an entity is created from a record, the data stored in the fields of the record becomes the entity's properties.

III. Authoring Program

Figure 8:
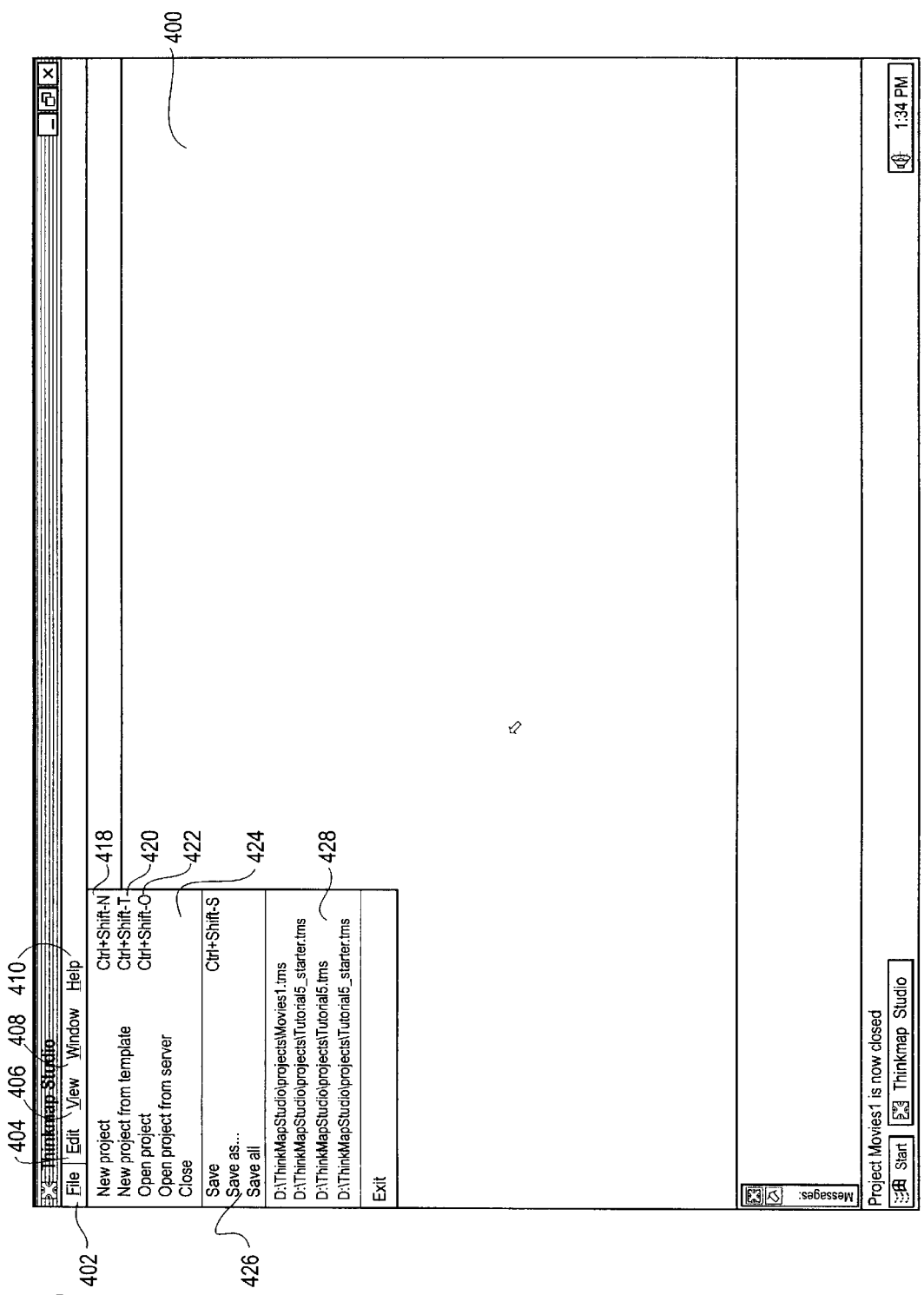
FIG. 8 is a screen shot of the main menu screen displayed by the authoring software according to one embodiment of the present invention.

The creation of the Java applet sent by the server program 22 to the client computer 12 in FIG. 1 is performed by an authoring program according to one embodiment of the present invention. A commercial example of such a program is the Thinkmap Studio by Plumb Design which is preferably written for operation on a Java enabled computer. The process of creating the applet using the data described above with the authoring program above will now be detailed. FIG. 8 shows a main screen 400 for setup of the graphical representations of data presented by the authoring program.

The main screen 400 has a file menu 402, an edit menu 404, a view menu 406, a window menu 408 and a help menu 410.

The edit menu 404 provides common tools such as cutting, pasting, copying, undoing and redoing. The view menu 406 provides choices for the display of various input editor and builder windows and boxes which will be described below. The window menu 408 allows a user to switch between views of different files while the help menu 410 provides advice for a user.

FIG. 8 shows the selection of the file menu 402 which provides a new project option 418, a new project from template option 420, an open project option 422, an open project from server option 424, a number of save options 426 and a list of current files 428. The list of current files 428 tracks the most recent files opened by the authoring program. The save options 426 allow a user to save and name various files. The new project from template option 420 allows a file to be created from a template in the form of files such as those shown in FIGS. 2 or 3. The open project option 422 allows a user to open a file stored on the local drive of the computer running the authoring program. The open project from server option 424 allows a user to open an existing file stored on a server computer.

A. Data Source Selection and Formatting

Figure 9A:
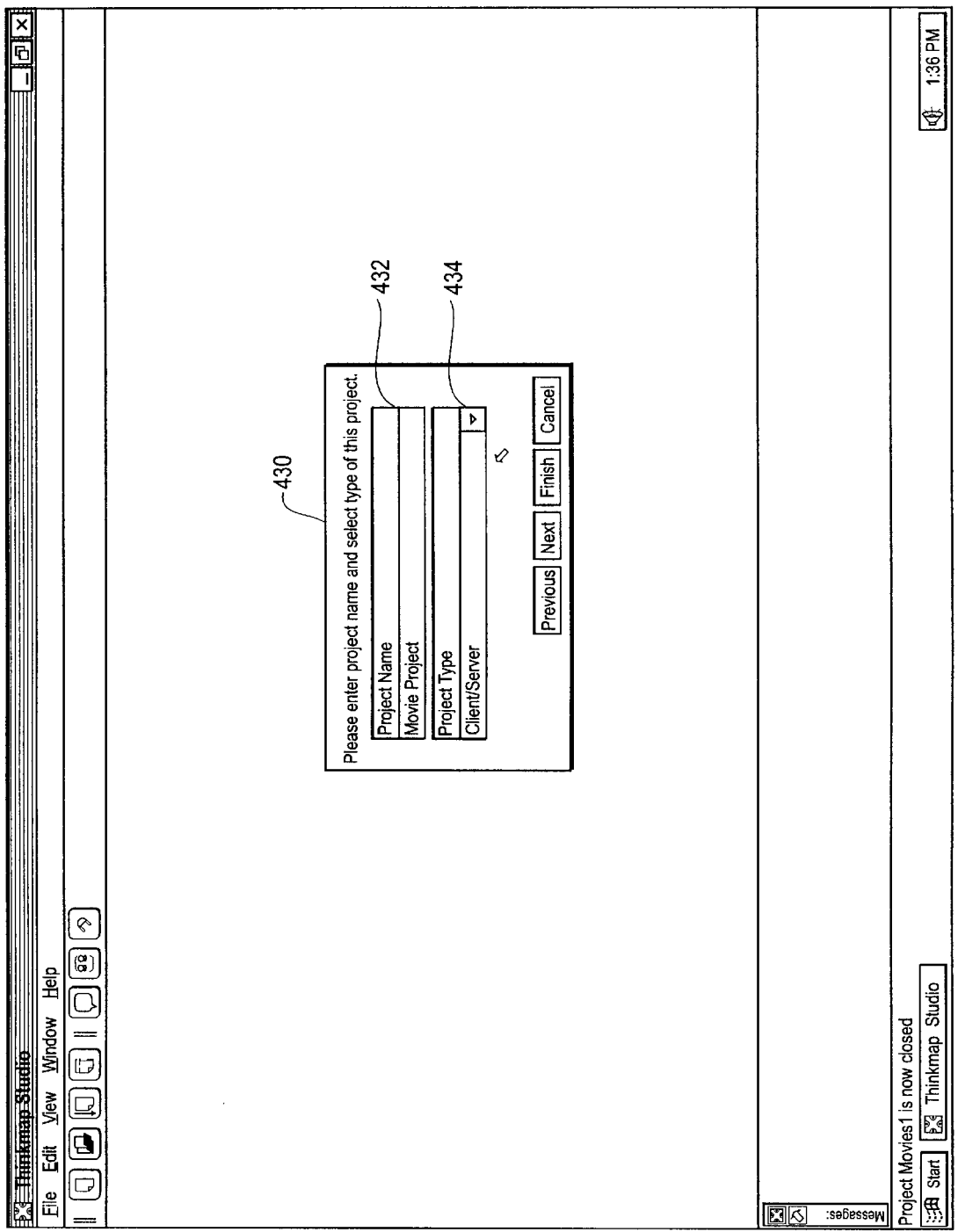

A user may also create a new visual representation file by selecting the new project option 418 which runs a project wizard. The project wizard displays a number of screens which allows a user to interface with a data source. FIG. 9A shows a first input box 430 displayed by the project wizard. The first input box 430 has a project name field 432 which allows a user to name the project. A project type field 434 has a pulldown menu which allows the user to categorize the project as a client only or client/server project. The client only project selection designates a visual representation based solely on data stored on a stand alone computer. The client/server selection designates a visual representation where the data represented is on a server remote from the client computer. After completing the fields 432 and 434 the user may move to the next screen.

Figure 9B:
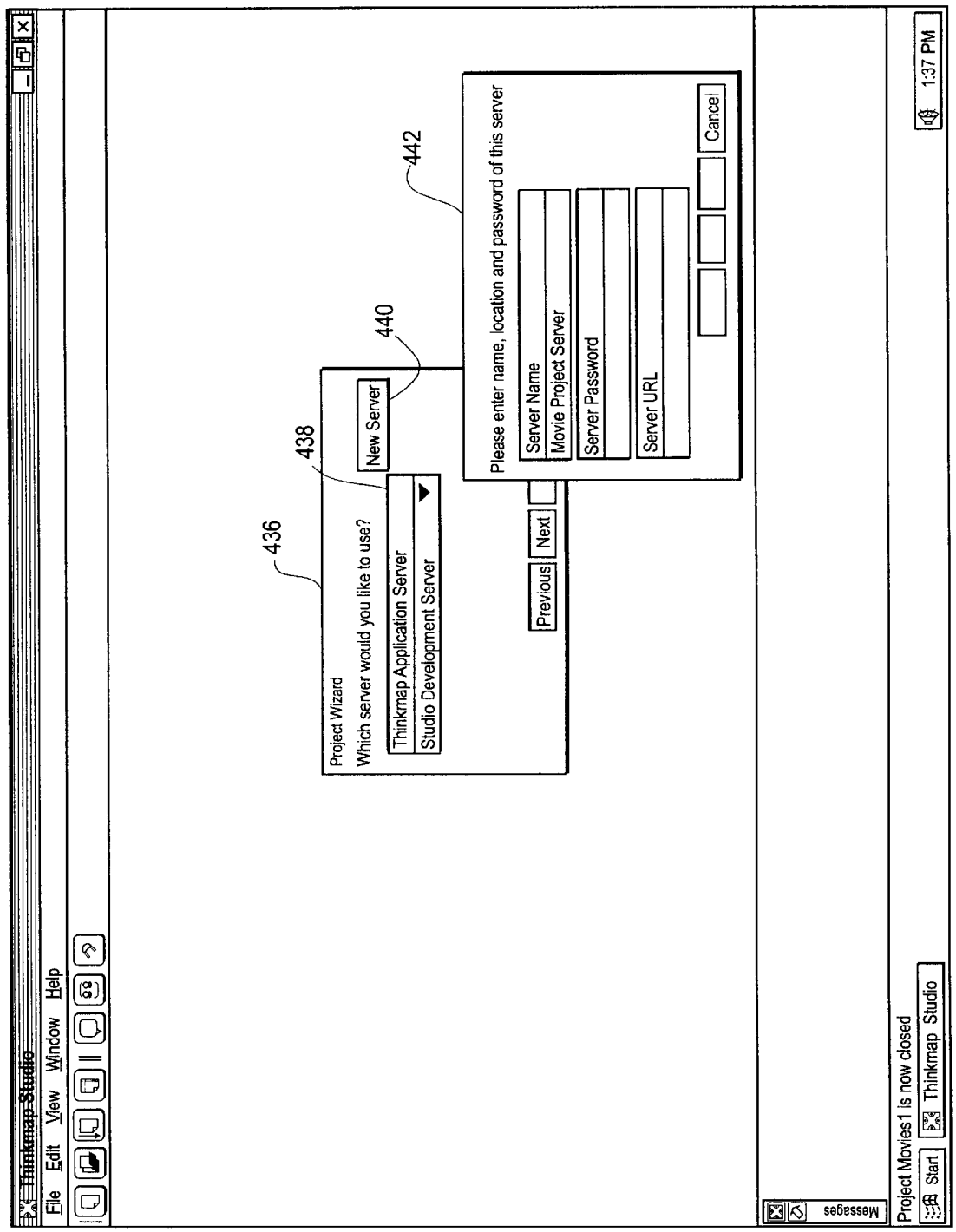
Figure 9C:
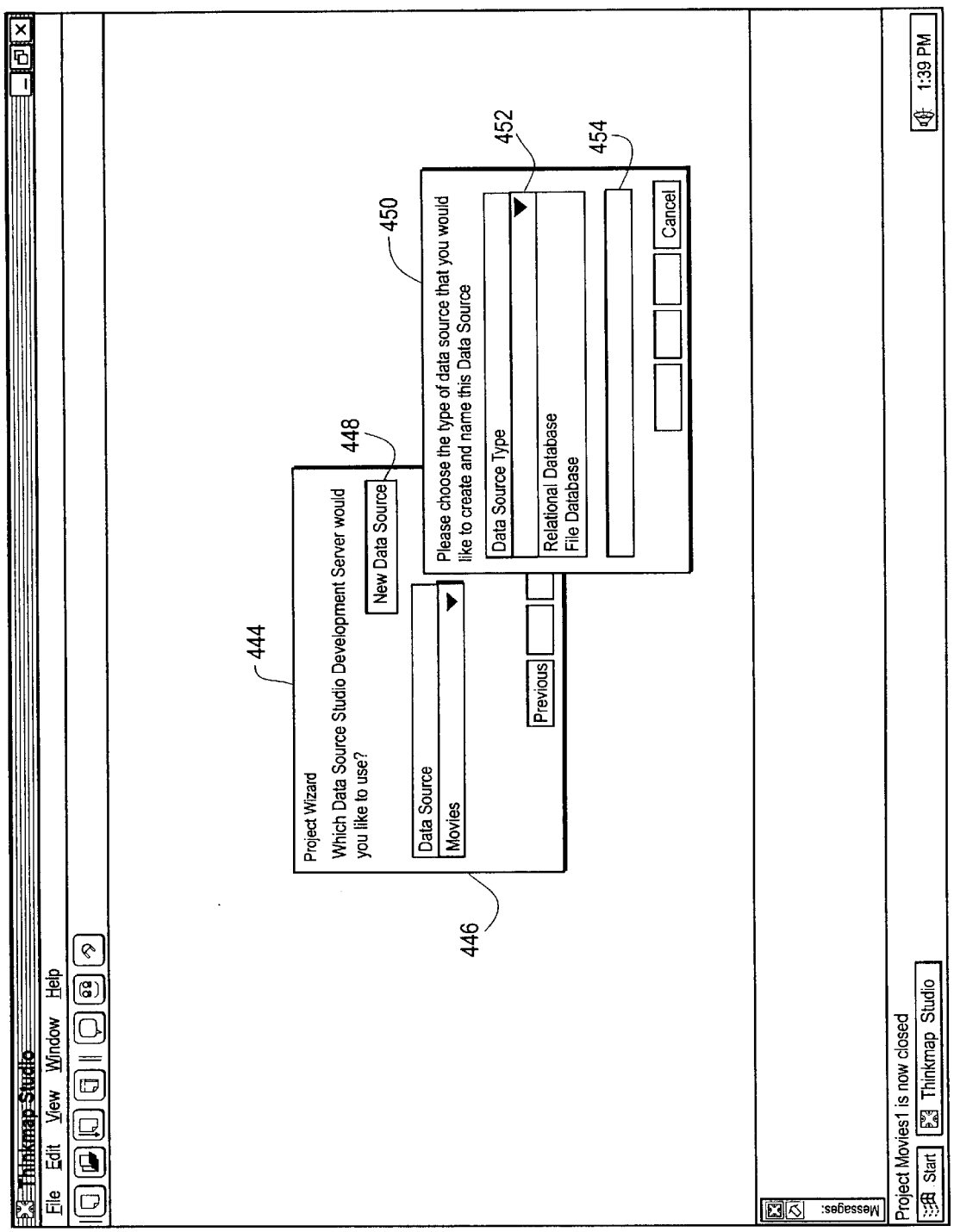

FIG. 9B shows a second input box 436 which has a server field 438 which allows selection of a server where the data source is located. The second input box 436 includes a new server button 440 which causes a pop up box 442 to be displayed which allows a user to select a server by name, password and URL. After either selecting an existing server in the server field 438 or a new server from the box 442, the user may move to a third input box 444 shown in FIG. 9C which relates to the kind of data source which will be represented by the graphical display.

The third input box 444 has a data source field 446 that provides a pull down menu with all of the possible data formats previously defined which the computer with the authoring program can interface with. These may include databases and flat files as explained above. After completing the data source field 446 the user may move to the next screen. The third input box 444 also has a new data source button 448 which causes a data source wizard box 450 to be displayed which allows the selection of a new data source. The data source wizard window 450 has a data source type selection menu 452 which displays all the data source types available such as an ODBC or JDBC compliant databases, other databases, a file database, or a search engine. Other data sources may be used as long as suitable interface routines are provided. The selection of a relational database such as the relational database 150 also displays a series of boxes (not shown) which allow a user to select the type of relational database, host, port, user, password and catalog.

The data source wizard window 450 also has a data source name field 454 which allows a user to name the data source. After a user selects a data source or creates a new data source, the relationship builder as described below in FIG. 12 will be run.

Figure 10:
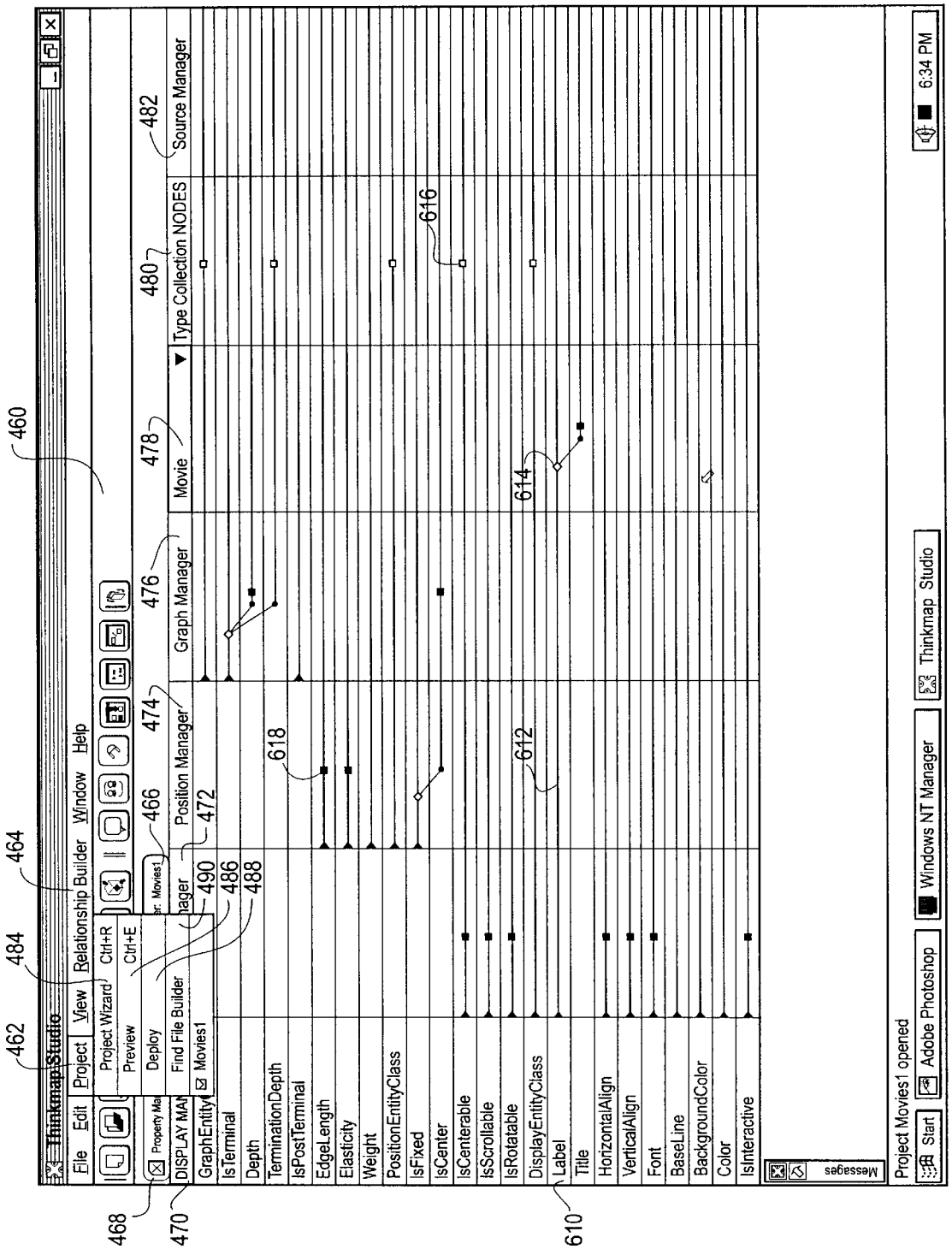
FIG. 10 is a screen shot of the project manager screen of the authoring software in FIG. 8

FIG. 10 shows a project manager screen 460 which is displayed in response to the completion of the project wizard and relationship builder or the opening of an existing file. The project manager screen 460 contains the same menu choices as the main screen 400 shown in FIG. 8 with the addition of a project menu option 462 and a relationship builder menu option 464. The relationship menu option may be activated by clicking on a relationship builder menu tab 466. A property manager tab 468 allows a user to switch the view between the property manager screen 460 and the screens related to the relationship builder which will be described below.

The property manager screen 460 provides information and functionality needed to work with maps and properties. The property manager screen 460 has a number of column headings which represent the levels of the property chain described above. Thus, the headings include a property column 470, a display manager column 472, a position manager column 474, a graph manager column 476, a entity type column 478, a type collection column 480 and a source manager column 482.

Figure 11A:
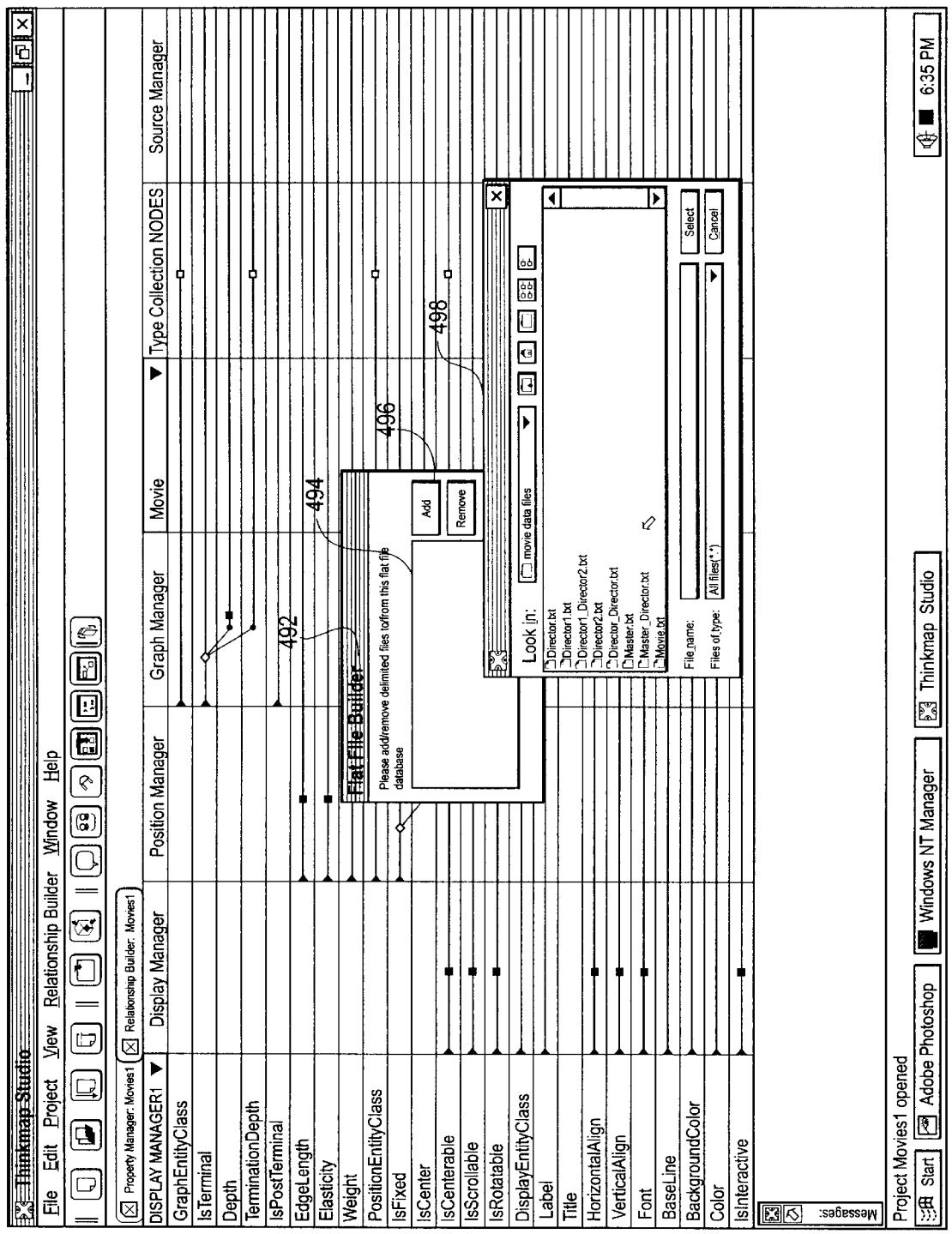
FIGS. 11A–D are screen shots of a flat file builder for the authoring software in FIG. 8.

Selecting the project menu 462 will display a project wizard option 484, a preview option 486, a deploy option 488 and a flat file builder option 490. The project wizard option 484 will allow a user to use the project wizard shown in FIGS. 9A–9C. The flat file builder option 490 will allow a user to create a graphical representation of data records which are not relational databases. The creation of a simple graphical representation may use a flat data such as the data table file 200 shown in FIG. 4 which has data records which are separated by tabs. Selecting the flat file builder option 490 will cause a first flat file builder input box 492 to be displayed which allows selection of the particular data files as shown in FIG. 11A. The input box 492 has a data file selection field 494 and an add button 496. When the add button 496 is selected, a file box 498 which lists all of the files stored on the computer is displayed. A user selects each data file from the file box 498, which has data that is desired to be part of the graphical representation. These files are listed in the file selection field 494.

Figure 11B:
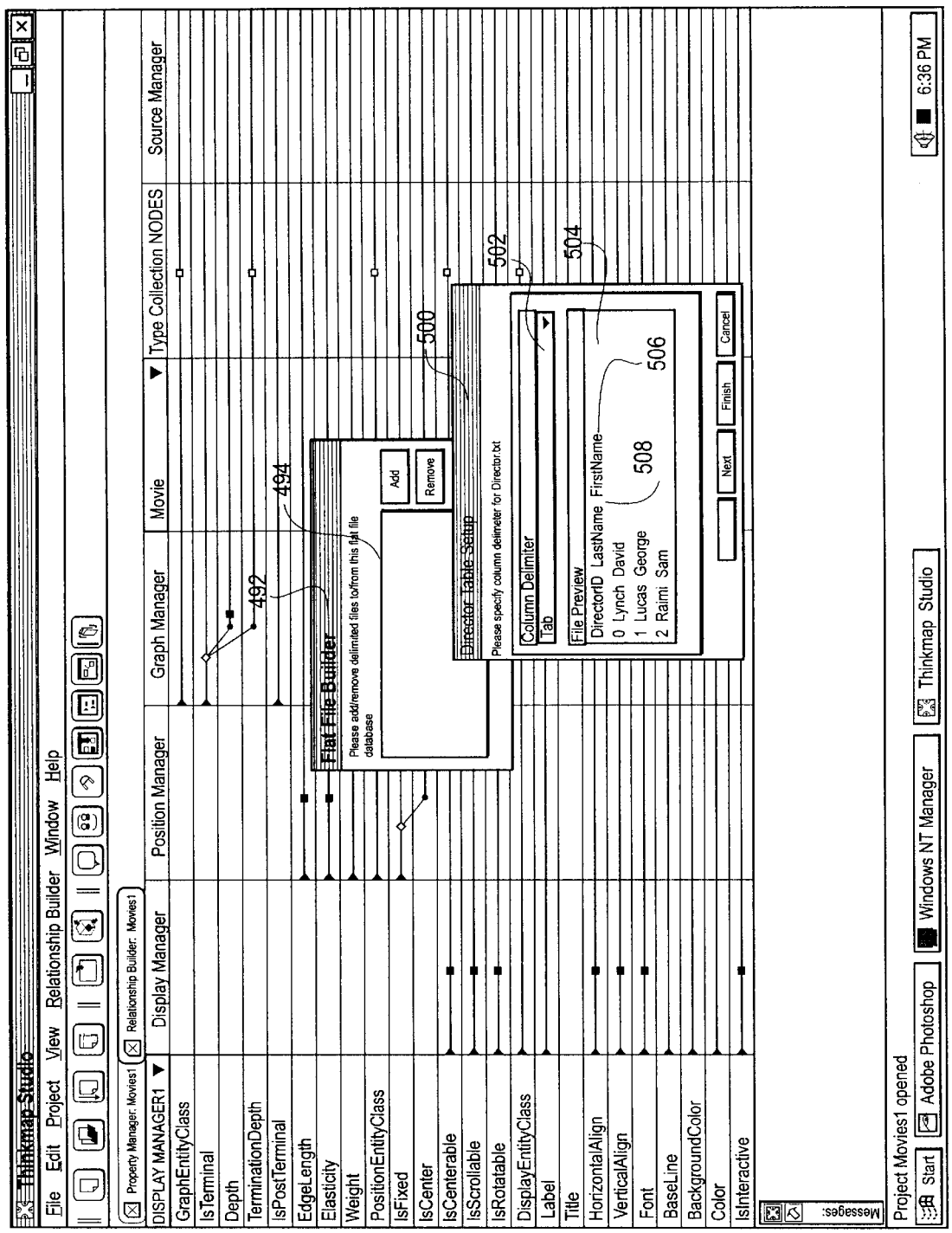

For each file, the program displays a data table setup box 500 shown in FIG. 11B. The data table setup box 500 has a column delimiter field 502 and a file preview area 504 which displays a series of data fields 506 from the selected files and squares 508 which represent characters which separate the data in the file. For example, the first few records of the data table 202 in FIG. 4 are shown in the file preview area 504 in FIG. 11B. The column delimiter field 502 allows a user to select characters in the file such as tabs, spaces, commas, semicolons etc. which separate the data. After completing the column delimiter field 502 for each data table, the user may move to the next screen.

Figure 11C:
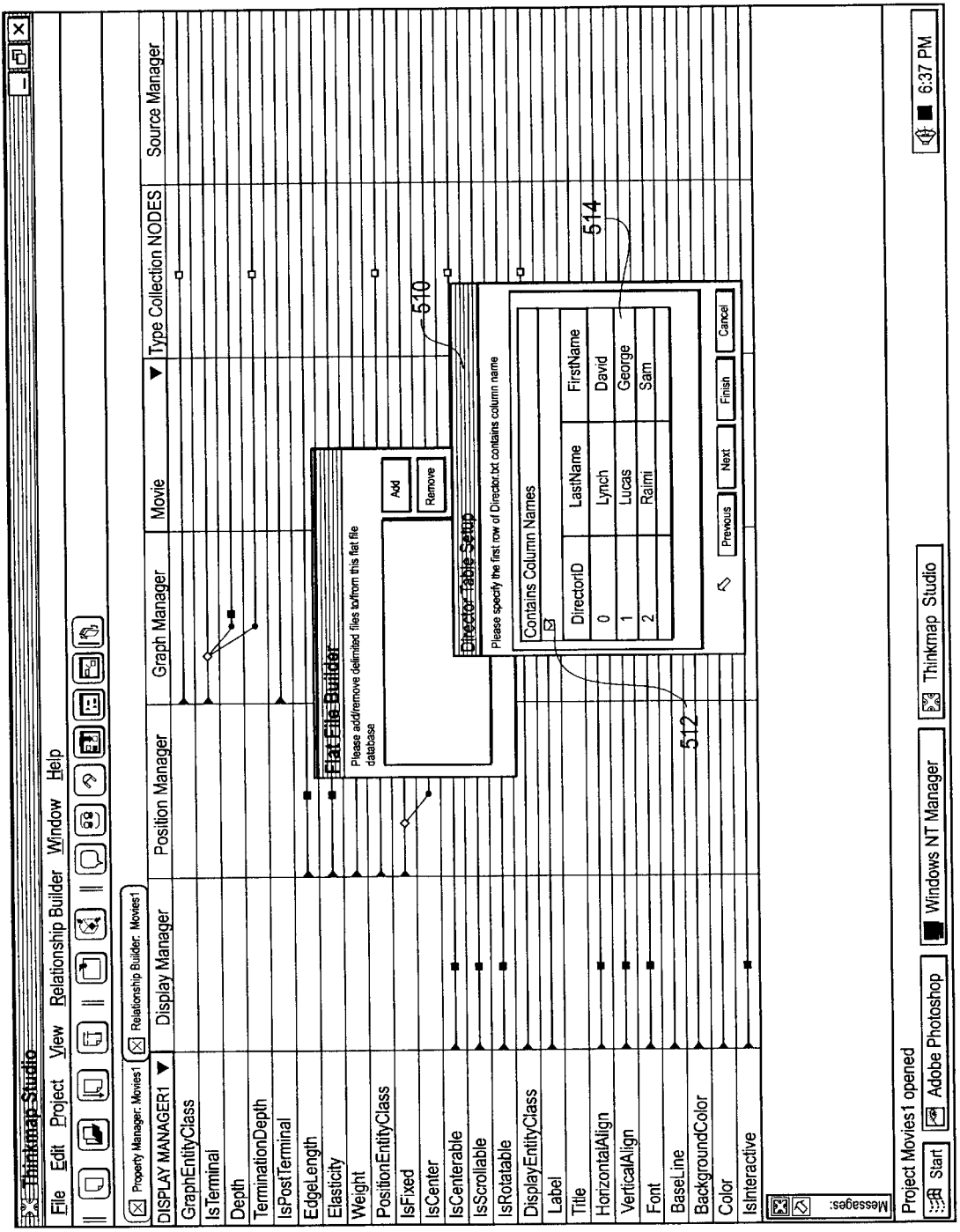

The program then displays a column definition box 510 shown in FIG. 11C. The column definition box 510 requests a user to confirm that the first row of the data table contains the column names via a yes box 512. Alternatively, a user may define the columns using names input by the keyboard. The column definition box 510 has a display area 514 which shows all of the data in each of the data records headed by column name. In this case the columns correspond to those of the table 202 of FIG. 4 and the records correspond to the first and last name of directors from the table 202 in FIG. 4.

Figure 11D:
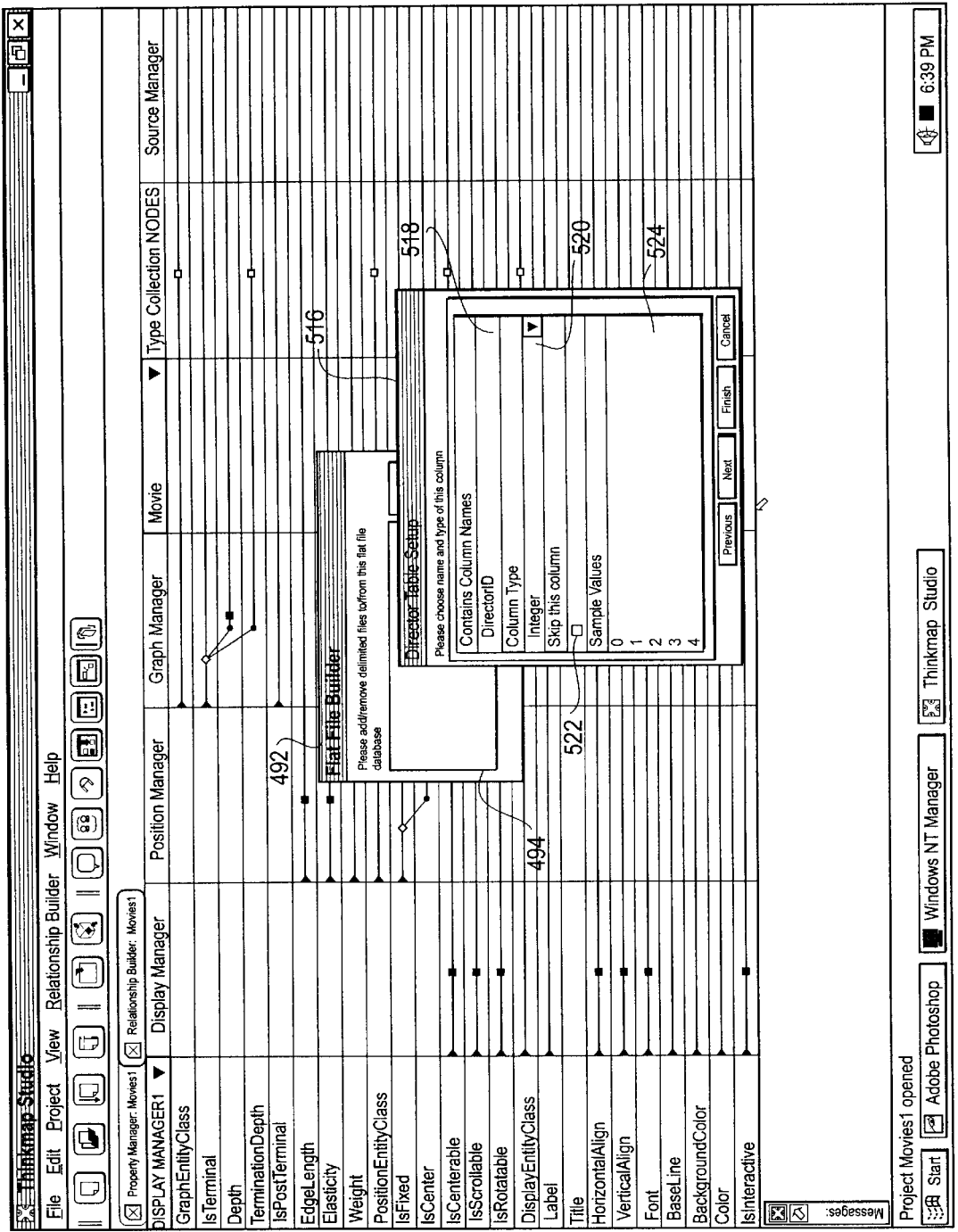

The program then displays a record definition box 516 shown in FIG. 11D which is entered for each data type record represented by a column in the particular data table. The record definition box 516 has a column name field 518 which displays all current columns for the table and allows a user to select a particular name. For example in FIG. 11D, the first column heading, in this case DirectorID, is the correct data field name in the field 518. A data type box 520 allows a user to select the type of the data in the first column, in this case integers, although other forms of data types such as a text string, floating point decimals or boolean values may be selected. A user may also opt to ignore the data in a particular column by selecting a skip box 522 to ignore the selected column field. A sample values area 524 displays sample values from the selected column. After completing the fields 518 and 520 the user is prompted to enter the same data for each successive column in the data file.

In this example the data table 202 from FIG. 4 contains a first name column, a last name column and a year column. Thus, the box 516 in FIG. 11D would be filled out three times, one for each column. The data in the first name column and last name column are text and therefore are the string type of data while the year is an integer type of data. The user then may use the property manager screen 460 in FIG. 10 to create the graphical representation of the data from the flat file data 200.

Figure 12A:
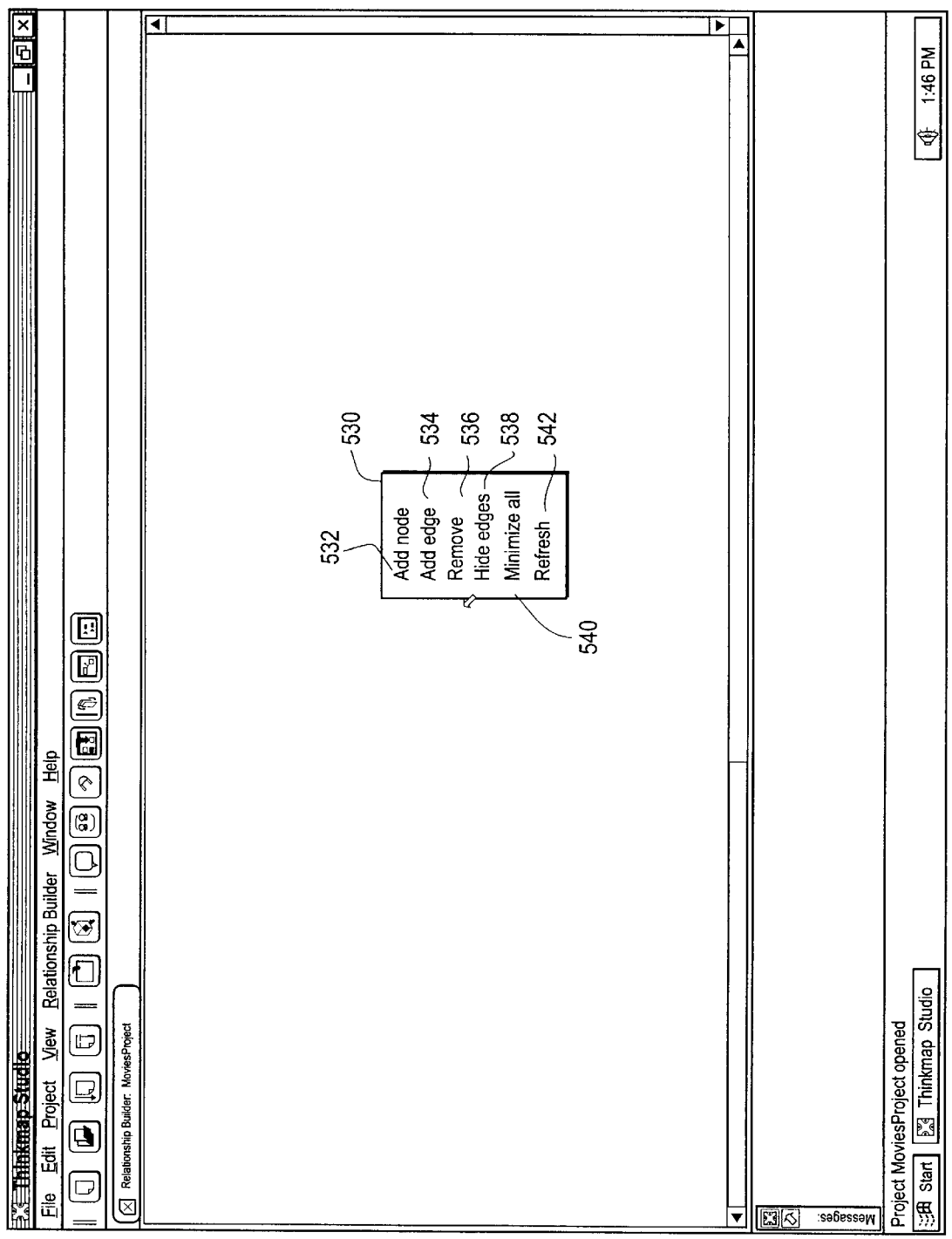
FIGS. 12A–C are screen shots of the relationship builder module for the authoring software in FIG. 8.

After defining the data tables from a flatfile data source, the user sets up the relationships between data by selecting the relationship builder menu 530 shown in the property manager screen 460 in FIG. 10. When the data source is a relational database such as the relational database 150, a user may directly select the relationship builder menu 530. The relationship builder menu 530 may be displayed by selecting the menu option 502, the tab 506 or by clicking on the right mouse key. As shown in FIG. 12A, the relationship builder menu 530 has an add node option 532, an add edge option 534, a remove option 536, a hide/reveal edges option 538, a minimize all/restore all option 540 and a refresh option 542.

Figure 12B:
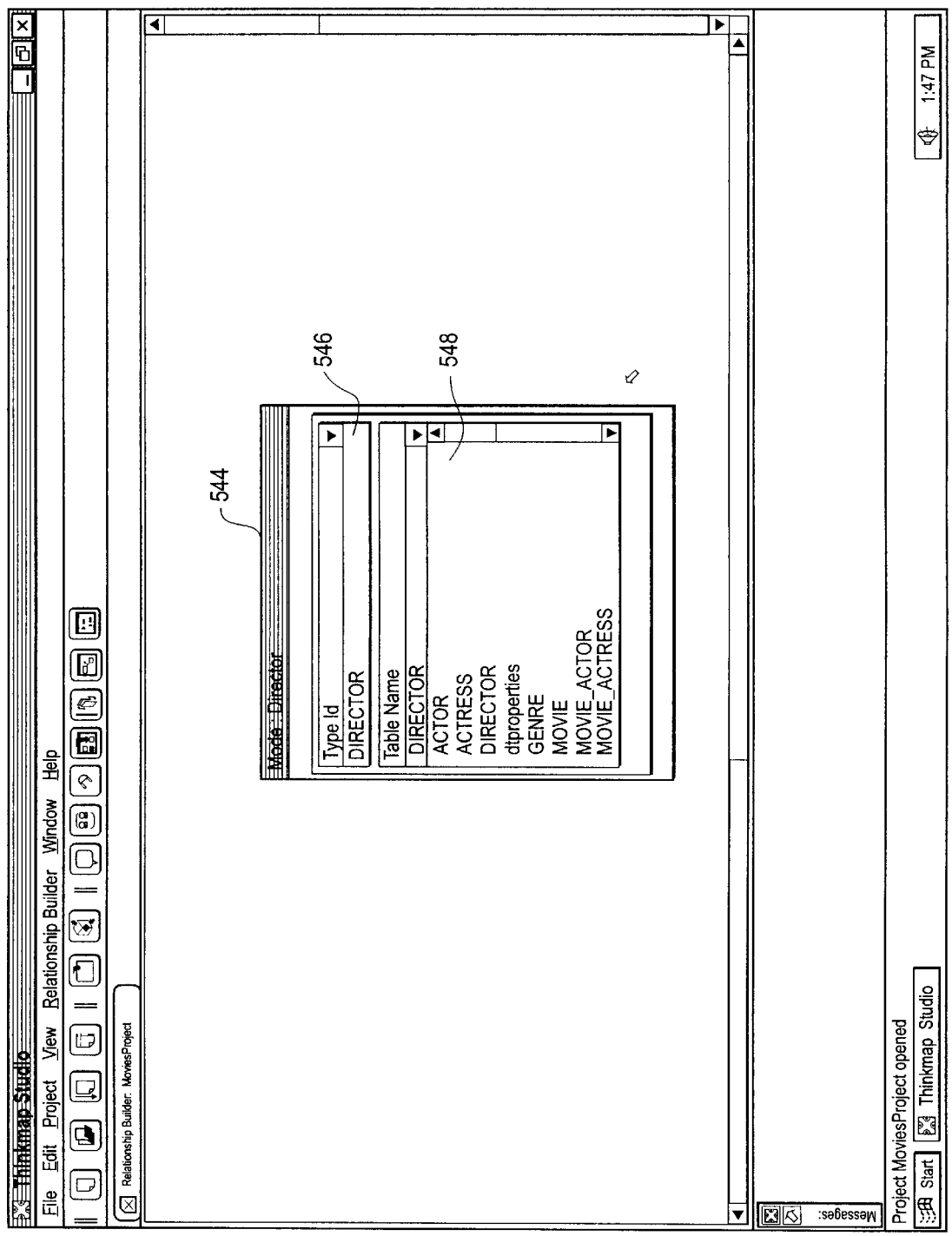

By selecting the add node option 532, the program will display a node entity editor box 544 as shown in FIG. 12B which allows a user to define how the data in the columns of the database tables are used. The node editor box 544 has a type identification field 546 where a user can select a name from a table name pulldown menu 548. Alternatively, the user may type in a name in the type identification field 546. The table name menu 548 will list the selected files of the database which were previously defined by the project wizard. By selecting one of the files, a user will activate a node editor box 550 in FIG. 12C. Any number of node editor boxes, such as boxes 552, 554, 556 and 558 relating to the selected files in the table name menu 548, may be shown on the screen. The node editor box 550 displays the file name in a type identification field 562. A table name field 564 lists the file names and allows a user to select the correct file which is assigned to the file name in the type identification field 562.

The columns of a table, in this case, the table 154 in FIG. 4, are displayed in a properties field 564. The properties field 564 lists a key icon 566, a check icon 568 and a magnifying glass icon 570 next to each of the listed column headings.

A user may select each of the icons 566, 568 and 570 to define the characteristics of the properties in the properties field 564. By selecting the key icon 566, a user defines the property as uniquely identifying the data. By selecting the check icon 568, a user defines the property as available in the authoring program. By default, all of the check icons 568 are initially selected. By selecting the magnifying glass icon 570, a user selects the property as searchable by the programming object sent by the server program 22 in FIG. 1. The properties for each table are designated by using the node editor screen 550 and clicking on the appropriate icon.

Figure 12C:
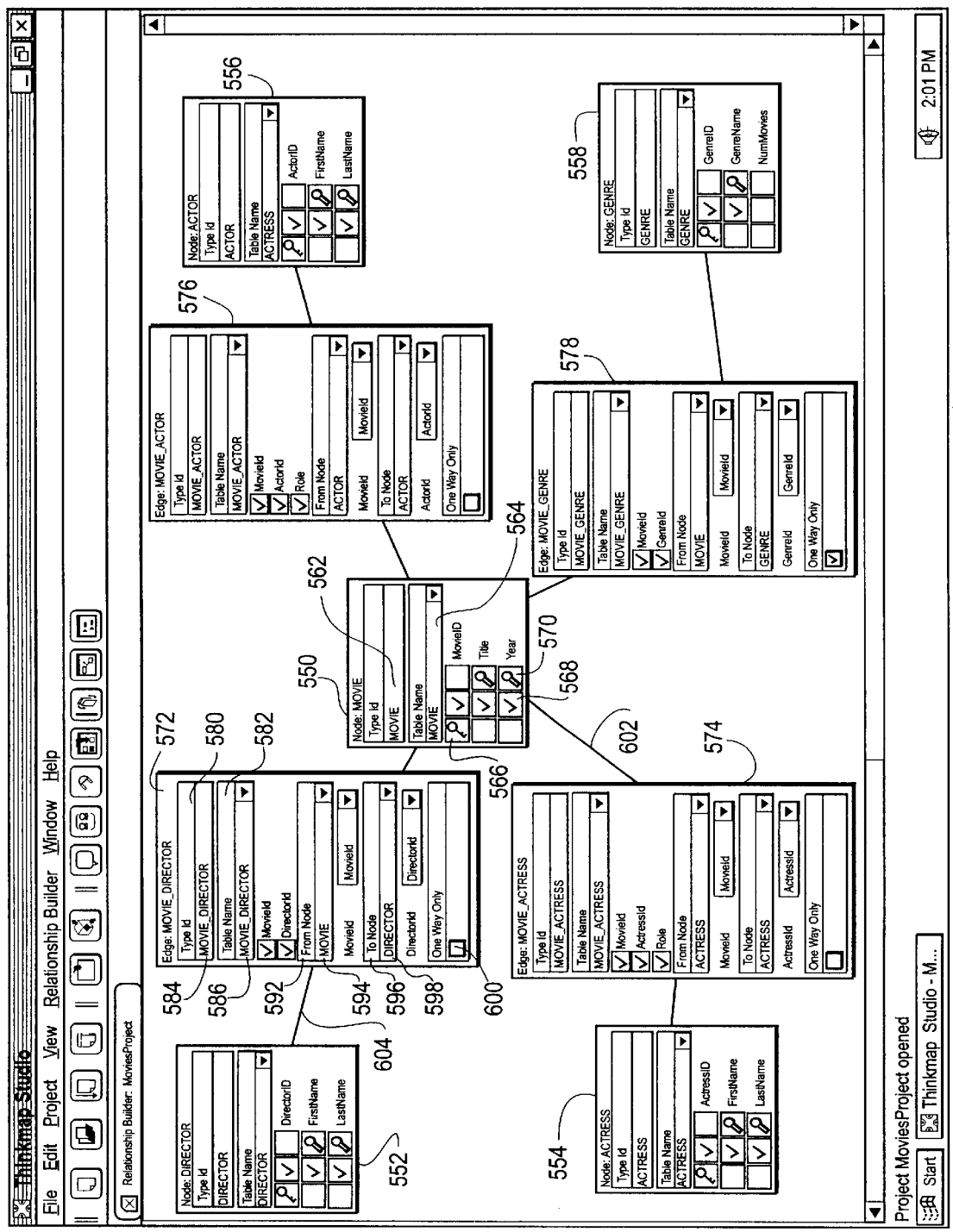

A user may select the add edge option 534 on the relationship builder menu 530 in FIG. 12A to display an edge entity editor box 572 in FIG. 12C. The edge entity editor box 572 is displayed in relation to nodes and may be displayed with other editor boxes such as box 574, box 576 and box 578 which relate to the edges listed in the edge entity editor box 572. The edge editor box 572 has a type identification field 580 which allows the display of the type edge. The relationship between nodes shown by a certain table with common data is selected using a table name field 582. The table name field 582 lists relationships between data which are defined by the relational database.

The edge editor box 572 has a type identification field 584 which shows the relationship between nodes such as between the movie and director nodes in this example and a table name field 586 which includes all relationship tables in the database. The related nodes in the edge are listed in a node field 588 with a series of check marks 590 which when selected indicate that the affected data tables and corresponding nodes are used. A from node field 592 allows a user to select the first node representing a table of data such as the table 156 which has the corresponding node editor box 550. The from node field 592 also displays a data field 594 which is the MovieID from the data table 156 in this example. A to node field 596 allows a user to select the second node representing a table of data such as table 154 which has the corresponding node editor box 552. The to node field 596 also displays a data field 598 which is the DirectorID in this example. A one way only field checkbox 600 allows a user to display the node only when the parent nodes (to node) are displayed and will not display the parent nodes when the children nodes (from node) are displayed.

Each edge entity editor box such as the edge entity editor box 572 is coupled by lines to the node editor boxes which are related by the edge. For example, the edge entity editor box 572 representing the relation between movies and directors is connected by a line 602 to the node editor box 550 (the from node) representing the data table with directors and a line 604 to the node editor box 552 (the to node) representing the movie table with movies. Correspondingly the edge editor box 574 represents the relation between the nodes, Movie and Actress, the edge editor box 576 represents the relation between the nodes, Movie and Actor, and the edge editor box 578 represents the relation between the nodes, Movie and Genre.

Returning to FIG. 12A, the remove option 536 will remove a selected edge editor box or a selected node editor box. The hide/reveal edges option 538 will hide or reveal the selected edge editor box leaving only the node editor boxes for easier visualization. The minimize all/restore all option 540 will only show the labels of the edge editor boxes or the node editor boxes. The refresh option 542 will update the information in the editor boxes relating to additional database tables.

B. Manager Editors

Returning to FIG. 10, the rows in the property manager screen 460 each represent 18 a property request for all properties needed for the graphical presentation. The properties column 470 lists properties 610 which are cross-referenced with rows which each have a horizontal line 612 which represent the appropriate column (manager or sublevel) where the property request originates. The end of the lines 612 signify the manager or sublevel from which the property request originates. The entity type column 478 contains a black triangle which signifies a pulldown menu which will list the respective entity type defined by the relationship builder. The property manager editor screen 460 only displays the requested properties of a selected entity type in the pulldown menu from the entity type column 478. Thus, the property manager editor 460 does not display all property requests at once.

The property manager editor 460 has three symbols which provide a user information on how a property request is satisfied. A white diamond such as a white diamond 614 indicates a map. A white square such as a white square 616 indicates a user-defined property such as color. A black square such as a black square 618 indicates an application default such as the radius property value being 10 units. The white square 616 overrides the property indicated by a black square on the same line. A line links the property defined by a map from a white diamond 614 to the line or lines which are the dependent properties.

As explained above, a required property is a property which is required by an entity for which an entity requests a value. The rows of the property manager editor 460 are devoted to requests for the values of required properties. A provided property is a property which is supplied from within the managers and may include those properties which obtain values from the data items.

A user may thus use the property manager screen 460 to define properties and values for every entity in the representation. Required properties may be mapped to provided properties. The user defined properties may be mapped to a known property. Such maps are created by moving the mouse and clicking on the lines 612 which represent properties. Clicking on one of the lines 612 displays a map editor box 620 shown in FIG. 13. After filling out the fields in the map editor box 620, the appropriate white diamond symbol 614, white square symbol 616 or black square symbol 618 will be displayed on the lines 612. The map editor box 620 may also be displayed by selecting any of the symbols 614, 616 and 618.

The map editor box 620 has a map field 622, a property field 624 and a default field 626. The default field 626 will display a default property value and results in blanks in the fields 622 and 624. Selecting the default field 626 will result in the display of a black square symbol 618 on the appropriate line 612. The property field 624 allows a user to add or remove a property of the type selected in a pulldown menu. Entering a value in the property field 624 results in the display of a white square symbol 616 on the appropriate line 612. The map field 622 allows a user to define the mapping of a defined property to an existing property. A user uses the map protocol described above. The map field 622 results in the display of a white diamond symbol 618 on the appropriate line 612 and a second line linking the mapped property to an existing property.

Figure 14A:
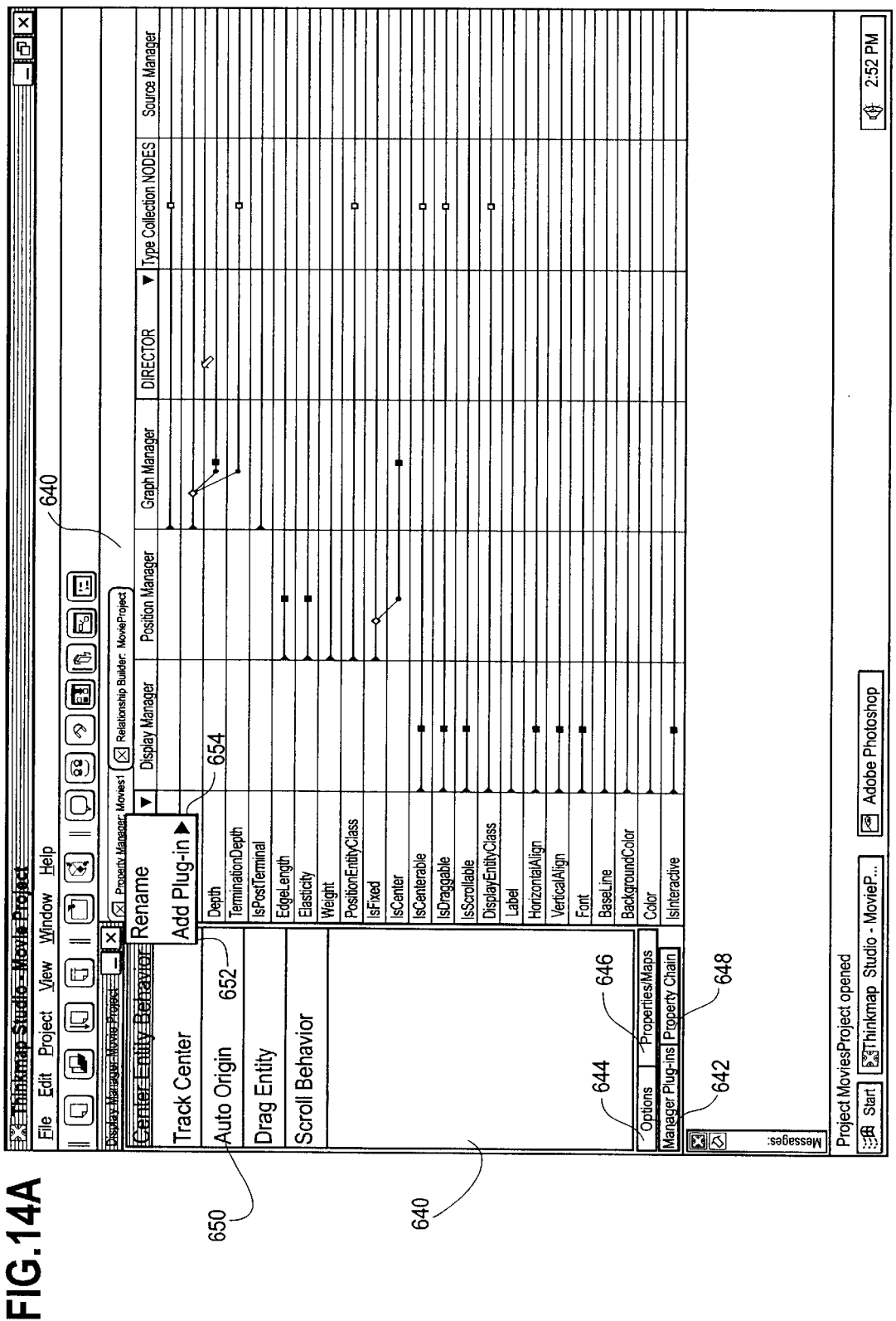
FIGS. 14A–14C are screen shots of the various options presented by the display manager editor for the authoring software in FIG. 8.

The display manager column 472 may be selected to display a display manager editor window 640 shown in FIG. 14A. The display manager editor window 640 has a manager plug-ins tab 642, an options tab 644, a properties/maps tab 646 and a property chain tab 648, each of which when selected displays a different options in the display manager editor window 640.

In FIG. 14A, the manager plug-ins tab 642 displays a plug-ins selection list 650 in the display manager window 640. The selection list 650 has a list of currently applied plug-ins. By selecting a pulldown menu 652, a user may select an add manager plug-in option 654 which will list plug-ins which may be applied to the display manager. These may include different plug-in managers which allow a user to select behaviors such as rotating, center entity, track center, auto origin, drag entity and scroll behavior as described above. Selecting a particular plug-in may result in other pop-up menus to appear for a user to define various properties which are explained above.

Figure 14B:
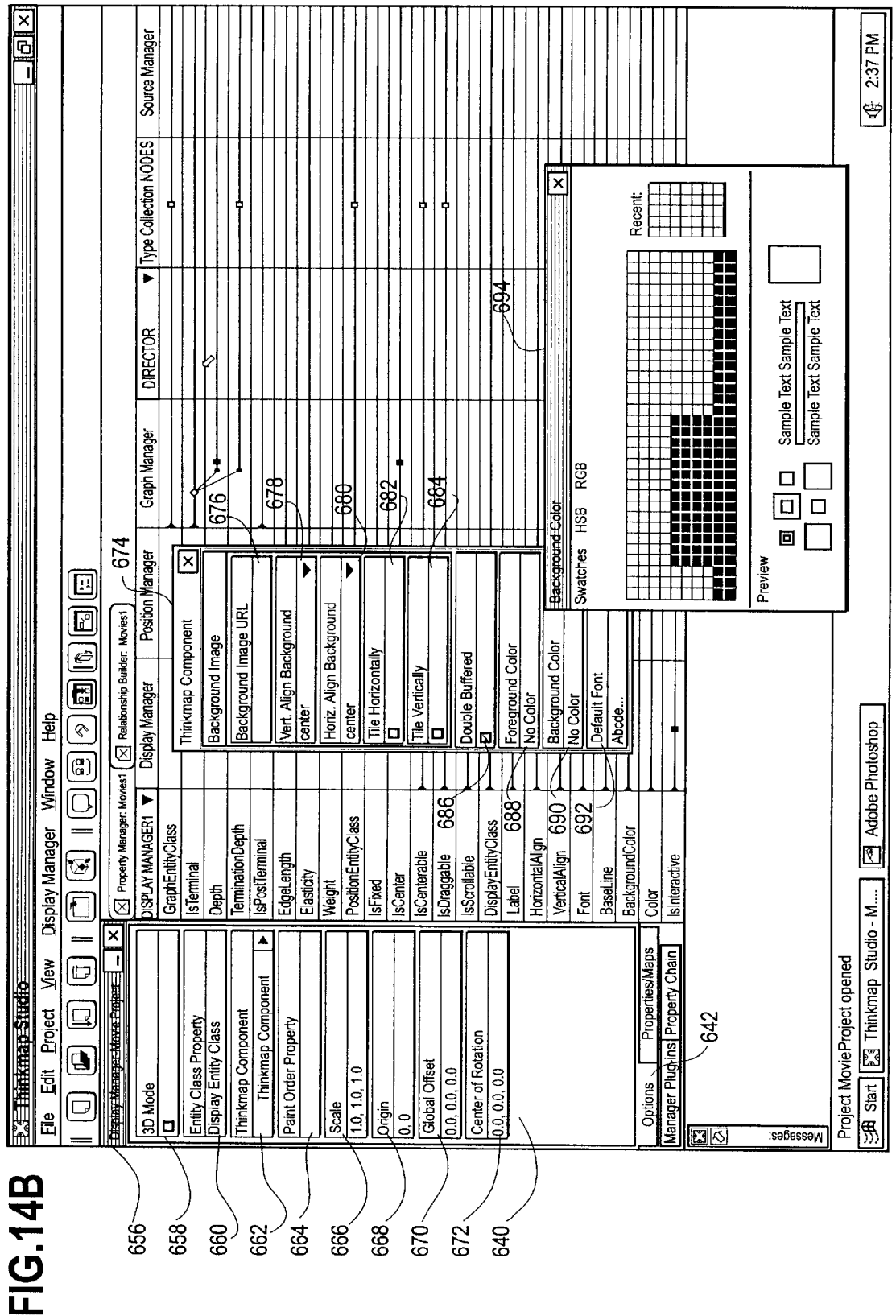

FIG. 14B shows an options display 656 which is displayed in the display manager window 640 when the options tab 644 has been selected. The options display 656 has a 3D mode toggle box 658 which allows a user to select either 3D or 2D display. The options display also has an entity class property field 660, a component field 662, and a paint order property field 664. The entity class property field 660 allows a user to define the name of the property. The paint order property field 664 allows a user to define the order that properties are displayed.

The various values of scale, origin, global offset, and center of rotation are entered into fields 666, 668, 670 and 672, respectively. Clicking on the component field 662 displays a component box 674 which allows a user to select background image URL, vertical alignment, horizontal alignment, tile horizontally, tile vertically, double buffered, foreground color, background color and default font in fields 676, 678, 680, 682, 684, 686, 688, 690 and 692, respectively. Selecting these fields may cause other pop-up windows such as a foreground color box 694 to appear to more specifically assign values to the properties.

Figure 14C:
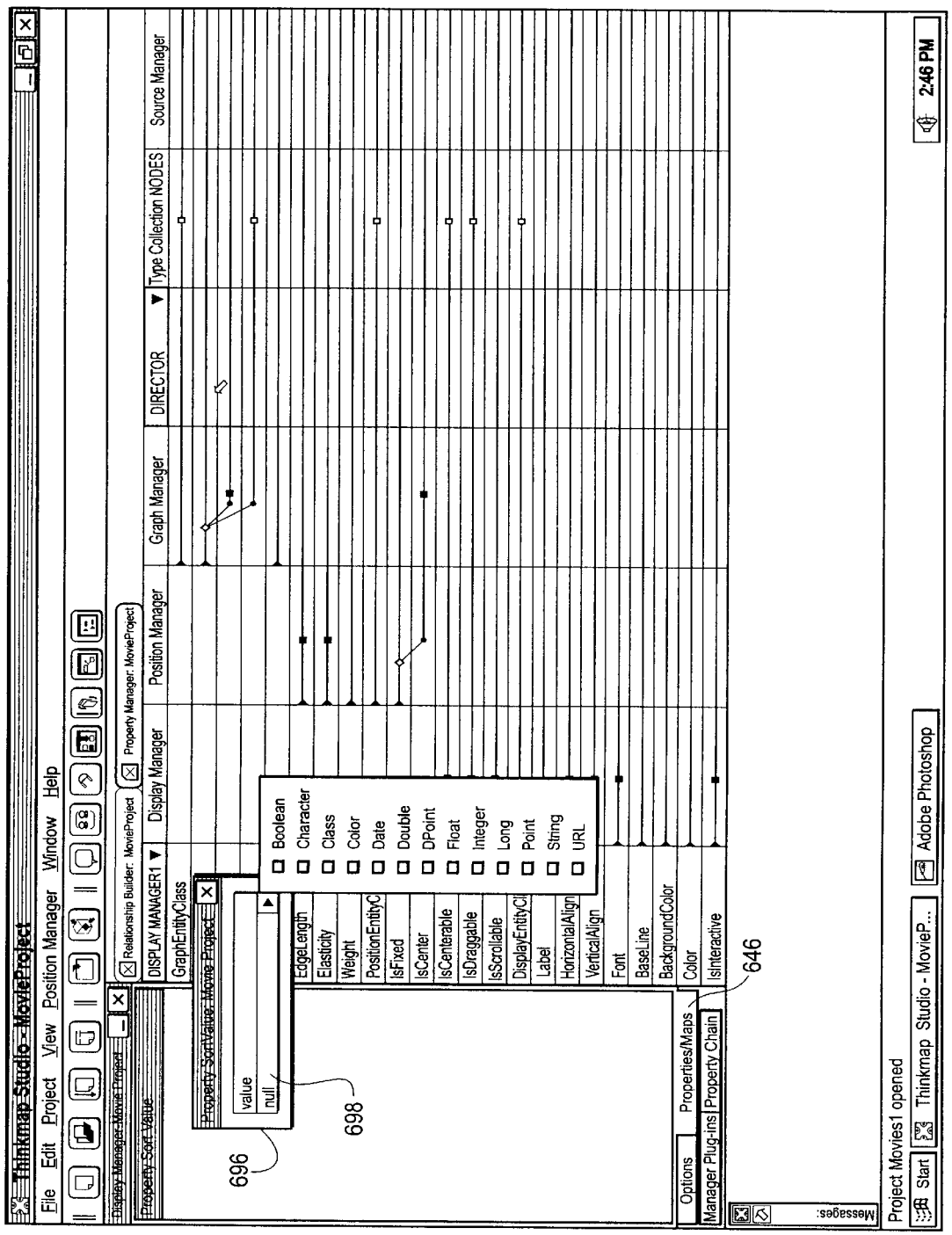

By selecting the property/maps tab 646, a user may display a list of current properties in the display manager. The user may define properties and maps as shown in FIG. 14C by the display of a property definition box 696 for a created property which is selected in the display manager window 640. The property definition box 696 has a value field 698 which allows a user to select the type of data which constitutes the created property. Finally, selecting the property chain tab 648 allows a user to show the components which are managed by the display manager.

Figure 15A:
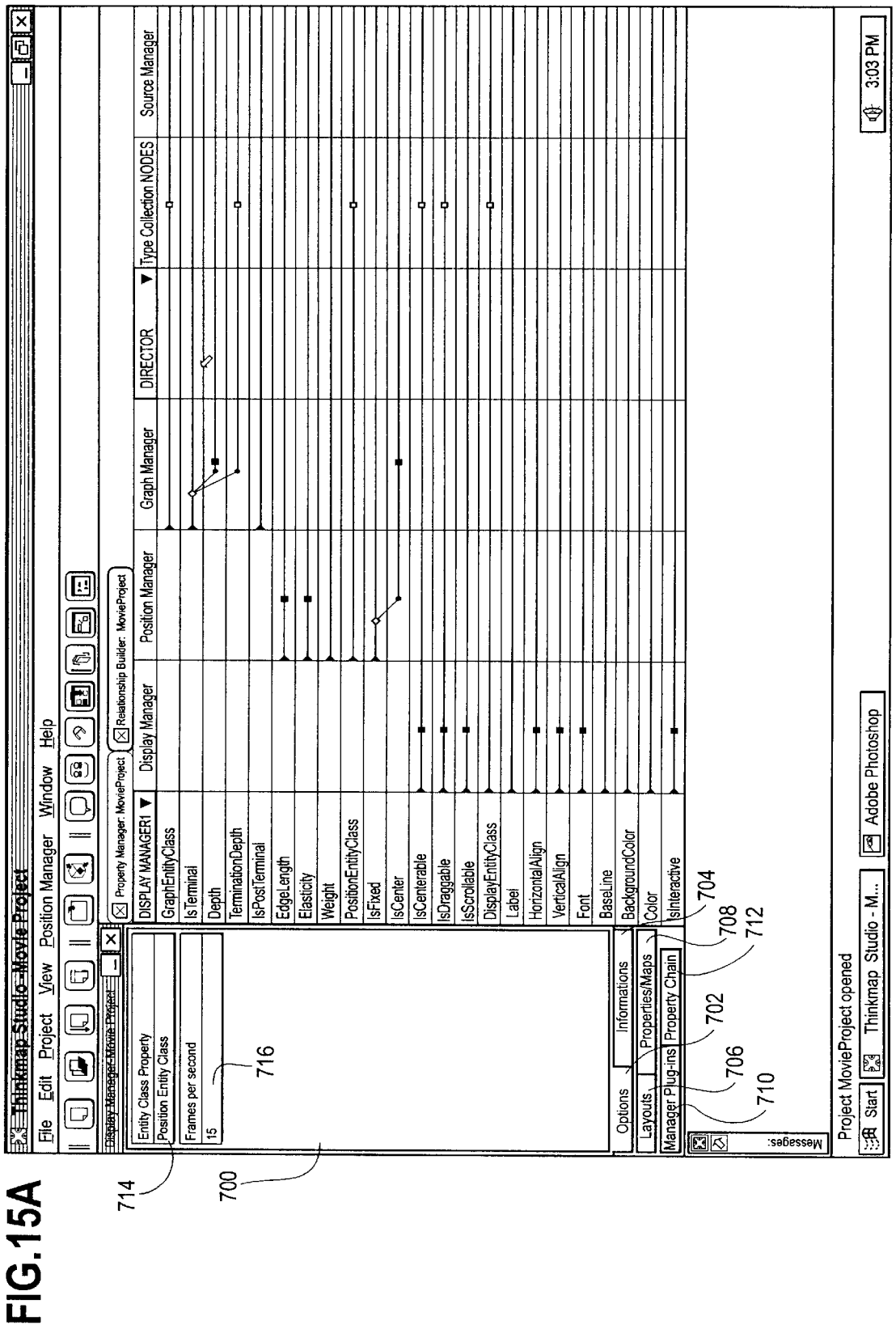
FIGS. 15A–15C are screen shots of the various options presented by the position manager editor for the authoring software in FIG. 8.

The position manager column heading 474 in FIG. 10 may be selected to display the position manager editor window 700 shown in FIG. 15A. The position manager editor window 700 has an options tab 702, an informotions tab 704, a layouts tab 706, a properties/maps tab 708, a manager plug-ins tab 710 and a property chain tab 712. FIG. 15A shows the selection of the options tab 702 which displays an entity class field 714 which allows a user to select or name a specific position entity. A frames field 716 allows a user to select the times a second the position entities will be updated.

Figure 15B:
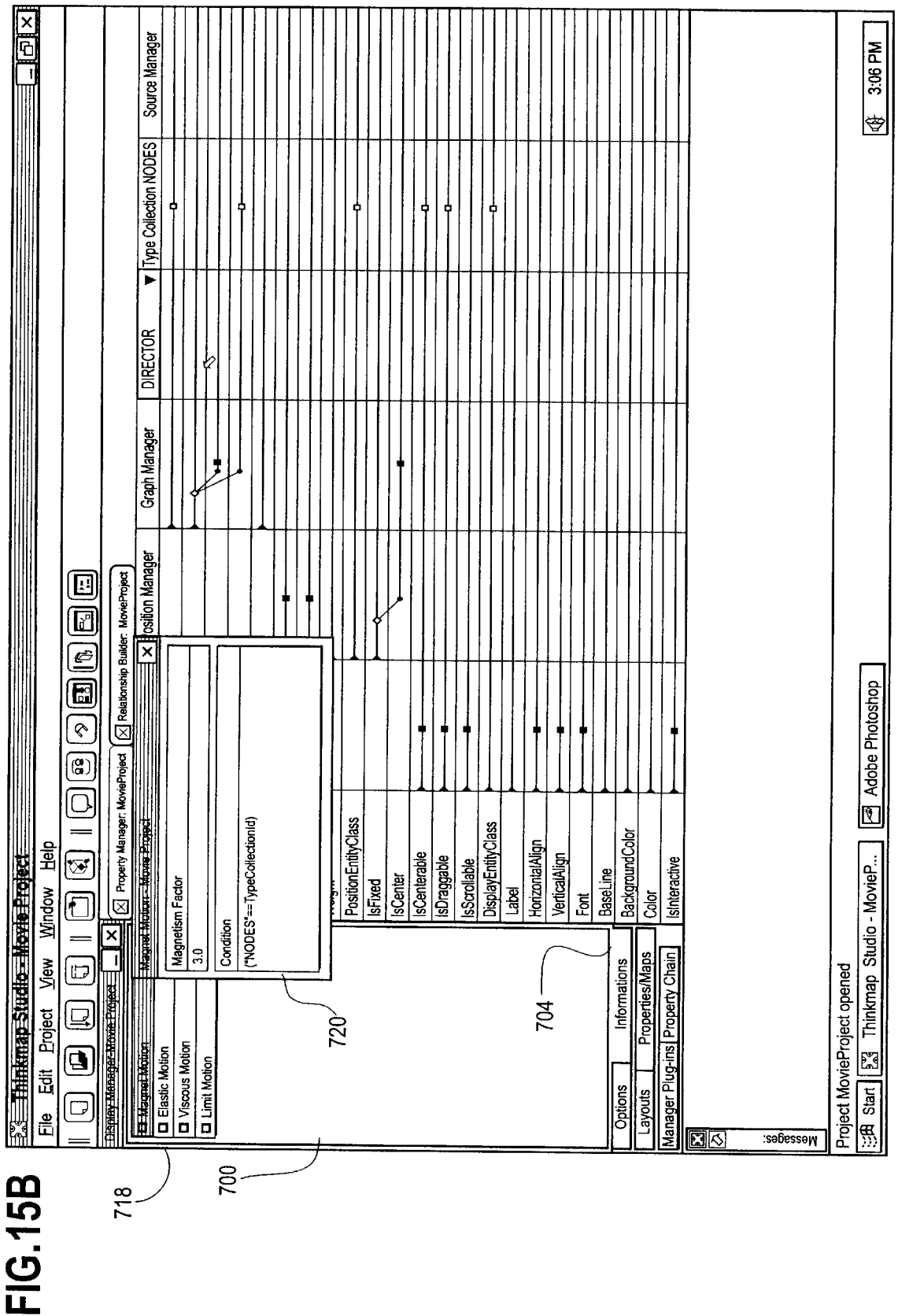

By selecting the informotions tab 704, a list of currently applied informotions 718 is displayed in the position editor window 700 as shown in FIG. 15B. The listed informotions 718 each have a box which allows a user to enable or disable the informotion without removing the informotion for design purposes. For each listed informotion, a properties box 720 will be displayed. The properties box 720 allows a user to set the condition of the informotion as well as the traits of the informotion. For example, the properties box 720 relates to the Elastic Motion informotion and allows a user to set the bounding box, default edge length and default elasticity. By selecting a pulldown menu (not shown) a user may select other informotions which may be added to the list of informotions 718. The order that new informotions are placed in the list 718 determines the order that the informotions are applied to entities.

Figure 15C:
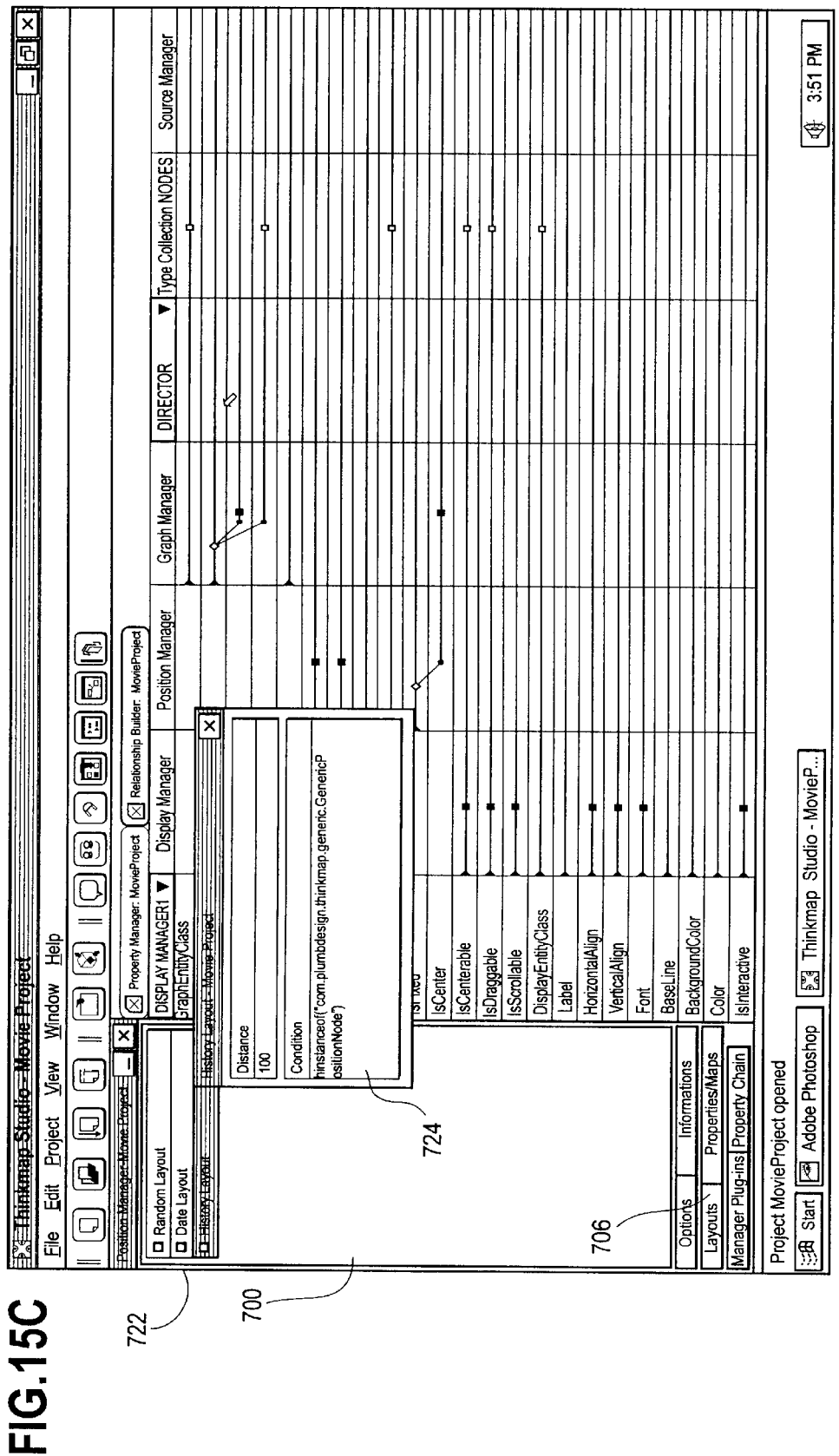

By selecting the layouts tab 706, a list of currently applied layouts 722 is displayed in the position editor window 700 as shown in FIG. 15C. By selecting a pulldown menu (not shown), a user may select a layout option which will list other layouts which may be applied. Selecting a particular layout may result in the display of property boxes to define various options for the layout as well as the condition of application which are explained above. For example, a property box 724 is displayed when the History layout is selected which allows a user to enter the distance and condition of application of the History layout.

Selecting the properties/maps tab 708 allows a user to display a list of current properties in the position manager similar to the properties/maps tab 648 displayed by the display manager editor in FIG. 14A. Selecting the manager plug-ins tab 710 allows a user to display plug-ins written for the position manager. Selecting the property chain tab 712 allows a user to display the property chain from the position manager.

Figure 16:
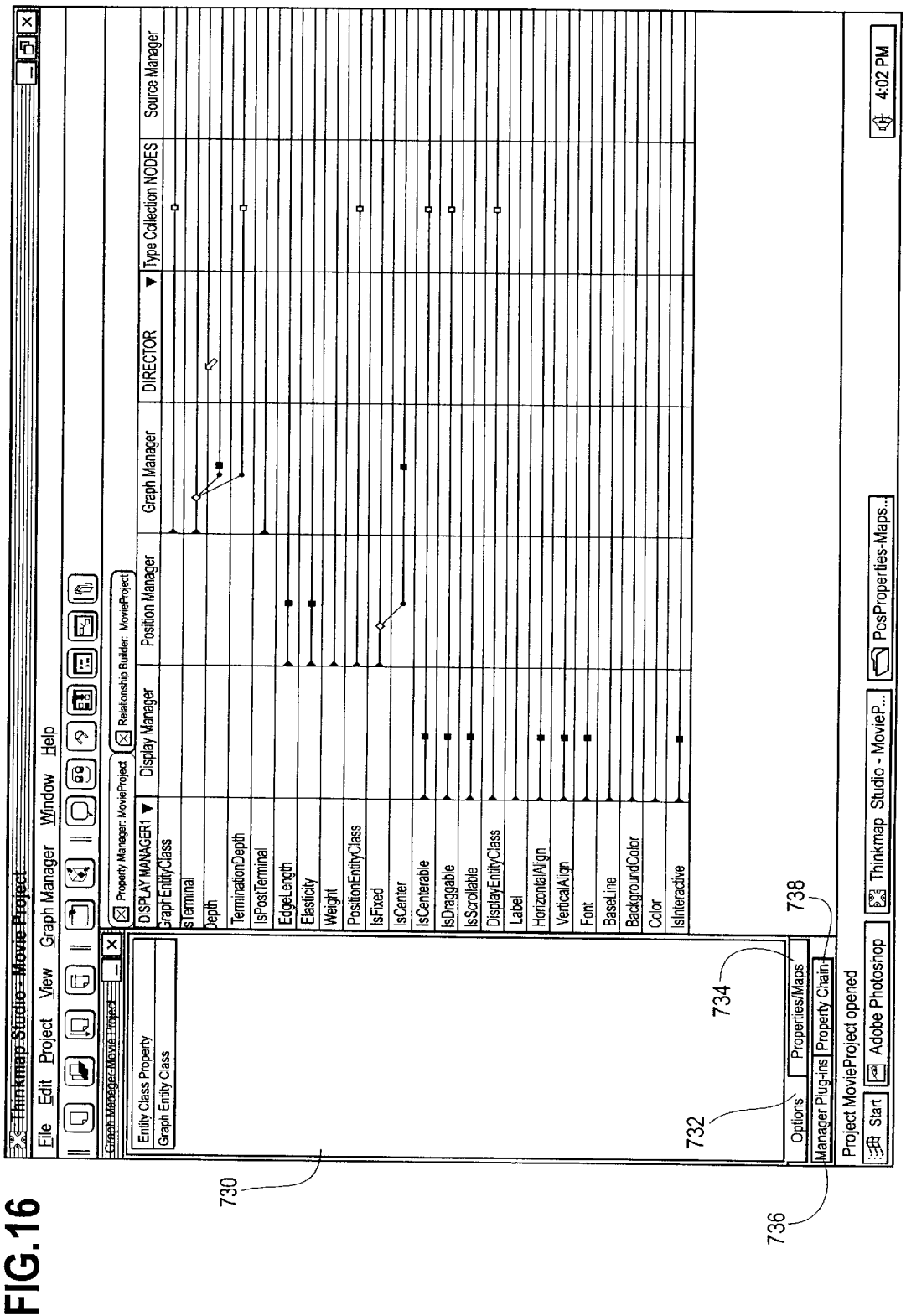
FIG. 16 is a screen shot of the various options presented by the graph manager editor for the authoring software in FIG. 8.

By selecting the graph manager column 476 in FIG. 10, a graph manager editor window 730 is displayed as shown in FIG. 16. The graph manager editor window 730 has an options tab 732, a properties/maps tab 734, a manager plug-ins tab 736 and a property chain tab 738. The options tab 732 is selected in FIG. 16 and allows a user to enter an entity class property.

Selecting the properties/maps tab 734 allows a user to display a list of current properties in the graph manager similar to the properties/maps tab 648 displayed by the display editor in FIG. 14A. Selecting the manager plug-ins tab 736 allows a user to display plug-ins written for the graph manager. Selecting the property chain tab 738 allows a user to display a property chain from the graph manager.

Figure 17A:
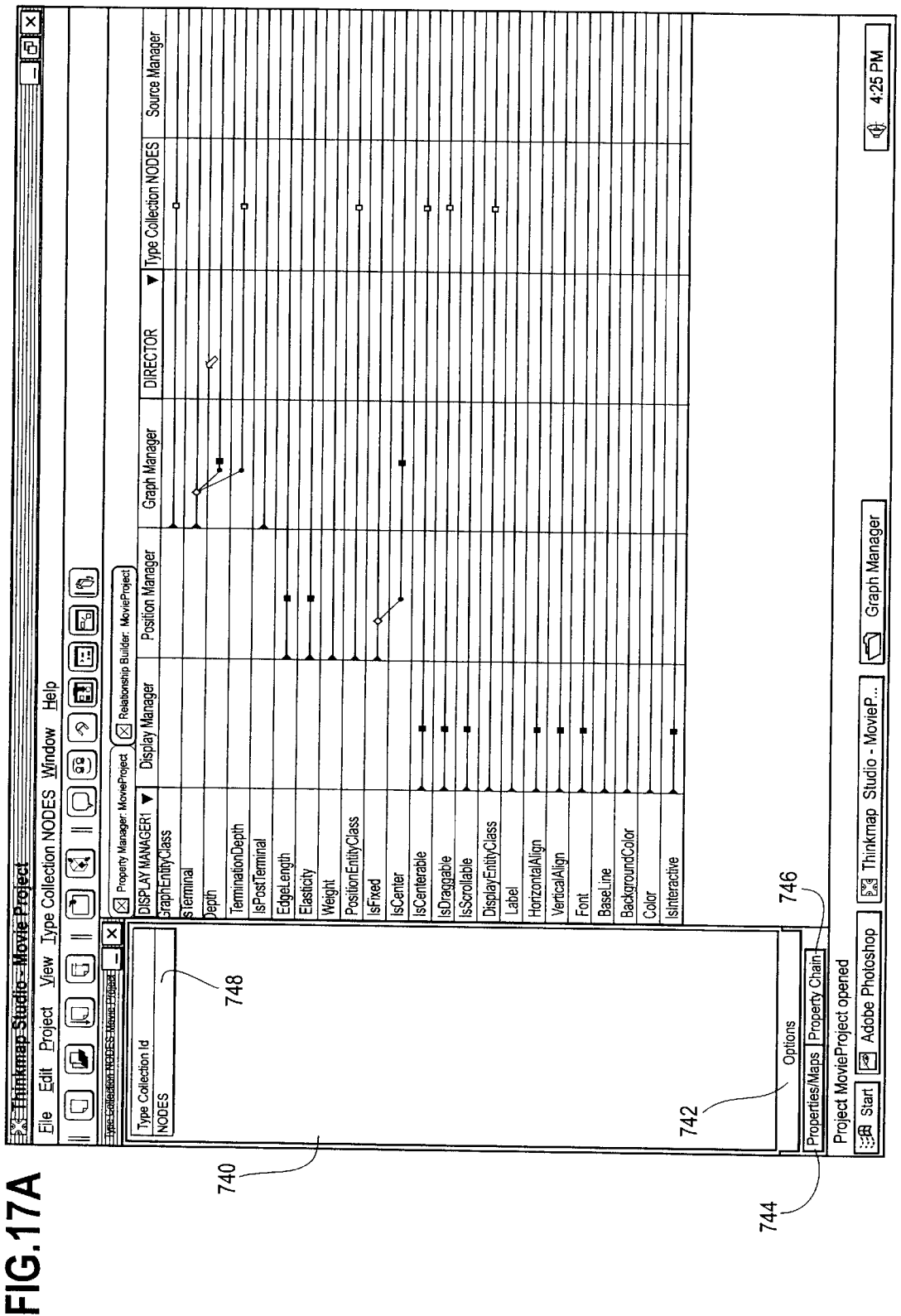
FIGS. 17A–17B are screen shots of the various options presented by the type collection node editor for the authoring software in FIG. 8.

By selecting the entity type node column 478 in the property manager screen 460 in FIG. 10, a user will display a type collection node window 740 shown in FIG. 17A. The type collection node window 740 has an options tab 742, a properties/maps tab 744 and a property chain tab 746. Selecting the options tab 742 as shown in FIG. 17A causes a type collection identification box 748 to be displayed in order for the user to define the type collection identification.

Figure 17B:
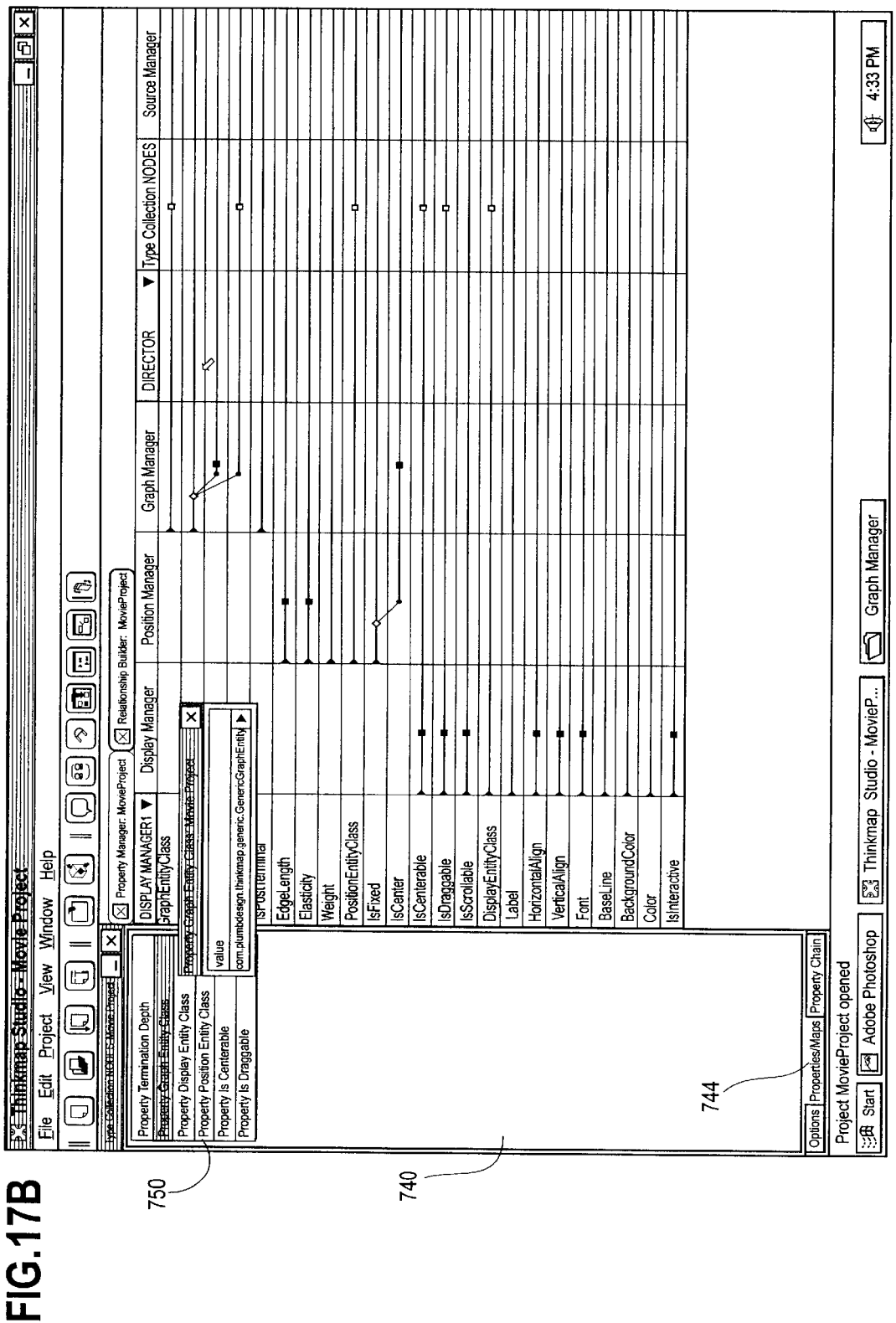

Selecting the properties/maps tab 744 causes a list of properties 750 to be displayed in the type collection node window 740 as shown in FIG. 17B. The list of properties 750 are all of the properties which are currently common to the node. A user may add properties or maps to this list via a pop up menu. Selecting the property chain tab 746 allows a user to show the property chain from the entity type sublevel.

Figure 18A:
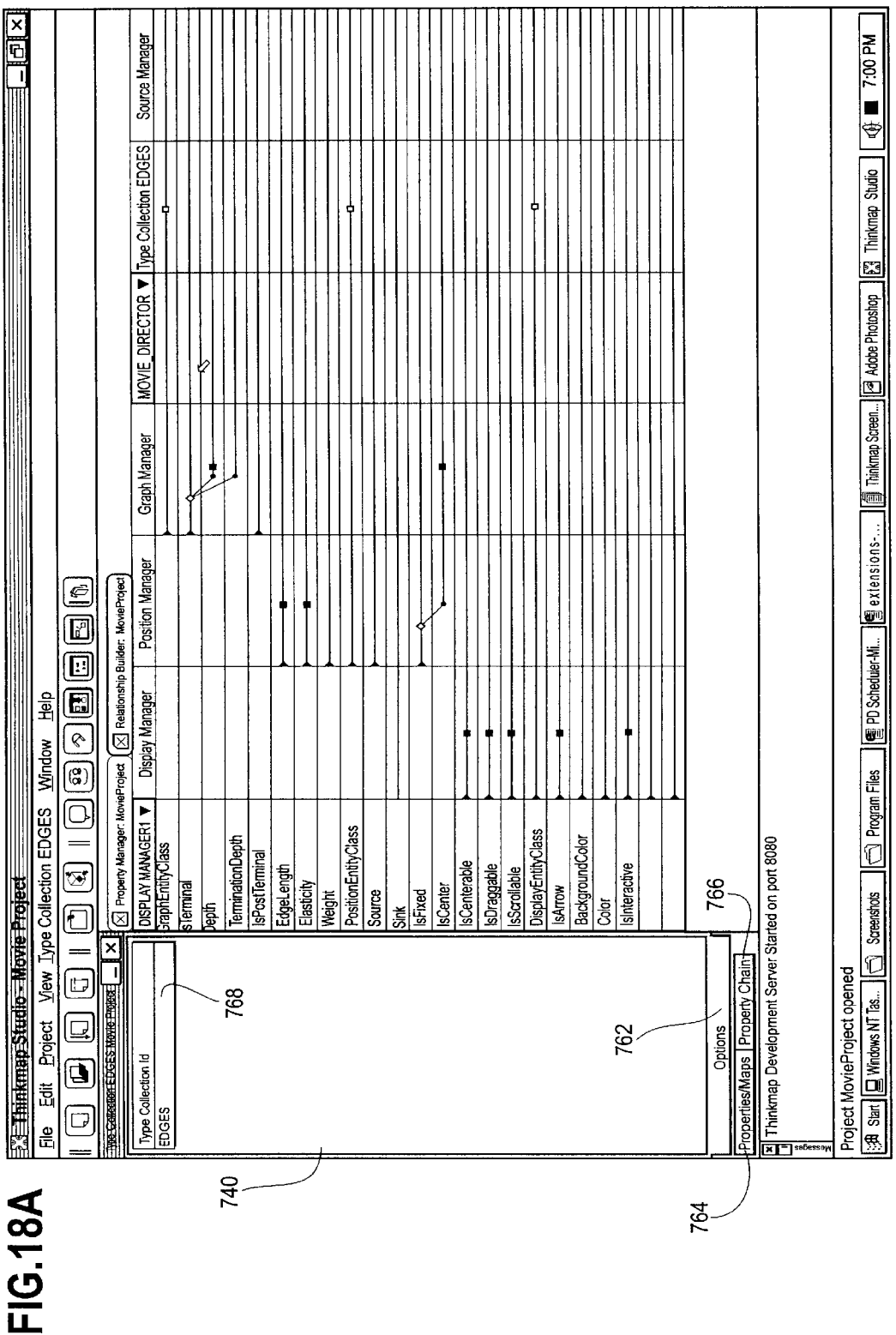
FIGS. 18A–18B are screen shots of the various options presented by the type collection edges editor for the authoring software in FIG. 8.

By selecting the type collection column 480 in the property manager screen 460 in FIG. 10, a user will display a type collection node window 760 shown in FIG. 18A. The type collection node window 760 has an options tab 762, a properties/maps tab 764 and a property chain tab 766. Selecting the options tab 762 as shown in FIG. 18A causes a type collection identification box 768 to be displayed in order for the user to define the type collection entity.

Figure 18B:
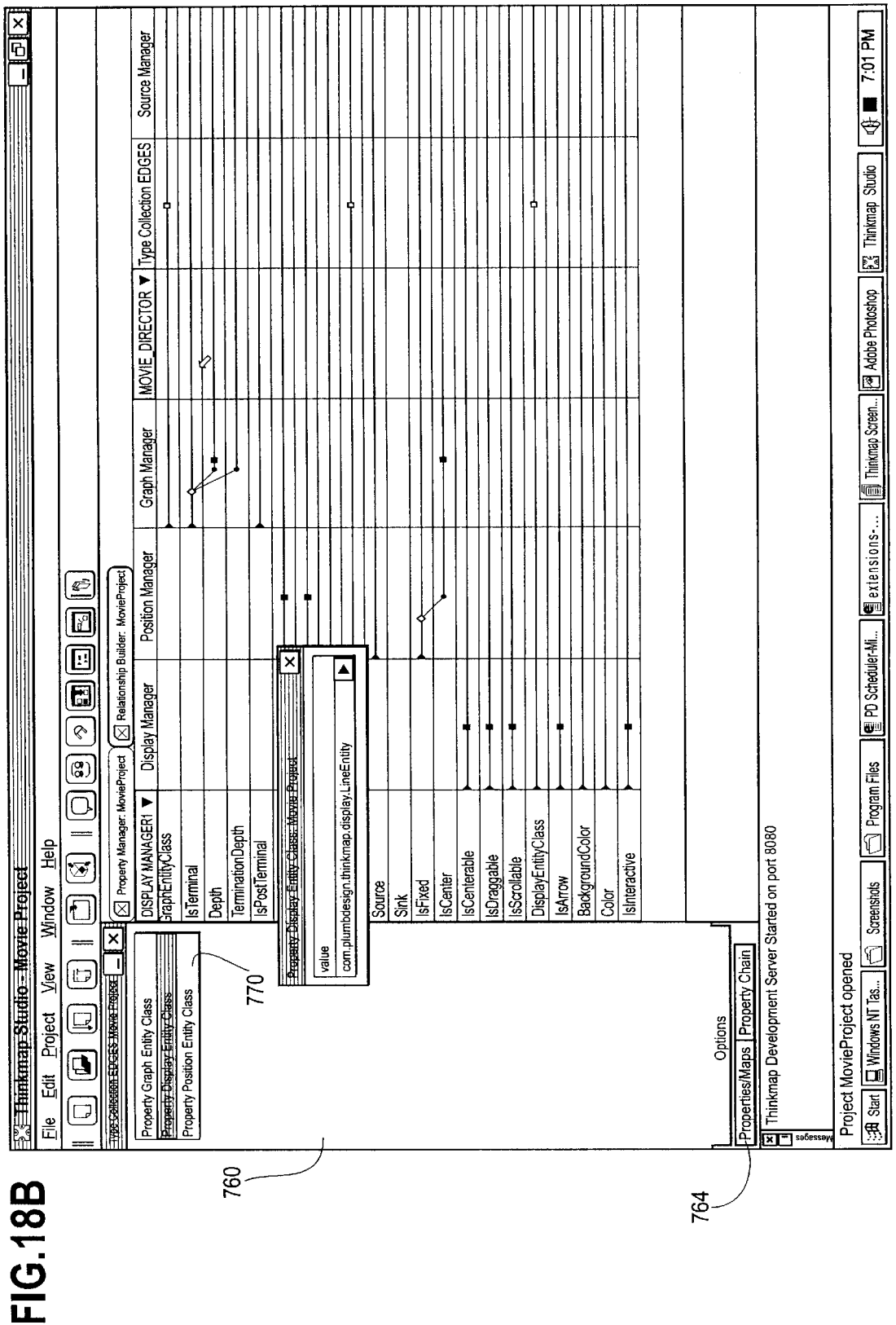

Selecting the properties/maps tab 764 causes a list of properties 770 to be displayed in the type collection node window 760 as shown in FIG. 18B. The list of properties 770 are all of the properties which are currently common to the node. A user may add properties or maps to this list via a pop up menu. Selecting the property chain tab 766 allows a user to display a property chain from the type collection sublevel.

Figure 19:
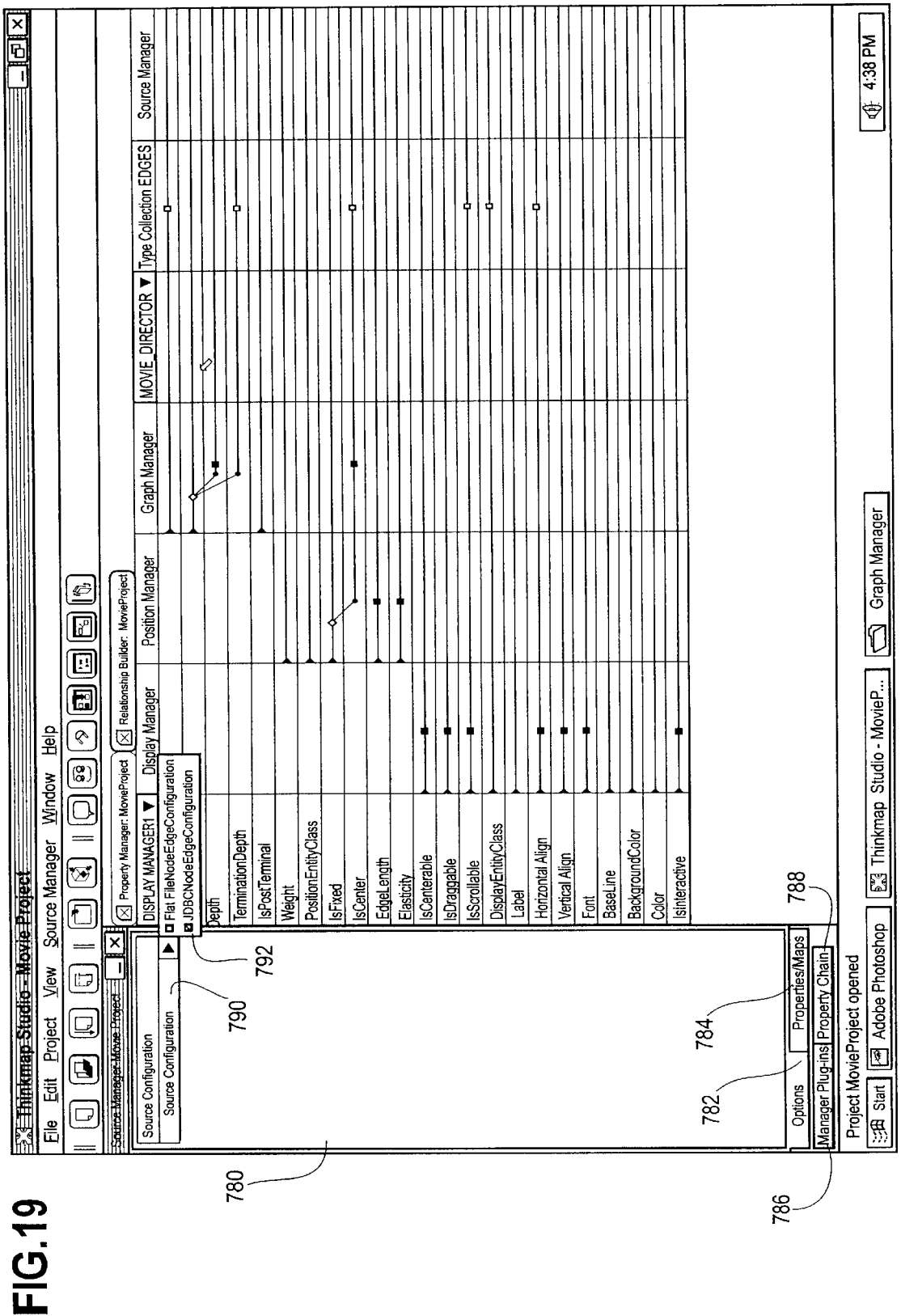
FIG. 19 is a screen shot of the various options presented by the source manager editor for the authoring software in FIG. 8.

By selecting the source manager column 482 in the property manager screen 460 in FIG. 10, a source manager window 780 is displayed as shown in FIG. 19. The source manager window 780 has an options tab 782, a properties/maps tab 784, a manager plug-ins tab 786 and a property chain tab 788. The options tab 782 is selected in FIG. 19 and a source configuration box 790 is displayed in the source manager window 780. The source configuration box 790 allows the display of a selection box 792 which allows a user to select whether the configuration is a flat file type or a relational database type.

Selecting the properties/maps tab 784 allows a user to display a list of properties currently active similar to the properties/maps tab 648 displayed by the display manager editor in FIG. 14A. Selecting the manager plug-ins tab 786 allows a user to select plug-ins for the source manager. Selecting the property chain tab 788 allows a user to display a property chain from the source manager.

C. Hierarchy Editor

Figure 20:
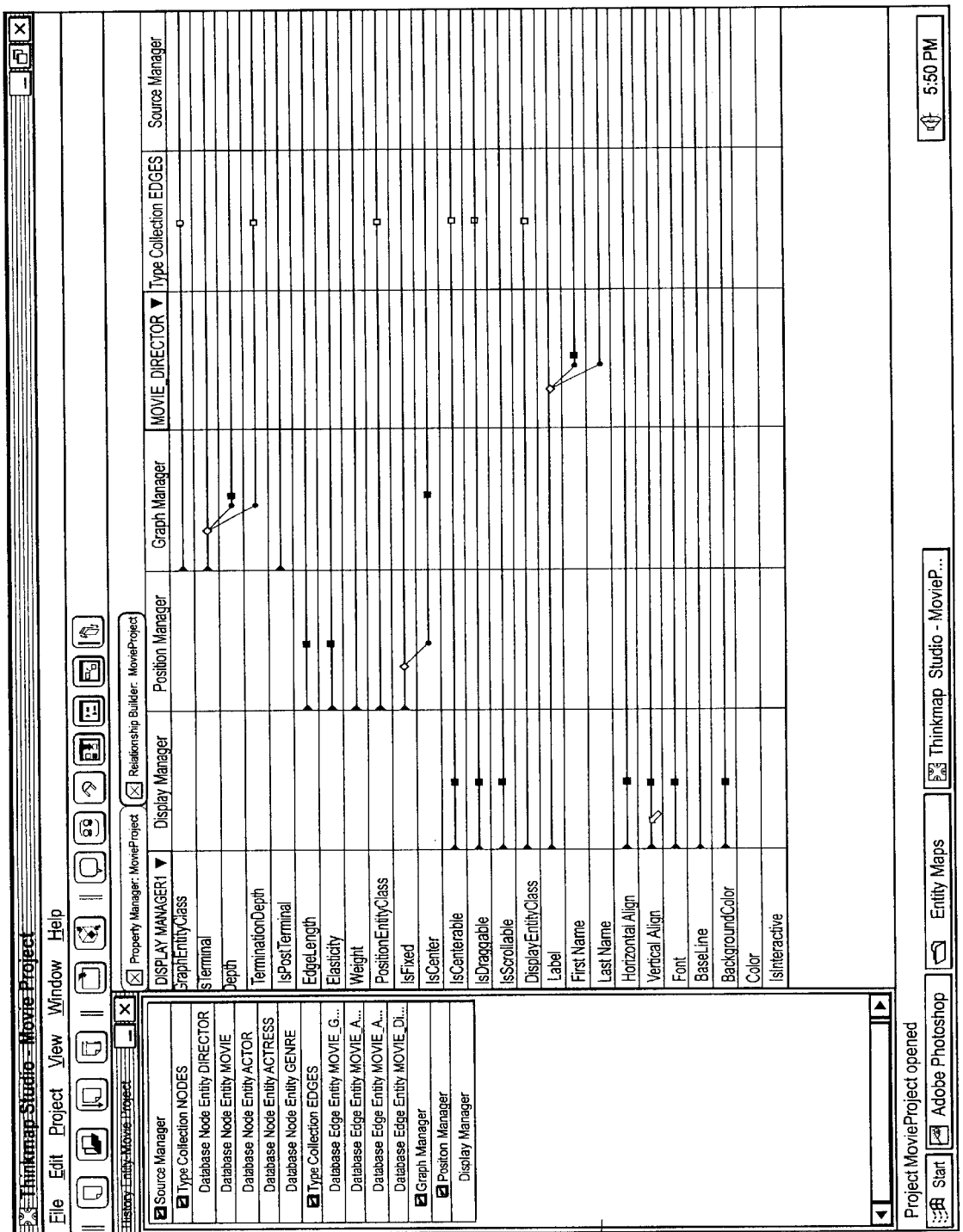
FIG. 20 is a screen shot of the various options presented by the hierarchy editor for the authoring software in FIG. 8.

By selecting the hierarchy editor option from the view menu 406 in either the introduction screen 400 in FIG. 8 or the property manager screen 460 in FIG. 10, a user may display a hierarchy editor window 790 shown in FIG. 20. The hierarchy editor window 790 provides a view of a property chain with icons listing the four managers and the two sublevels.

A user may edit any of the properties of the entities by selecting one of the listed icons. The appropriate manager editor window and property boxes will appear with options to change the settings on that window. A user may access the appropriate manager editor by left clicking the mouse. A new manager may be added by right clicking the mouse.

D. Preview and Deployment Options

Figure 21:
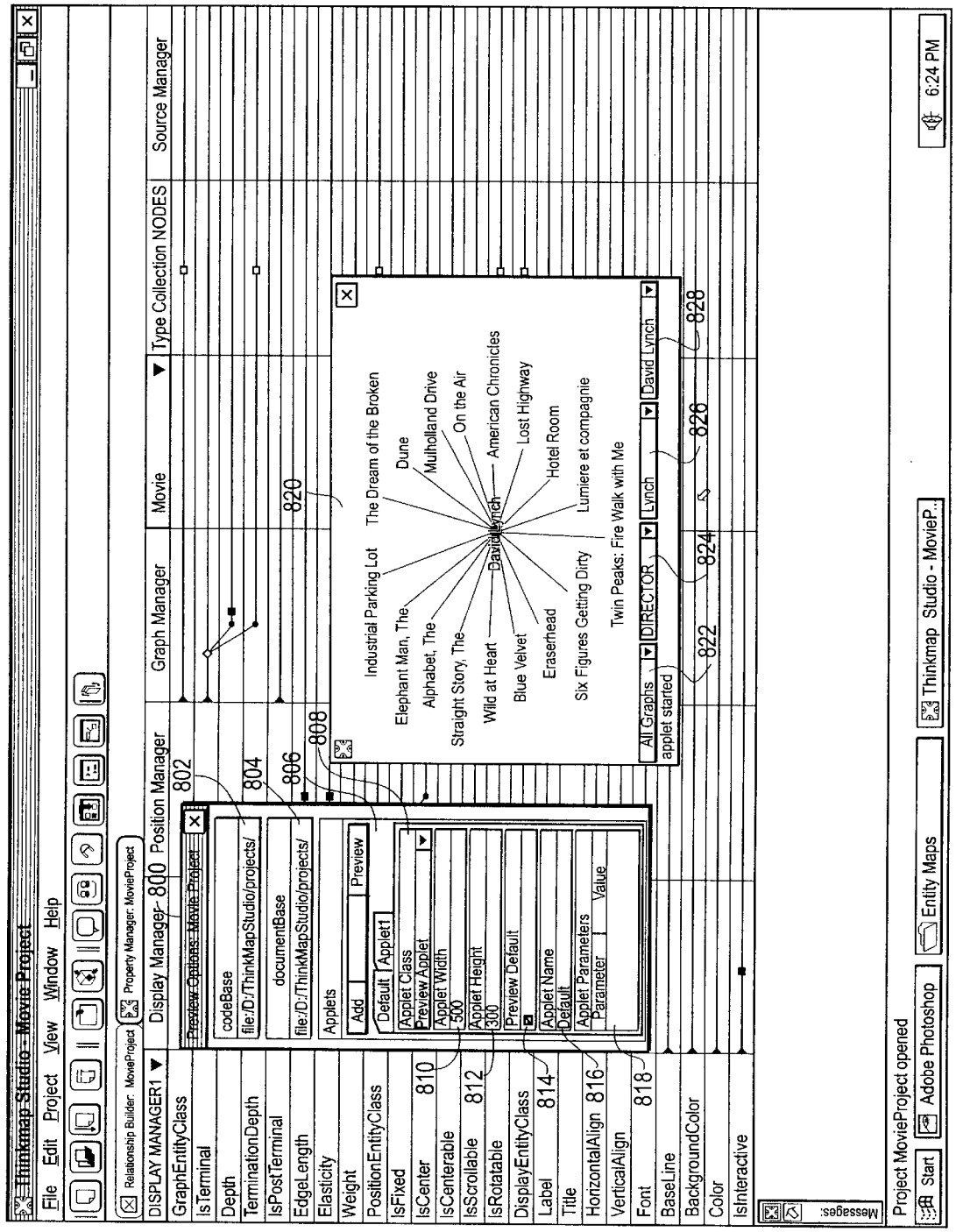
FIG. 21 is a screen shot of the options presented by the preview option for the authoring software in FIG. 8.

By selecting the project menu 462 on the property manager screen 460 in FIG. 10, a user may select the preview option which will display the visual representation at any stage of the development. The preview option first displays a preview options box 800 as shown in FIG. 21. The preview options box 800 has a code base field 802 which is the URL for the location of the applet and documentBase field 804 which is the URL for the location of the document.

An applets window 806 has a number of fields to allow a user to create Java Applets. The applets window 806 thus has an applets class field 808, an applet width field 810, an applet height field 812, a preview default option 814, an applet name field 816 and an applet parameters field 818. By filling in these fields, a user may define the applet created by the authoring program. By indicating the applet is a preview applet in the class field 808, a user may preview the appearance of the ultimate visual representation in a preview window 820.

The preview window 820 has a graphs field 822, an entity type field 824, a search field 826 and a results field 828. The graphs field 822 allows a user to select which graphs are traversed in the search for data to be displayed on the screen. In typical operation, only one graph is selected. The entity type field 824 has the name of the entity type which is being searched for. The search field 826 allows a user to type in a term or text to be searched in the entities of the graph. The results field 828 is a pulldown menu which lists all of the data which matches the search. The currently selected data in the results field 828 serves as the center entity in the preview window 820.

Figure 22:
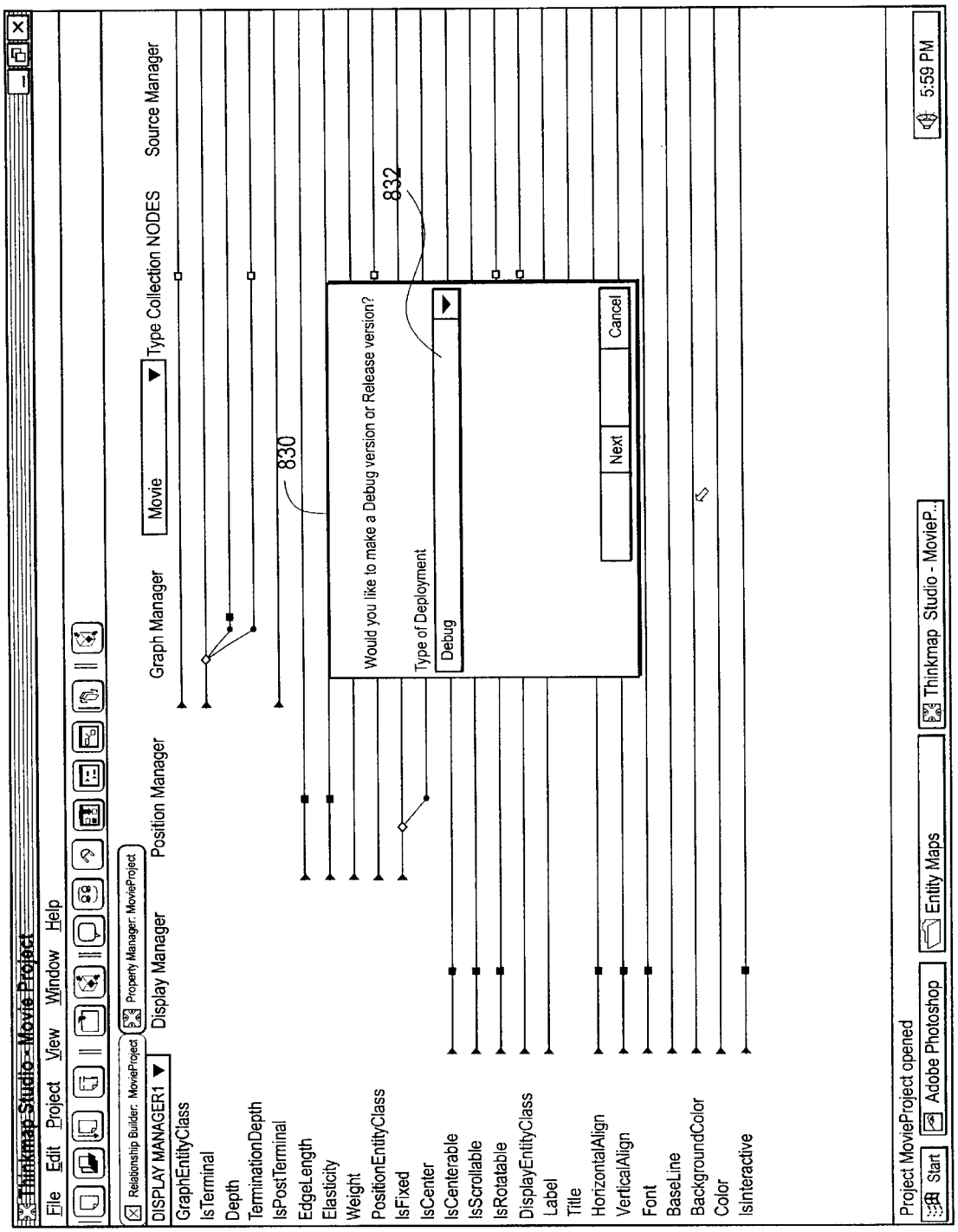
FIG. 22 is a screen shot of the options presented by the deployment command for the authoring software in FIG. 8.

By selecting the project menu 462 on the property manager screen 460 in FIG. 10, a user may select a deploy option. The program then allows deployment of the completed data representation file to a local server by displaying a deployment wizard box 830 shown in FIG. 22. The deployment wizard box 830 has a type of deployment field 832 which lists a debug option or a release option. The debug option allows a user to only deploy the completed applet to a production server and includes relevant debugging information in the applet. The debugging information may include various debugging symbols in the object code. The release option deploys the completed applet to any selected computer and does not contain debugging information in the applet. The deployment wizard also allows a user to select whether to test the representation within a browser program and whether completed applets are active. Finally, the deployment wizard allows a user to add extra files to be used in the deployment. The deployment wizard stores the settings noted above. The deployment wizard also presents a view of the completed map such as in FIGS. 2 or 3.

Returning to FIG. 8, the view menu 406 also allows a user to set the parameters such as location password, access log in, viewing an administration log of the server with the server manager option. The view menu 406 also allows a user to view the source file for the web representation using the source editor viewer option and view the plug-ins currently applied using the plug-in viewer option. The source file in this example is displayed in XML but any other appropriate web based source may be used.

IV. Authoring Graphical Representations
A. Single Graph Representations Using the various screens described above in FIGS. 9–22 in the authoring program, a user may produce different visual representations for any data source. Examples of visual representations are shown in FIGS. 2 and 3. Producing a simple spider web type visual representation as shown in FIG. 2A & 2B involves first selecting the appropriate data source using the project wizard in FIGS. 9A–9C.

Figure 23A:
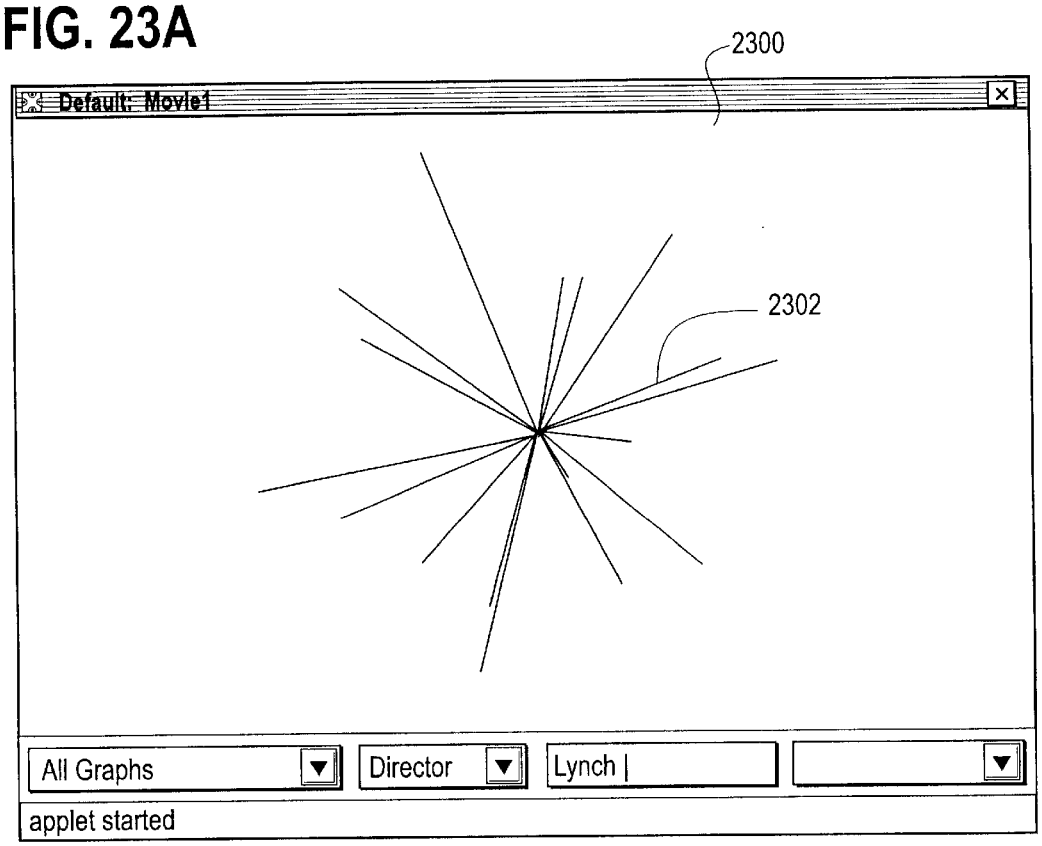
FIGS. 23A–B are screen shots of preview windows showing stages of the development of a spider type graphical presentation.

The data from the selected data source is defined using the flat tile builder as shown in FIGS. 10A–10C in the case of a flat file such as the flat data file 200 in FIG. 4. Once the flat file builder sequence is completed, or if the data source is a relational database, the relationship builder as shown in FIGS. 12A–12C is used to define the nodes and edges for the graphical representation. In this example, the graphic representation is a director name taken from the data table 202 and the names of movies associated with the director taken from the data table 202. The node and edge editors shown in FIG. 12C are thus used to associate this data with the appropriate nodes. The preview option in FIG. 21 is used to display an initial graphical representation 2300 shown in FIG. 23A. The graphical representation 2300 only displays lines 2302 showing relationships between the center nodes and other nodes. The nodes are not visible because the properties of the entities necessary for their display on the screen have not yet been defined.

The property manager editor screen 460 is then used to define properties for the nodes of the spider web in order to present information. The property manager editor screen 460 allows the user to select maps using the map editors to equate currently defined properties with user defined properties on the display. In this example, a user maps the movie title (a user defined property) to the label property for the nodes and the first and last name of the director (a user defined property) to the label property for the center entity. This causes the text information to appear in the display. In the property manager editor 460 in FIG. 10, a white diamond would appear on the label property line.

Figure 23B:
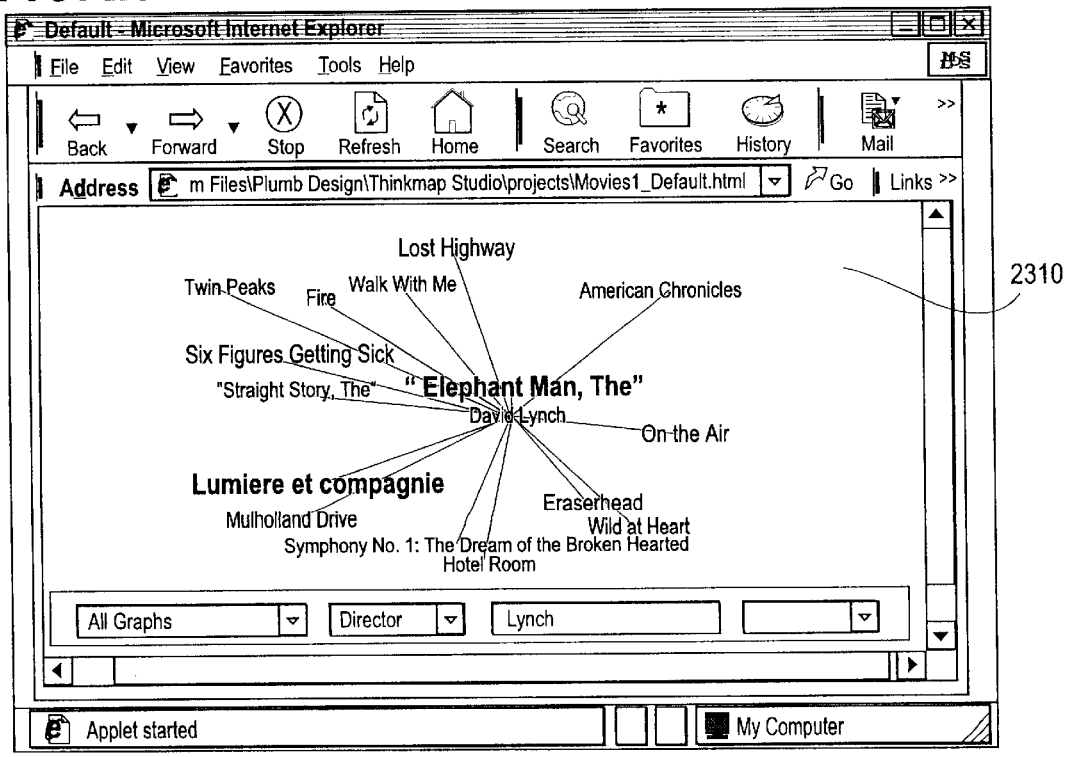

Diagonal lines would connect the white diamond to the newly defined first and last name property lines. After doing so, the preview menu is selected resulting in a graphical representation 2310 as shown in FIG. 23B. Other options such as the font, colors, background, etc. may be adjusted using the position and manager editors and appropriate plug-ins.

The user may also use the same data and change the graphical representation to the form of a bubble representation as shown in FIG. 3. The bubble representation in FIG. 3 is a type of display where the items in the display are sorted by years to form a list. Using the process described above, the relationship builder screen in FIG. 12C is used to activate the year field in relation to movie data in the appropriate node editor box.

Figure 24A:
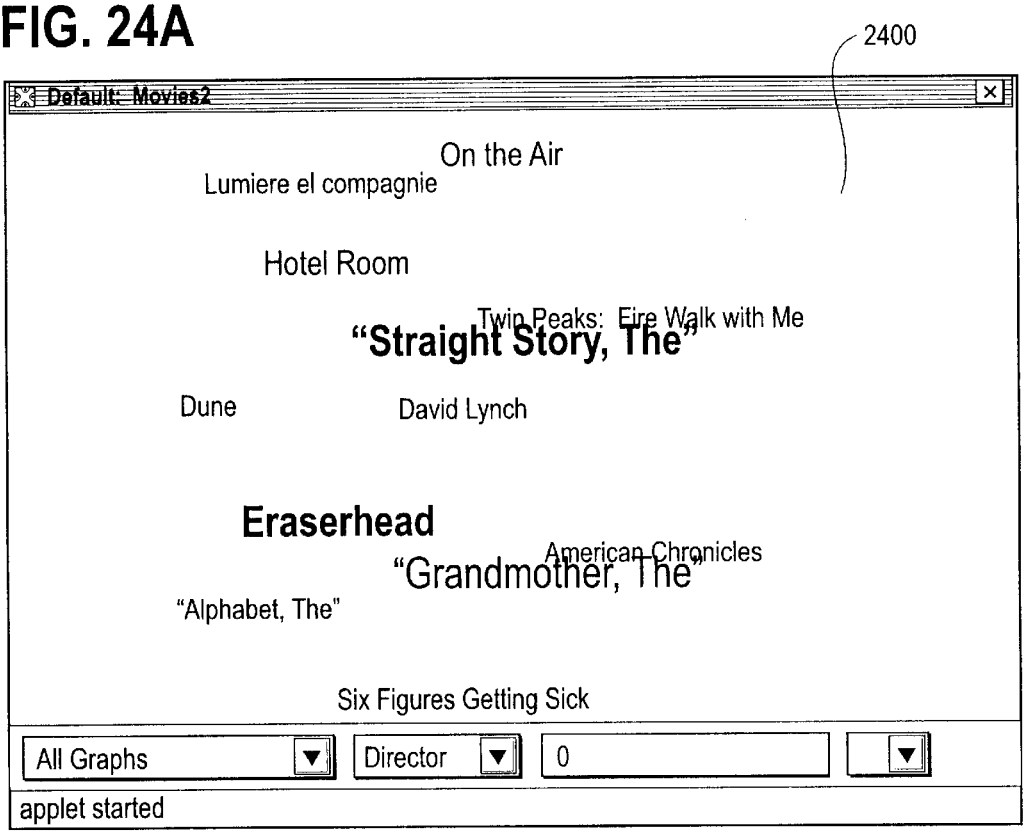
FIGS. 24A–B are screen shots of the preview windows showing stages of the development of a bubble type graphical presentation.

Since no relationships are shown in the bubble type displays, the edges are removed by the user in the property manager editor screen 460 in FIG. 10 by clicking on the line corresponding to the Display EntityClass property. Initially, the edges are defined as lines on the graphical representation. After the map editor box is displayed, a user selects the remove option which causes the lines to be removed from the display as shown in graphical representation 2400 displayed by selecting the preview option in FIG. 24A. In order to remove the random positioning of the nodes shown in FIG. 24A, the PositionEntity Class is removed in the Type Collection column. The initial placement of the nodes is still random and thus the random layout is removed using the position manager editor screen in FIG. 15C. The movie nodes may be moved into order by selecting the Bubble Motion informotion in the position manager editor which will put the nodes in bubble order as described above when the sort property is given as the year of the movie.

Figure 13:
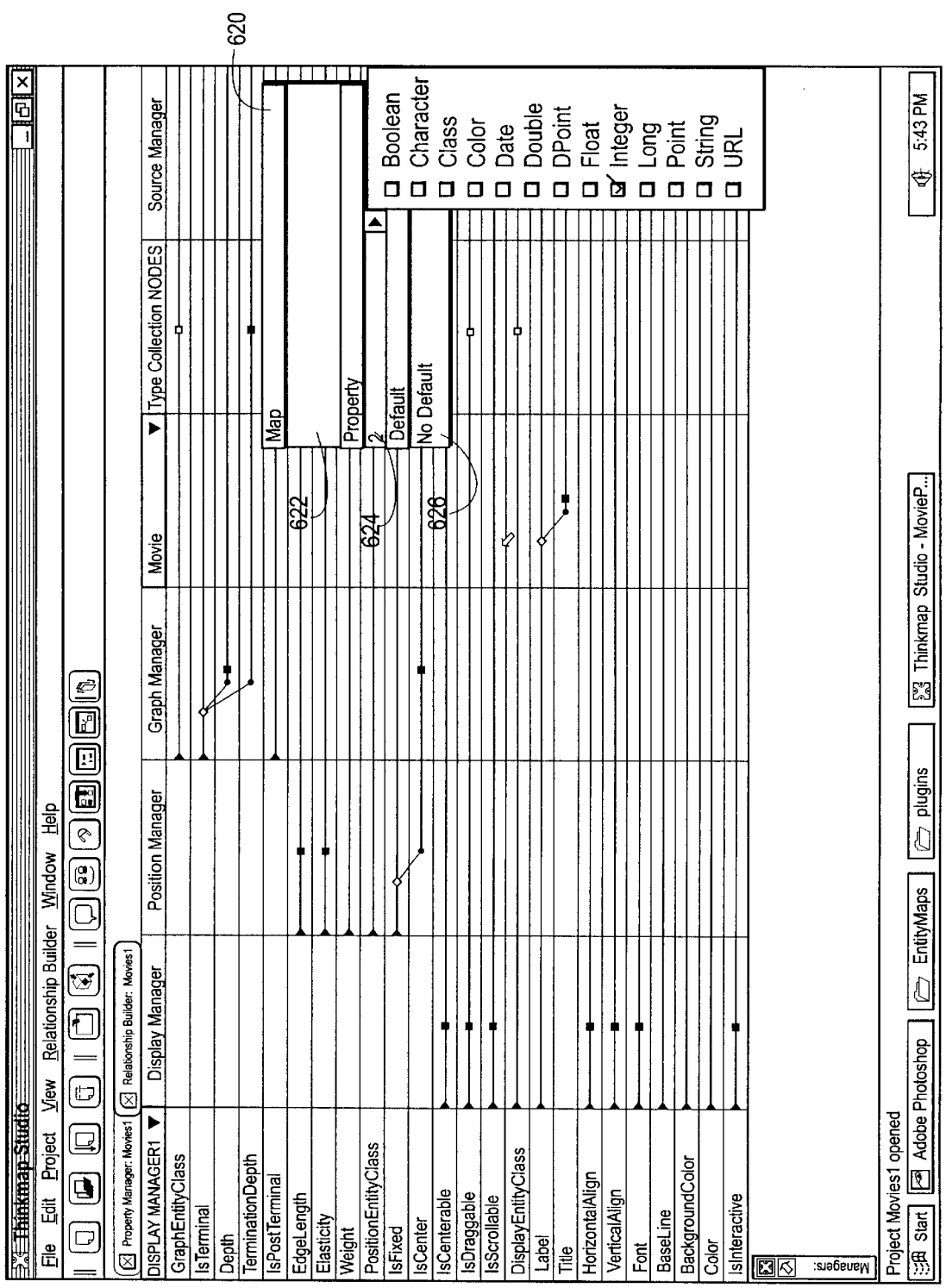
FIG. 13 is a screen shot of the map editor for the authoring software in FIG. 8.
Figure 24B:
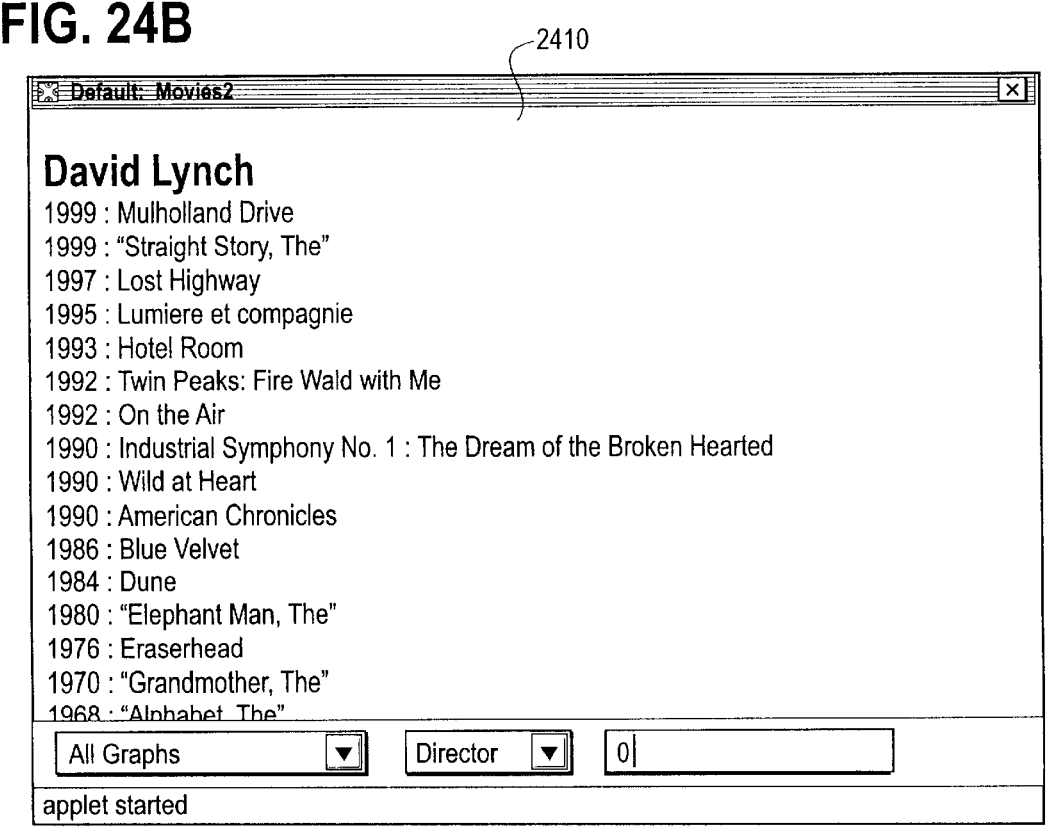

The display of node information is performed by mapping the known Label entity to the user defined property of year and title using a map editing box 620 as shown in FIG. 13. The user may also change the color and other display attributes of the label via the color presentation menu and font properties in the display manager editor screen 460 shown in FIG. 10. The user may define interactivity of node types by setting the IsInteractive property in the display manager as the fade in and fade out, length of the edges and interactivity with input devices such as a mouse. The preview function now shows a new bubble display 2410 as shown in FIG. 24B which allows the selection of a director in the search field.

The data records in a relational database may also be displayed by the graphical representations shown in FIGS. 2, 3 or 23. The relational database is setup and selected using the project wizard in FIGS. 9A–9C in order to select a server and the location of the relational database. The user then uses the relationship builder in order to create node and edge entity types from the relational databases in FIGS. 12A–12C.

Figure 25A:
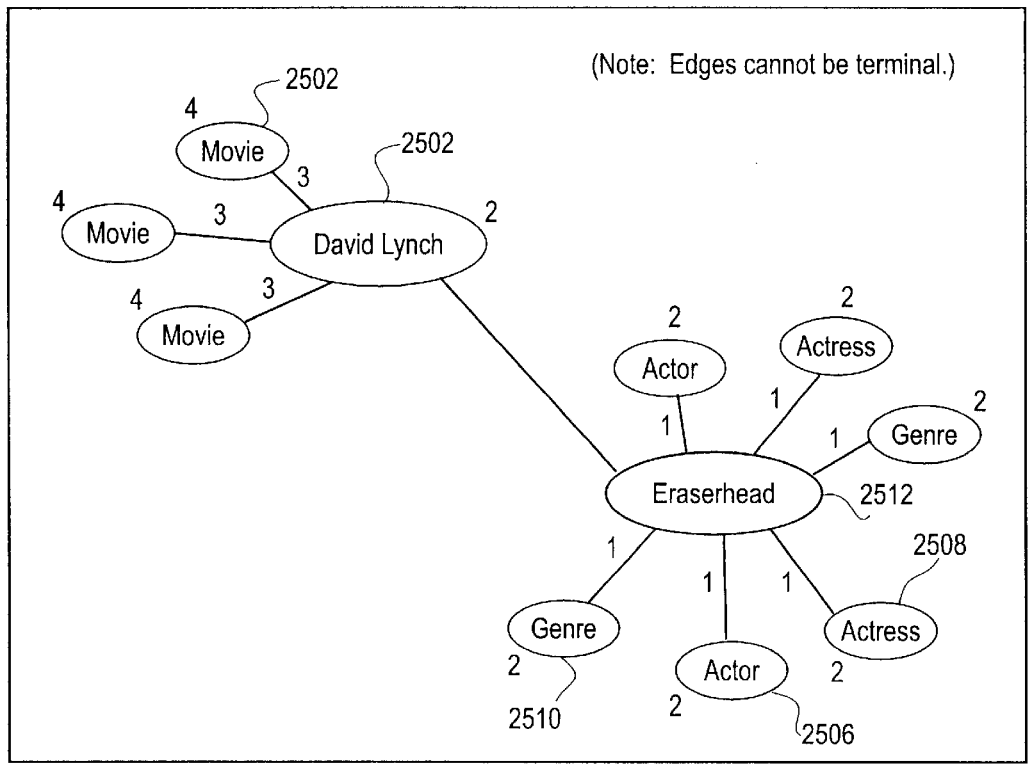
FIG. 25A is a chart showing the termination conditions of various nodes displayed from a data source.
Figure 25B:
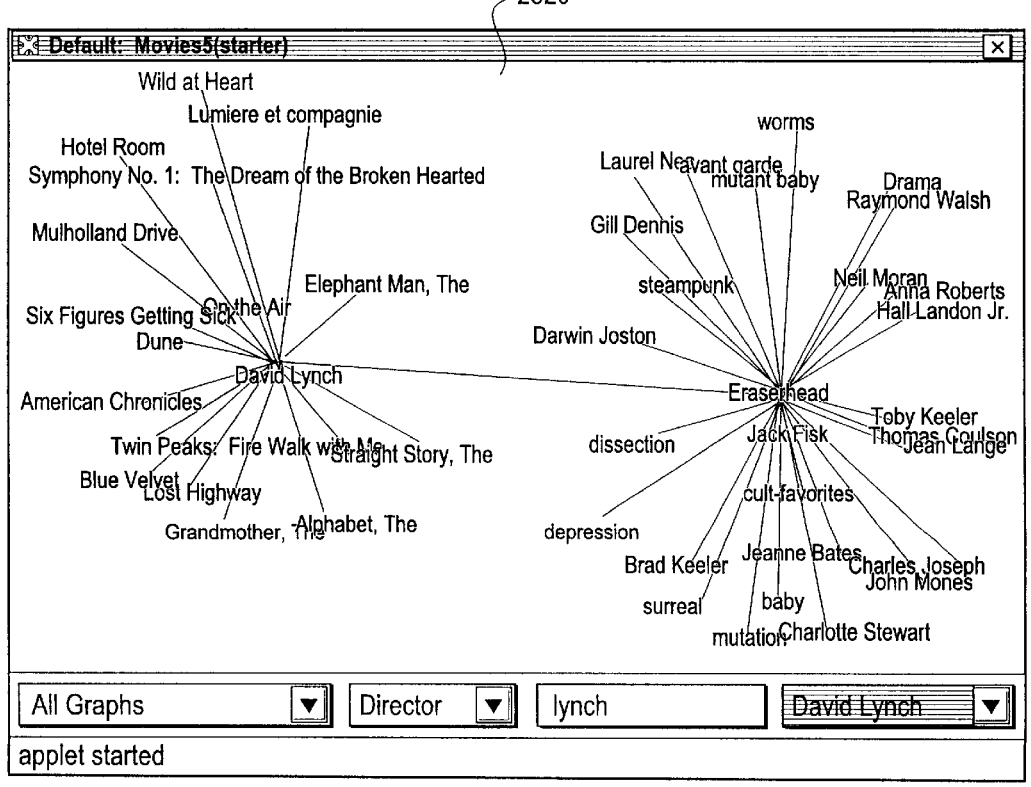
FIG. 25B is a screen shot of a preview window of a spider graphical representation of the termination condition shown in the chart in FIG. 25A.

In order to limit the amount of data in the graphical representation, the user sets the IsTerminal property under the graph manager column in the property manager screen 460 in FIG. 10. The node types will each allow a user to set the termination depth which considers the data until it locates a node or edge entity that meets its criteria via the traversal process to the depth of the traversal. The termination condition is set at a default condition of 2 levels but a user may specify the depth of the traversal via the map property editor box. Each of the nodes may be assigned different termination depths as shown in FIG. 25A where a set of movie entities 2502 have a termination depth of 4, a set of director, actor, actress, and genre entities 2504–2510 have a termination depth of 2 and a movie entity 2512 has a termination depth of 1. The preview of the data with the termination is shown as a spider web representation 2520 in FIG. 25B.

B. Multiple Graph Representations

Figure 26A:
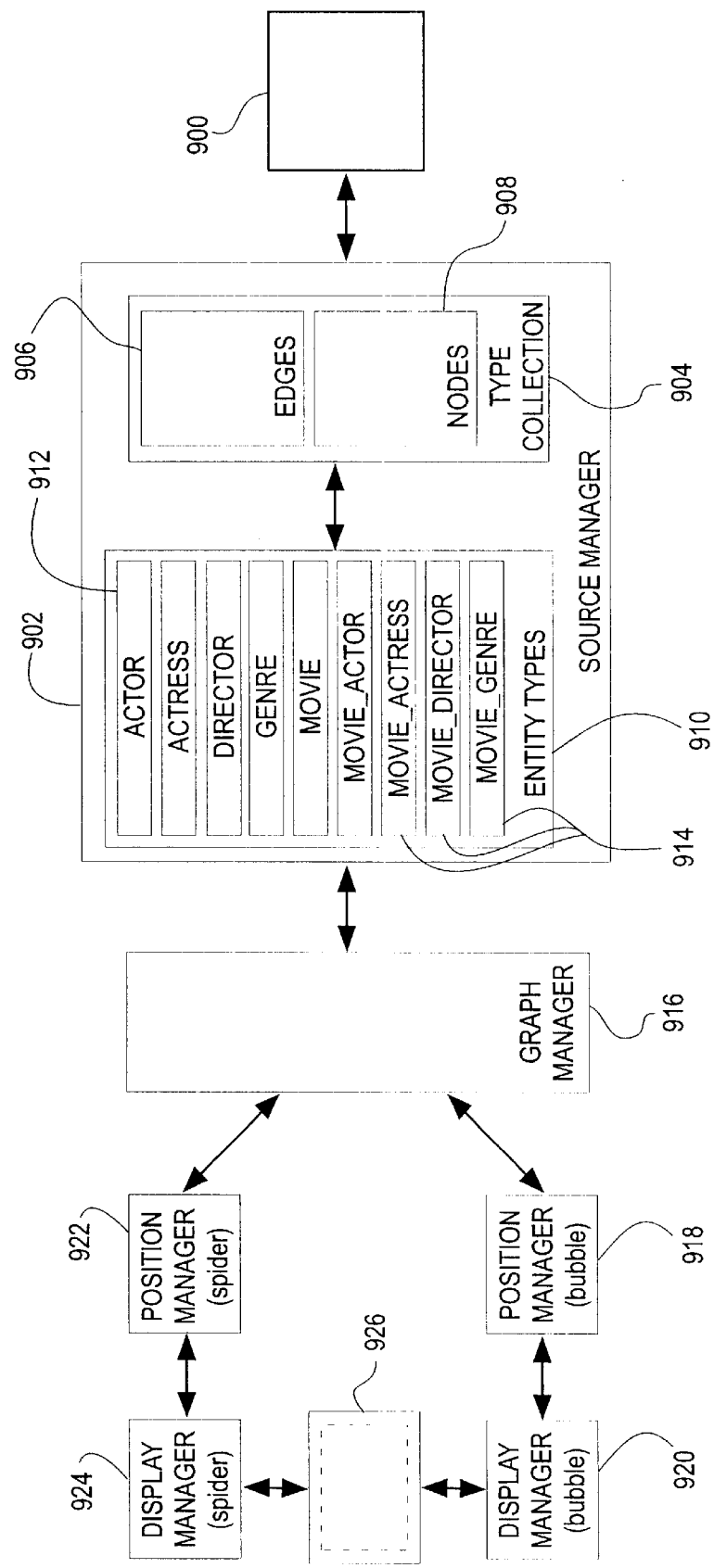
FIG. 26A is a block diagram of the manager for a combined graphical presentation of data in a data source.

The different graphical representations of data may be combined. For example, the spider web representation in FIGS. 23A–B and the bubble representation in FIGS. 24A–B may be combined. The creation of such a combined graphical representation involves the creation of additional managers using the hierarchy manager described in FIG. 19. FIG. 26A is a block diagram of the managers for a multiple display graphical representation. As with the relational database 200 in FIG. 4, a data source 900 in this example is a relational database which has tables with different data related to movies. A source manager 902 interfaces with the data source 900. The source manager 902 has a type collections sublevel 904 with an edges entity 906 representing the relationship between data types and a nodes entity 908 which represent the various data tables. The source manager 902 has an entity types sublevel 910 which has a number of nodes 912 having actor, actress, director, genre and movie data as well as edges 914 representing relationships between movie and actor, movie and actress, movie and director, and movie and genre.

The source manager 902 interfaces with a graph manager 916. The bubble representation has a position manager 918 and a display manager 920 which interface with the graph manager 916. The spider representation also has a position manager 922 and a display manager 924 which interface with the graph manager 916. The data source 900 contains common data represented by common entities managed by the graph manager 916 and the source manager 902. The display of the data represented by these entities is handled separately by the different spider and bubble position and display managers to generate the graphical representation on a display 926.

Figure 26B:
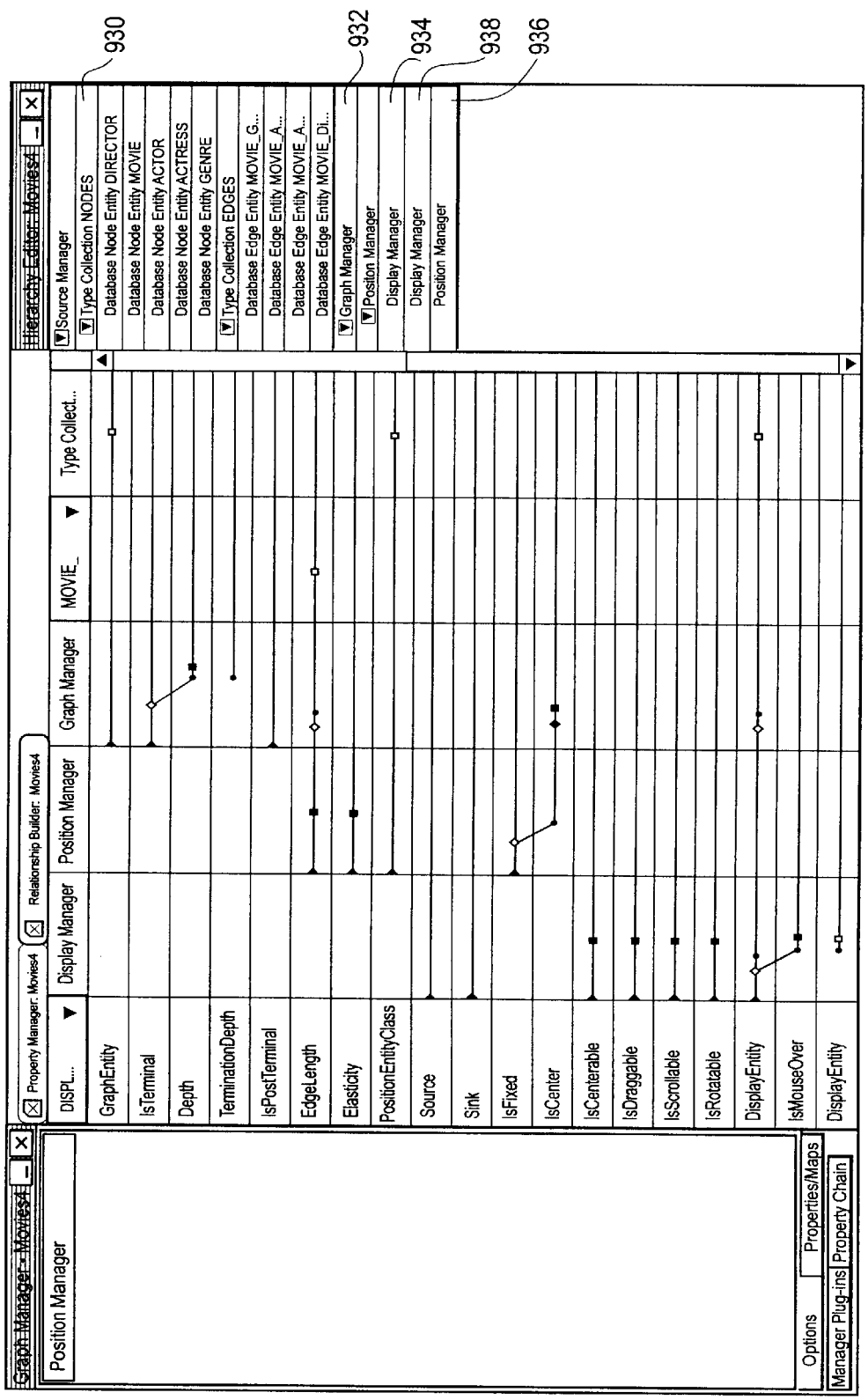
FIG. 26B is a screen shot of the hierarchy editor used to create the combined graphical presentation referenced in FIG. 26A.

The user first opens the hierarchy editor screen as shown in FIG. 26B which shows a property chain 930. The property chain 930 includes bars which allow a user to quickly access the appropriate editor screens shown in FIGS. 13–18. The database nodes and edges are listed under the type collection nodes and type collection nodes. An initial display manager bar 932 and an initial position manager bar 934 are presented. By right clicking on the mouse a new position manager bar 936 and a new display manager bar 938 for the bubble representation are created. The property manager display shares the graph manager, entity type, type collection and source manager columns. Thus, each requested property in these columns is common to both displays. However properties for the two different position managers and display managers differ depending on a user's preferences for the graphical display.

Figure 26C:
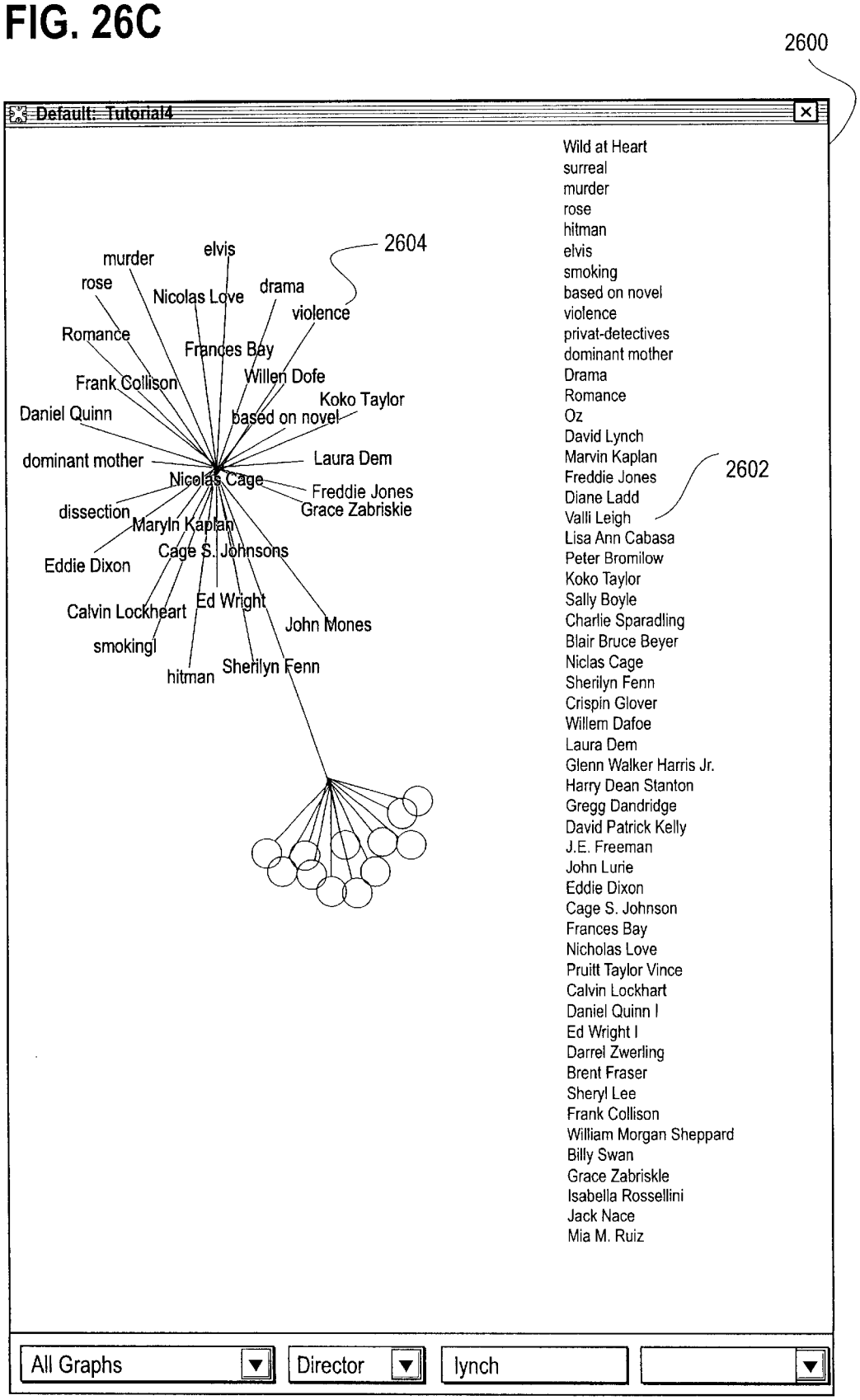
FIG. 26C is a screen shot of a preview screen of the combined graphical representation in FIG. 26A.

The process of creating a combined display involves setting the properties, informotions and layouts of the bubble and spider representation as described above for each of the respective editing screens for the bubble display and position managers 918 and 920 and the spider display and position managers 922 and 924 in FIG. 26A. The resulting graphical representation 2600 is shown in FIG. 26C. The graphical representation in FIG. 26C has a bubble map representation 2602 as well as a spider representation 2604. By setting the properties, a user can shift the map to different displays by centering different nodes to display different related data.

By using the URL links and Java properties described with the display manager, a user may create graphical representations which access world wide web information. For example, by defining a property to access a URL when a mouse is clicked over it, a user may display a web page from the URL link as a separate window on the display.

It will be apparent to those skilled in the art that various modifications and variations can be made in the method and system of the present invention without departing from the spirit or scope of the invention. Thus, the present invention is not limited by the foregoing descriptions but is intended to cover all modifications and variations that come within the scope of the spirit of the invention and the claims that follow.

What is claimed is:

1. An authoring system for producing a computer programming object for the graphical representation of data items from a data source, the programming object having a collection of entities representing at least one data item, the authoring system comprising:

a display manager editor routine which creates a display manager which manages display entities for the formatting of graphics on a display screen representing the data items, including a display entity having properties which define the appearance of a graphic representing the data item on the display screen;

a position manager editor routine which creates a position manager which manages position entities for location of the data items in a global space, including a position entity having properties which define a location of the data item in the global space;

a graph manager editor routine which creates a graph manager which manages graph entities for selection of data items from the data source, including a graph entity having properties which determine the selection of the data item;

a source manager editor routine which creates a source manager which manages source entities which have properties to represent the data items.

2. The authoring system of claim 1 wherein the data source includes data records containing relation data representing the relation between data items, the programming object having a collection of entities representing the relation between data items, wherein the display manager editor routine creates display entities for the formatting of graphics on a display screen representing the relation between data items, the display entities having properties which define the appearance of a graphic representing the relation between data items on the display screen;

wherein the position manager editor routine creates position entities for location of the relation data in a global space, the position entities having properties which define a location of the relation data in the global space;

wherein the graph manager editor routine creates graph entities for selection of relation data from the data source, the graph entities having properties which determine the selection of relation data; and wherein the source manager editor routine creates source entities which have properties to represent the relation data item.

3. The authoring system of claim 2 further comprising:

a type collection entity editor which provides groups of entities; and a entity type editor which provides common properties for entities.

4. The authoring system of claim 3 further comprising a relationship builder, the relationship builder having:

a node editor which allows creation and editing of a node entity type, the node entity type having properties related to a data item in the data source;

an edge editor which allows creation and editing of an edge entity type, the edge entity type having properties related to the relation between data items in the data source; and wherein the node and edges are managed by the entity type collection editor.

5. The authoring system of claim 2 wherein the data source is a relational database.

6. The authoring system of claim 3 further comprising an editor display screen showing a graphical representation of all properties of the entities, the graphical representation including a symbol for indicating which manager or sublevel manages the entity requesting the property and a default symbol representing a default value, a user symbol representing a user defined value, and a map symbol designating a user defined property.

7. The authoring system of claim 2 wherein the data source is a flat file database having data fields separated by a known symbol; and the system further comprising a flat file builder which determines the separate data fields and the known symbol in the flat file data base and allows categorization of the data fields as a data type.

8. The authoring system of claim 2 wherein the graph entities further include a depth property, and the graph manager editor routine further includes a traversal routine allowing the user to set the depth property to select data items from the data source based on the level of their relation to a selected center data item.

9. The authoring system of claim 2 wherein the graph entities further include a thresholdnode entity and a thresholdedge entity, and the graph manager editor routine further includes a traversal routine allowing the user to select the data items from the data source based on network flow determined by the thresholdnode and thresholdedge entities.

10. The authoring system of claim 1 wherein the display manager editor has selections for a background of the graphical representation, selections for the location of the background and a selection for the three dimensional display of the representations of the data record.

11. The authoring system of claim 1 wherein the position manager editor has a layout routine which determines the initial position in global space of the position entities.

12. The authoring system of claim 11 wherein the position manager editor has a layout routine list which allows selection of a second layout routine, the second layout routine when applied also determining the initial position in global space of the position entities.

13. The authoring system of claim 11 wherein the layout routine allows a user to select a condition by which the routine is applied to a position entity.

14. The authoring system of claim 1 wherein the position manager editor has a motion routine which determines the movement in global space of the position entities.

15. The authoring system of claim 14, wherein the position manager editor has a motion routine list which allows selection of a second motion routine, the second motion routine also determining the movement in global space of the position entities when it is selected.

16. The authoring system of claim 14 wherein the motion routine allows a user to select a condition by which the motion routine is applied to a position entity.

17. The authoring system of claim 1 wherein the display, position, graph and position managers and entities are arranged in a hierarchy and wherein each entity may create a property request to request a value for a property from the managers and entities in the order of the managers and entities in the hierarchy, the system further comprising a mapping editor allowing the definition of a created property to be obtained from a defined property value of the managers, entities or data source.

18. The authoring system of claim 17 wherein the mapping editor further includes the option of applying the defined property value to a created property under a user defined condition.

19. The authoring system of claim 1 wherein the computer programming object is transmitted over the Internet and interfaces with a web browser program.

20. The authoring system of claim 1 wherein the data source is stored on a remotely accessed computer from a computer storing the authoring system.

21. The authoring system of claim 1 further comprising a deployment routine which produces a debug version having debugging symbols in the object code of the programming object.

22. The authoring system of claim 1 wherein the display manager editor creates a second display manager which manages display entities for the formatting of a second set of graphics on a display screen, including a second display entity having properties which define the appearance of a second graphic representing the data item on the display screen; and wherein the position manager editor creates second position manager which creates a second set of position entities for location of the second position entities in the global space, including a position entity having properties which define a second location of the data item in the global space.

23. A computer programming object for rendering a graphical representation of a data item from a data source on the screen of a client computer, the computer programming object having:

a display manager routine which creates a display entity for the display of graphics on the display screen which represent the data item, the display entity having at least one property which defines the appearance of the graphics on the display screen;

a position manager routine which creates a position entity for placement of the data item in a global space, the position entity having at least one property which defines the location of the data item in the global space;

a graph manager routine which creates a graph entity for selection of the data item from the data source, the graph entity having at least one property which determines the selection of data item; and a source manager routine which creates a source entity which has at least one property to determine the interface with the data item from the data source.

24. The programming object of claim 23 wherein the data source further includes relation data indicating the relation between data items in the data source and wherein the display manager routine which creates a display entity for the display of graphics on the display screen which represent the relation data;

wherein the position manager routine which creates a position entity for placement of the relation data in a global space, the position entity having at least one property which defines the location of the relation data in the global space;

wherein the graph manager routine which creates a graph entity for selection of the relation data from the data source, the graph entities having at least one property which determines the selection of relation data; and wherein the source manager routine which creates a source entity which has at least one property to determine the interface with the relation data from the data source.

25. The programming object of claim 24, wherein the graphical representation has:

a plurality of graphics representing data records in the data source each having a display entity, one of the graphics having a display entity with a property defined as a central graphic on the screen;

at least one graphic representing another data record being rendered in relation to the central graphic; and wherein selection of the one graphic representing another data record by a user input device causes the display of a second graphical representation redefining a property of the display entity as the new central graphic on the screen.

26. The programming object of claim 23 wherein the graphics representing data records include a URL which enables access to a related web page.

27. The programming object of claim 23 wherein the graphics representing the data items are arranged according to sequential data in the data items.

28. The programming object of claim 23 wherein the graphics are moved on the screen by user inputs according to properties defined by the display entities.

29. The programming object of claim 23 wherein the data source is a relational database.

30. The programming object of claim 23 wherein the data source is a flat file having data fields separated by a known symbol.

31. The programming object of claim 23 wherein the computer object is transmitted over the Internet and may be interfaced with an internet virtual device.

32. The programming object of claim 31 wherein the computer object is compatible with a java enabled web browser program.

33. The programming object of claim 23 wherein the data source is stored on a remotely accessed computer having a connection to the client computer.

34. The programming object of claim 23 wherein the data source is stored on the client computer.

35. The programming object of claim 23 further comprising:
a second display manager routine which creates a second display entity having properties which define the appearance of a second graphic representing the data item; and
a second position manager routine which creates a second position entity for location of the data item in a second location in the global space, including a second position entity having properties which define the second location of the data item in the global space.

36. A system for the retrieval and graphical presentation of data items from a data source, the system comprising:
a client computer having a display screen and an input device capable of requesting a data item from the data source;
an application server coupled to the data source;
wherein the application server produces a client computer readable object for producing a graphical representation of the data item from the data source on the screen of the client computer, the object having:
a display manager routine which creates display entities for the formatting of graphics on the display screen which represent the data items including a display entity having properties which define the appearance of a graphic representing the data item;
a position manager routine which creates position entities for placement of the data items in a global space including a position entity having properties which define the location of the data item in the global space;
a graph manager routine which creates graph entities for selection of data items from the data source including a graph entity having properties which determine the selection of the data item; and
a source manager routine which creates a source entity which has properties to represent the data item.

37. The system of claim 36 wherein the application server includes a memory cache which stores previously requested computer objects.

38. The system of claim 36 wherein the application server further comprises a data source interface which translates data in the data source to data capable of being formatted by the computer object.

39. The system of claim 36 wherein the data source is a relational database.

40. The system of claim 36 wherein the data source is a flat file database having data fields separated by a known symbol.

41. The system of claim 36 wherein the object is in a format for transmission over the Internet and may be interfaced with a web browser program.

42. The system of claim 36 wherein the data source is stored on a remotely accessed computer having a connection to the application server.

43. The system of claim 42 further comprising a firewall between the application server and the computer storing the data source.

44. A method for authoring a computer programming object for the graphical representation of data items from a data source on a client computer having a display screen, the method comprising:
creating a display manager to manage display entities for the formatting of graphics on a display screen representing the data items;
creating a display entity having properties which define the appearance of a graphic representing the data item on the display screen;
creating a position manager to manage position entities for location of the data items in a global space;
creating a position entity having properties which define a location of the data item in the global space;
creating a graph manager to manages graph entities for selection of data items from the data source;
creating a graph entity having properties which determine the selection of the data item; and
creating a source manager to manage source entities which have properties to represent the data items.

45. The method of claim 44 wherein the data source includes data records containing relation data representing the relation between data items,
creating display entities for the formatting of graphics on a display screen representing the relation between data items, the display entities having properties which define the appearance of a graphic representing the relation between data items on the display screen;
creating position entities for location of the relation data in a global space, the position entities having properties which define a location of the relation data in the global space;
creating graph entities for selection of relation data from the data source, the graph entities having properties which determine the selection of relation data; and
creating source entities which have properties to represent the relation data item.

46. The method of claim 45 further comprising:
creating a type collection entity with groups of entities; and creating an entity type with entities with common properties.

47. The method of claim 44 further comprising:

selecting a layout routine to determines the initial position in global space of the position entity.

48. The method of claim 47 further comprising selecting a condition by which the routine is applied to the position entity.

49. The method of claim 44 further comprising selecting a motion routine to determine the movement in global space of the position entity.

50. The method of claim 49 further comprising selecting a condition by which the motion routine is applied to the position entity.

51. The method of claim 44 further comprising:

arranging the display, position, graph and position managers and entities in a hierarchy; and requesting a value for a property from the managers and entities in the order of the managers and entities in the hierarchy.

52. The method of claim 51 further comprising:

defining a created property; and applying a defined property value in the managers, entities or data source to the created property.

53. The method of claim 52 further comprising applying the defined property under a user defined condition.

54. The method of claim 44 wherein the data source is a relational database.

55. The method of claim 45 wherein the data source is a flat file database and the method further comprises:

detecting data items separated by a known symbol in the data source; and categorizing the data items as data types and the relations between the data items based on the symbol.

56. The method of claim 44 further comprising transmitting the object over the Internet wherein the client computer has a web browser program which interfaces with the object.

57. A system for authoring a computer programming object for the graphical representation of data items from a data source on a client computer having a display screen, the system comprising:

display manager means for creating a display entity having properties which define the appearance of a graphic representing the data item on the display screen;

position manager means for creating a position entity having properties which define a location of the data item in the global space;

graph manager means for creating a graph entity having properties which determine the selection of the data item;

source manager means for managing source entities which have properties to represent the data items.

\* \* \* \* \*